US012711724B2

(12) United States Patent
Abelson et al.

(10) Patent No.: US 12,711,724 B2
(45) Date of Patent: Aug. 18, 2026

(54) DEVICES, METHODS, AND GRAPHICAL USER INTERFACES FOR CONTENT APPLICATIONS

(71) Applicant: Apple Inc., Cupertino, CA (US)

(72) Inventors: Alexa Abelson, Cupertino, CA (US); Matias A. Franco, Menlo Park, CA (US); Sruti Harikumar, Los Gatos, CA (US); Tyler C. Dahl, San Jose, CA (US); Danvin Ruangchan, San Jose, CA (US); Matan Stauber, Brooklyn, NY (US); Alfred B. Huergo Wagner, Redwood City, CA (US); Stephen O Lemay, Palo Alto, CA (US); William A Sorrentino, III, Kentfield, CA (US); Peter D. Anton, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 18/731,022

(22) Filed: May 31, 2024

(65) Prior Publication Data

US 2024/0404232 A1 Dec. 5, 2024

Related U.S. Application Data

(60) Provisional application No. 63/506,072, filed on Jun. 3, 2023.

(51) Int. Cl.

| | |
|---|---|
| ***G06F 3/04842*** | (2022.01) |
| ***G06T 19/00*** | (2011.01) |
| ***G06T 19/20*** | (2011.01) |

(52) U.S. Cl.
CPC ............ *G06T 19/20* (2013.01); *G06T 19/006* (2013.01); *G06T 2219/2004* (2013.01); *G06T 2219/2016* (2013.01)

(58) Field of Classification Search
CPC .................. G06T 19/20; G06T 19/006; G06T 2219/2004; G06T 2219/2016; G06F 3/011
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |

(Continued)

FOREIGN PATENT DOCUMENTS

| | | | |
|---|---|---|---|
| WO | 2013169849 | A2 | 11/2013 |
| WO | 2014105276 | A1 | 7/2014 |

OTHER PUBLICATIONS

International Search Report received for PCT Patent Application No. PCT/US2024/032109, mailed on Sep. 13, 2024, 4 pages.

*Primary Examiner* — Philip P. Dang
(74) *Attorney, Agent, or Firm* — Kubota & Basol LLP

(57) ABSTRACT

In some embodiments, a computer system generates virtual lighting effects while presenting a content item. In some embodiments, a computer system generates an animated three-dimensional object while presenting a content item. In some embodiments, a computer system displays a condensed user interface in place of an expanded user interface in response to different inputs.

45 Claims, 48 Drawing Sheets

(56) References Cited

U.S. PATENT DOCUMENTS

| | | | | |
|---|---|---|---|---|
| 7,657,849 | B2 | 2/2010 | Chaudhri et al. | |
| 7,663,607 | B2 | 2/2010 | Hotelling et al. | |
| 7,844,914 | B2 | 11/2010 | Andre et al. | |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,479,122 | B2 | 7/2013 | Hotelling et al. | |
| 9,348,458 | B2 | 5/2016 | Hotelling et al. | |
| 9,933,937 | B2 | 4/2018 | Lemay et al. | |
| 10,311,543 | B2 * | 6/2019 | Energin | G06F 3/0304 |
| 10,475,253 | B2 * | 11/2019 | Yerkes | G06F 1/1643 |
| 10,885,716 | B1 * | 1/2021 | Evertt | G06T 19/006 |
| 10,937,244 | B2 * | 3/2021 | Kim | G06T 19/20 |
| 11,062,520 | B2 * | 7/2021 | Smets | G06T 19/006 |
| 11,263,824 | B2 * | 3/2022 | Forbes | G06T 19/20 |
| 11,314,376 | B2 * | 4/2022 | Agarawala | G06T 19/20 |
| 11,520,456 | B2 * | 12/2022 | Kawashima | G06F 3/011 |
| 11,557,102 | B2 * | 1/2023 | Palangie | G06F 3/011 |
| 11,687,224 | B2 * | 6/2023 | Manzari | G06F 3/04847 715/810 |
| 11,853,536 | B2 * | 12/2023 | Napolitano | H04N 21/42204 |
| 11,995,230 | B2 * | 5/2024 | Holder | G06F 3/017 |
| 12,211,161 | B2 * | 1/2025 | Favale | G06F 3/04845 |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2019/0385368 | A1 * | 12/2019 | Cartwright | H04N 13/156 |
| 2022/0148274 | A1 * | 5/2022 | Brown, IV | G06F 3/0482 |
| 2022/0326837 | A1 | 10/2022 | Dessero et al. | |
| 2023/0093979 | A1 | 3/2023 | Stauber et al. | |
| 2023/0094522 | A1 | 3/2023 | Stauber et al. | |

* cited by examiner

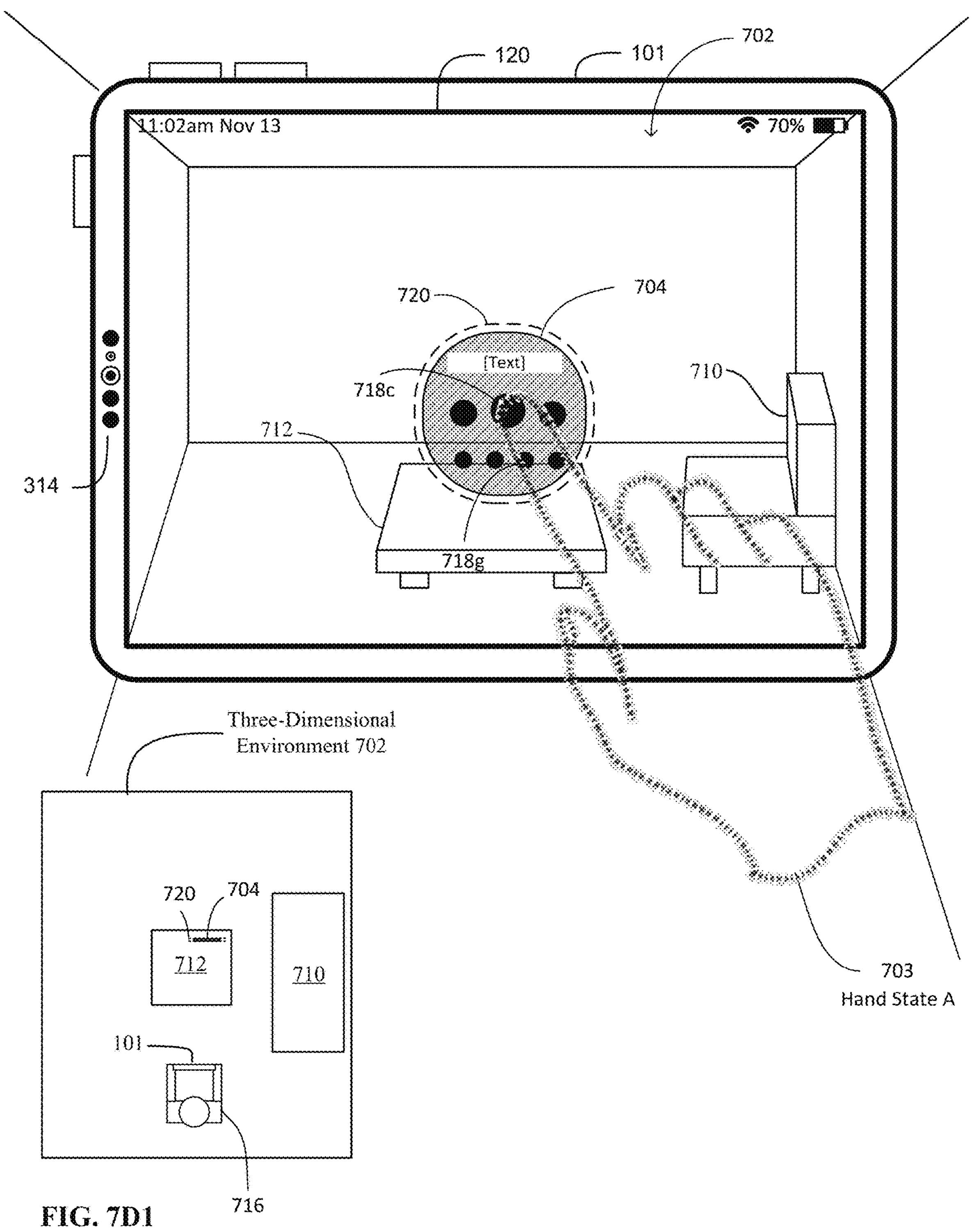
FIG. 7D1

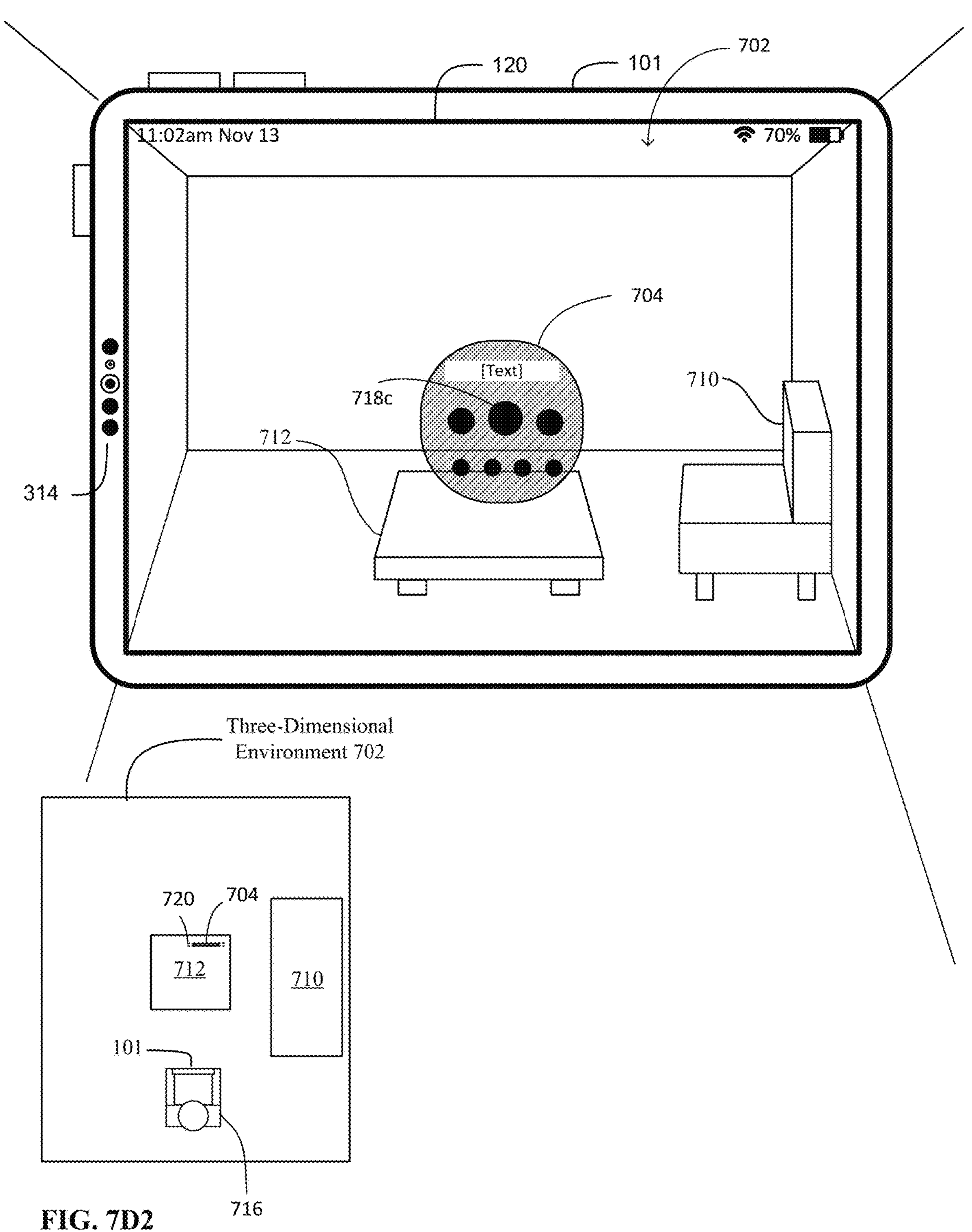
FIG. 7D2

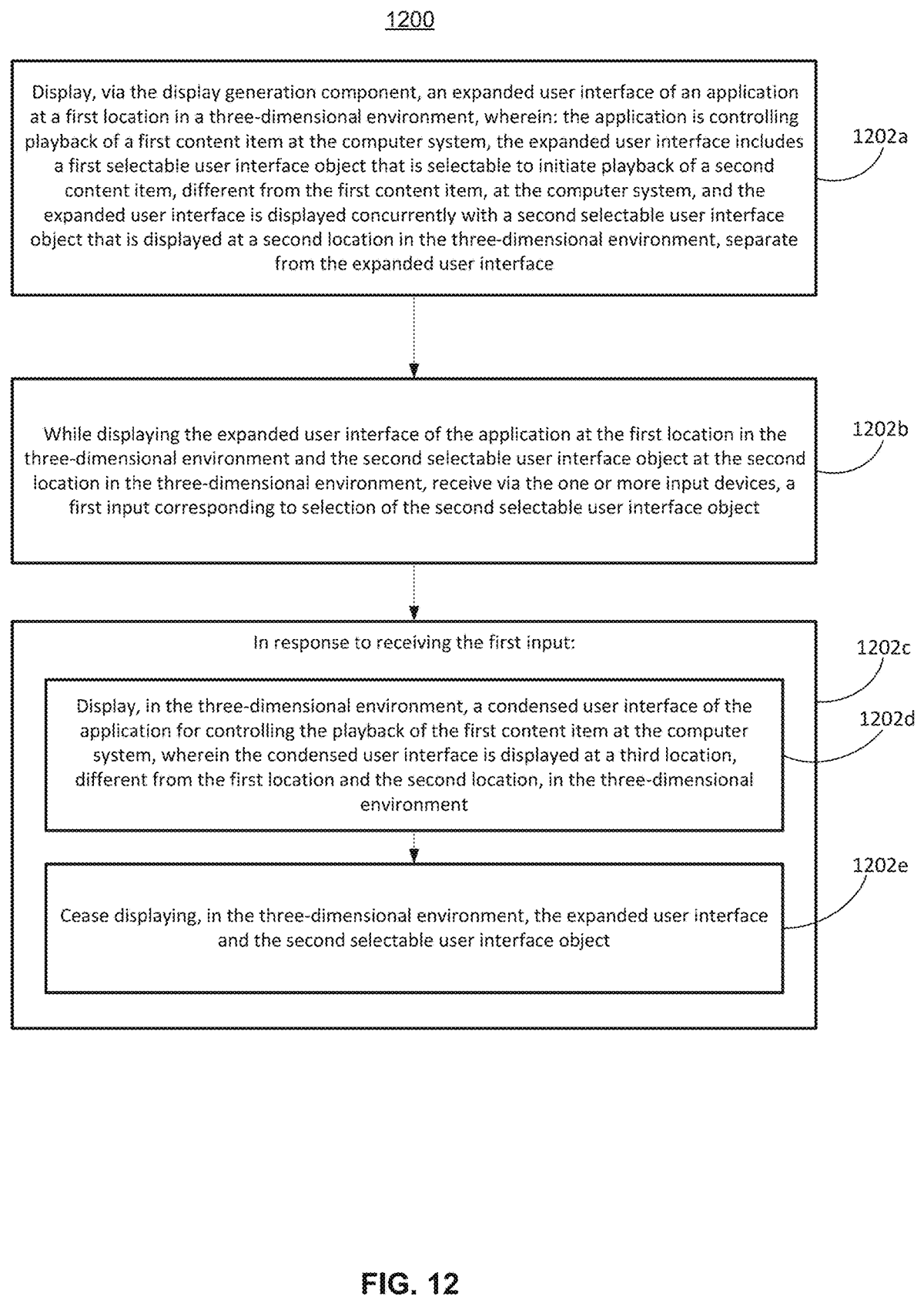

1200

Display, via the display generation component, an expanded user interface of an application at a first location in a three-dimensional environment, wherein: the application is controlling playback of a first content item at the computer system, the expanded user interface includes a first selectable user interface object that is selectable to initiate playback of a second content item, different from the first content item, at the computer system, and the expanded user interface is displayed concurrently with a second selectable user interface object that is displayed at a second location in the three-dimensional environment, separate from the expanded user interface 1202a While displaying the expanded user interface of the application at the first location in the three-dimensional environment and the second selectable user interface object at the second location in the three-dimensional environment, receive via the one or more input devices, a first input corresponding to selection of the second selectable user interface object 1202b In response to receiving the first input:

1202c

Display, in the three-dimensional environment, a condensed user interface of the application for controlling the playback of the first content item at the computer system, wherein the condensed user interface is displayed at a third location, different from the first location and the second location, in the three-dimensional environment 1202d Cease displaying, in the three-dimensional environment, the expanded user interface and the second selectable user interface object 1202e

FIG. 12

DEVICES, METHODS, AND GRAPHICAL USER INTERFACES FOR CONTENT APPLICATIONS

CROSS-REFERENCE TO RELATED APPLICATIONS

This application claims the benefit of U.S. Provisional Application No. 63/506,072, filed Jun. 3, 2023, the content of which is herein incorporated by reference in its entirety for all purposes.

TECHNICAL FIELD

The present disclosure relates generally to computer systems that provide computer-generated experiences, including, but not limited to, electronic devices that provide user interfaces for presenting and browsing content via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has (e.g., includes or is in communication with) a display generation component (e.g., a display device such as a head-mounted device (HMD), a display, a projector, a touch-sensitive display (also known as a "touch screen" or "touch-screen display"), or other device or component that presents visual content to a user, for example, on or in the display generation component itself or produced from the display generation component and visible elsewhere). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system generates virtual lighting effects while presenting a content item. In some embodiments, a computer system generates an animated three-dimensional object while presenting a content item. In some embodiments, a computer system displays a condensed user interface in place of an expanded user interface in response to different inputs.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the FIGS.

FIG. 12 is a flow diagram illustrating how a computer system displays a condensed user interface in place of an expanded user interface in response to different inputs in accordance with some embodiments.

DESCRIPTION OF EMBODIMENTS

Figure 1A:
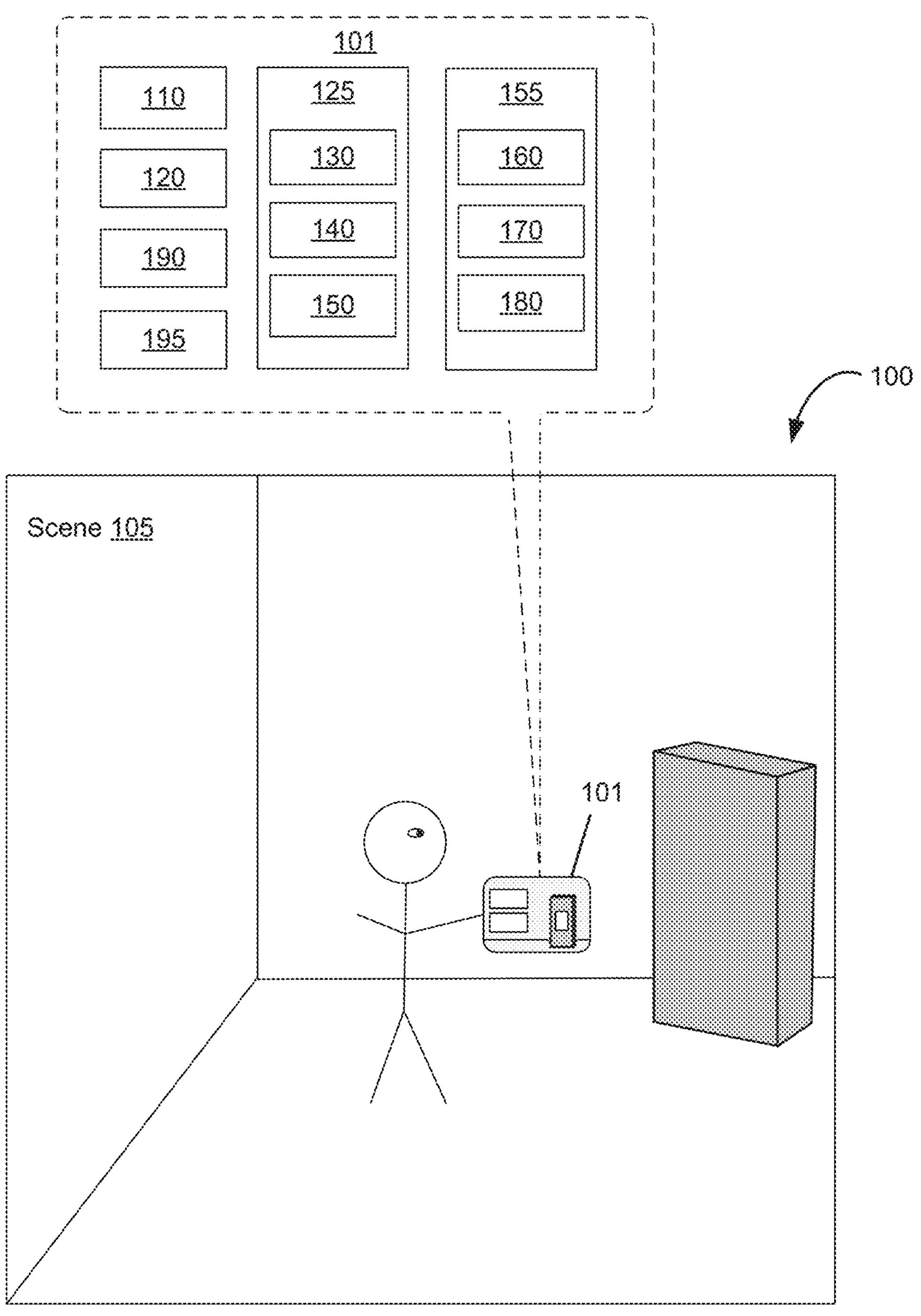
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays a user interface of an application such as a content playback application in a three-dimensional environment. In some embodiments, while displaying the user interface and in response to receiving a first input corresponding to a request to initiate playback of a respective content, the computer system initiates the playback of the respective content and displays the user interface with a simulated lighting effect. In some embodiments, the simulated lighting effect has one or more characteristics based on the playback of the respective content. Displaying a user interface with simulated lighting effects depending on the playback of corresponding content reduces resources needed for displaying the simulated lighting effects when the corresponding content is not being played and reduces the need for manual inputs to enable and/or disable the simulated lighting effects manually.

In some embodiments, a computer system displays a user interface of an application such as a content playback application in a three-dimensional environment. In some embodiments, while displaying the user interface and in response to receiving a first input corresponding to a request to initiate playback of a respective content, the computer system initiates the playback of the respective content and displays the user interface with an animated object. In some embodiments, the animated object has one or more characteristics based on the playback of the respective content. Displaying a user interface with a respective animated object depending on the playback of corresponding content reduces resources needed for displaying the simulated lighting effects when the corresponding content is not being played and reduces the need for manual inputs to enable and/or disable the simulated lighting effects manually.

In some embodiments, a computer system displays an expanded user interface of an application, such as a content playback application, that includes a selectable option to initiate playback of a second content item. In some embodiments, the computer system displays a second selectable option selectable to display, in the three-dimensional environment, a condensed user interface of the application, in response to a first input. In some embodiments, the expanded user interface is displayed at a first location, the second selectable option is displayed at a second location, and the condensed user interface is displayed at a third location. Displaying a condensed user interface without the expanded user interface reduces the visual distractions to the user and reduces clutter in the three-dimensional environment, thereby reducing errors in interactions with the computer system.

Figure 10:
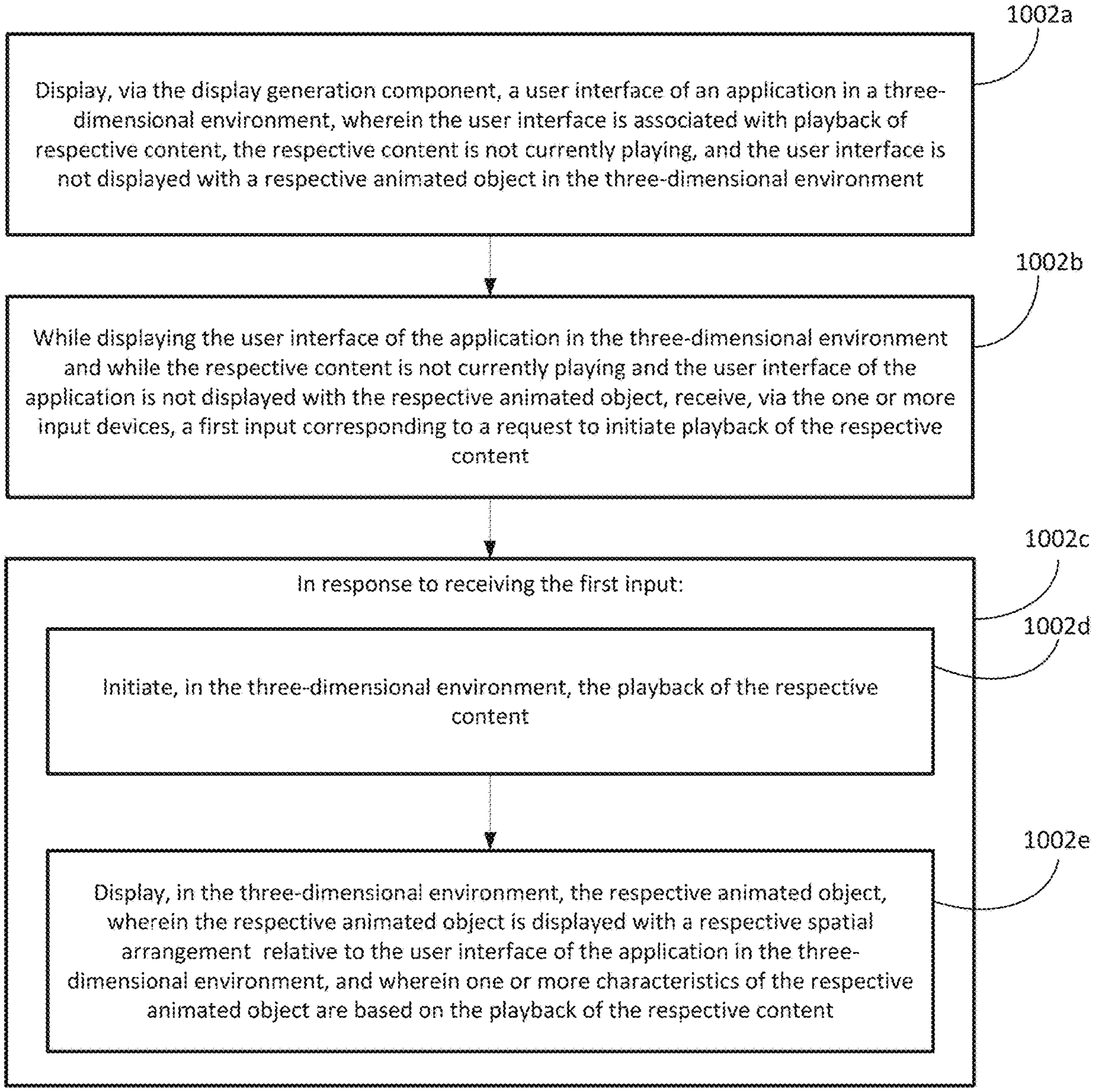
FIG. 10 is a flow diagram illustrating how a computer system generates an animated three-dimensional object while presenting a content item in accordance with some embodiments.
Figure 11A:
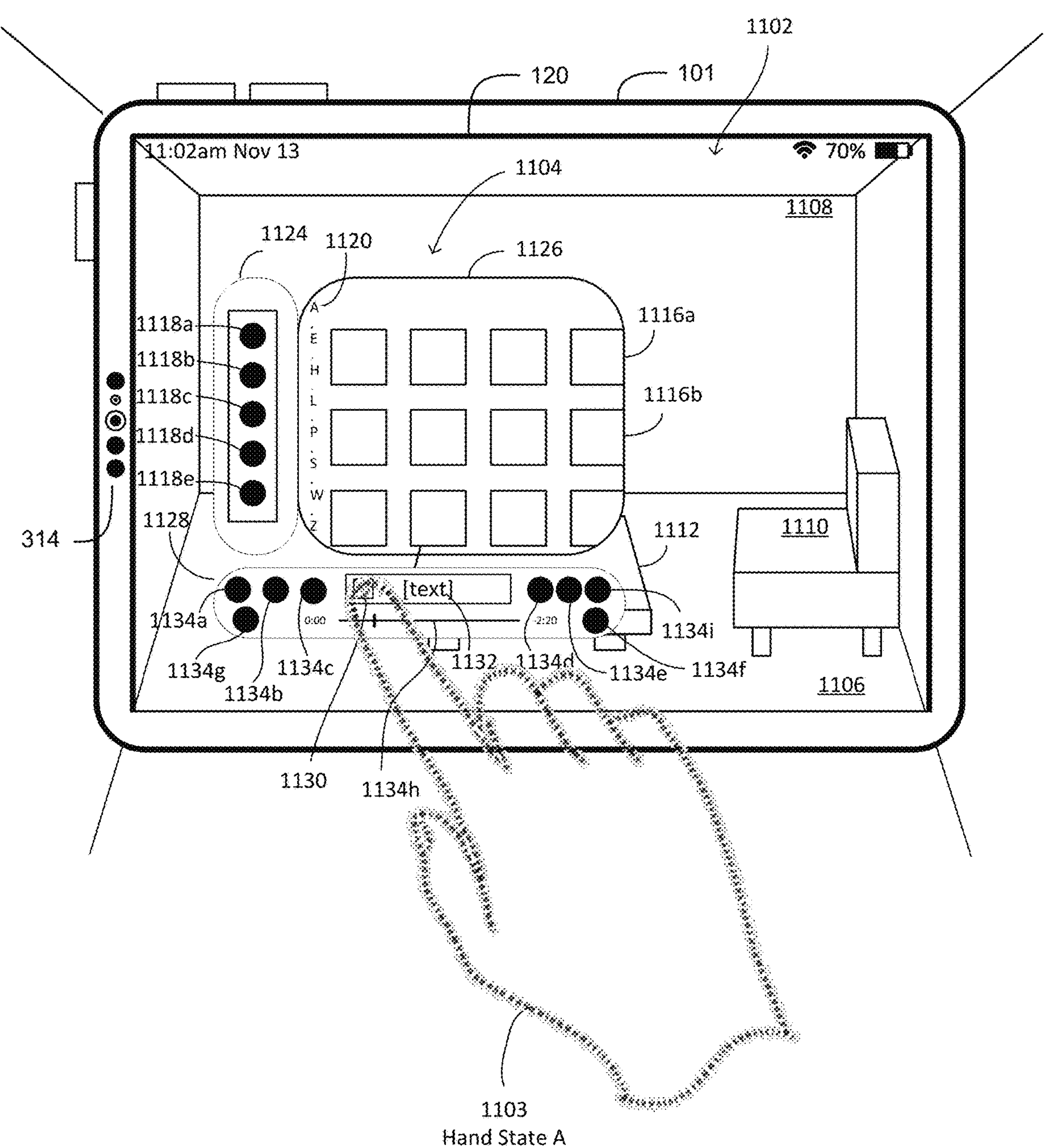
FIGS. 11A-11N illustrate examples of how a computer system displays a condensed user interface in place of an expanded user interface in response to different inputs in accordance with some embodiments.

FIGS. 1-6 provide a description of example computer systems for providing XR experiences to users (such as described below with respect to methods 800, 1000 and/or 1200). FIGS. 7A-7H illustrate examples of how a computer system generates virtual lighting effects while presenting a content item in accordance with some embodiments. FIG. 8 is a flow diagram illustrating how a computer system generates virtual lighting effects while presenting a content item in accordance with some embodiments. The user interfaces in FIGS. 7A-7H are used to illustrate the processes in FIG. 8. FIGS. 9A-9E illustrate examples of how a computer system generates an animated three-dimensional object while presenting a content item in accordance with some embodiments. FIG. 10 is a flow diagram illustrating how a computer system generates an animated three-dimensional object while presenting a content item in accordance with some embodiments. The user interfaces in FIGS. 9A-9E are used to illustrate the processes in FIG. 10. FIGS. 11A-11N illustrate examples of how a computer system displays a condensed user interface in place of an expanded user interface in response to different inputs in accordance with some embodiments. FIG. 12 is a flow diagram illustrating how a computer system displays a condensed user interface in place of an expanded user interface in response to different inputs in accordance with some embodiments. The user interfaces in FIGS. 11A-11N are used to illustrate the processes in FIG. 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
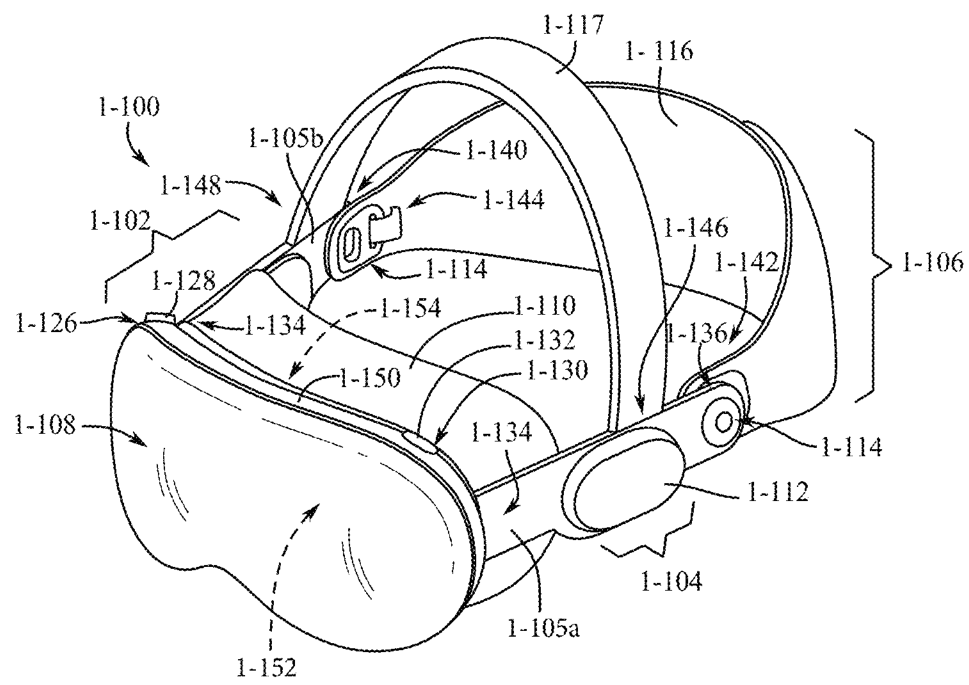
FIGS. 1B-1P are examples of a computer system for providing XR experiences in the operating environment of FIG. 1A.
Figure 1C:
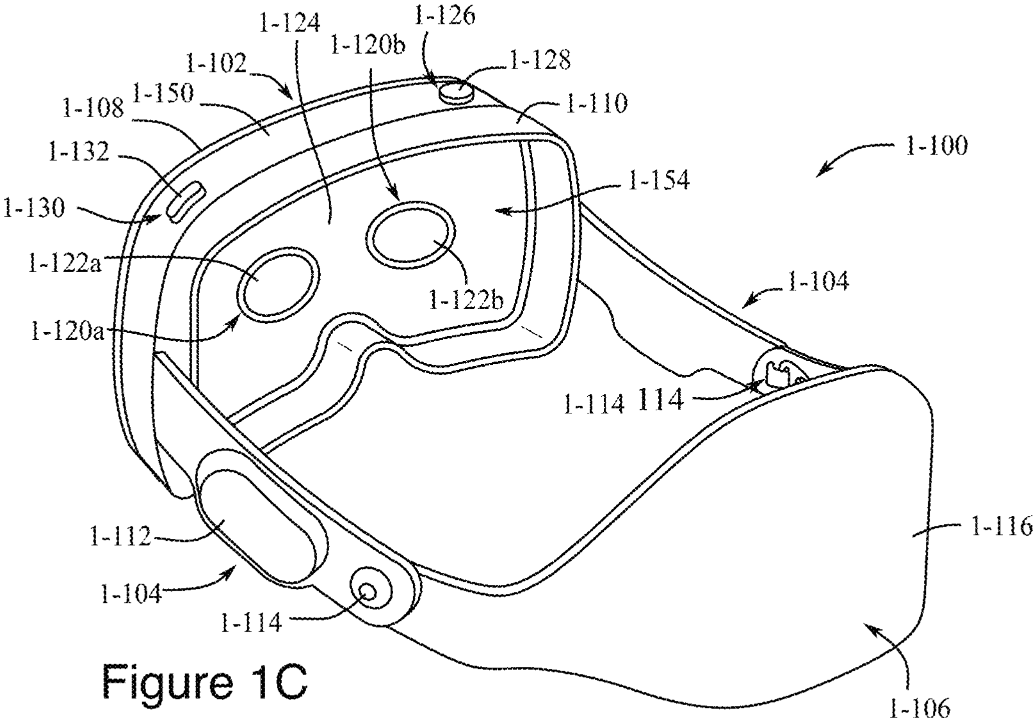
Figure 1D:
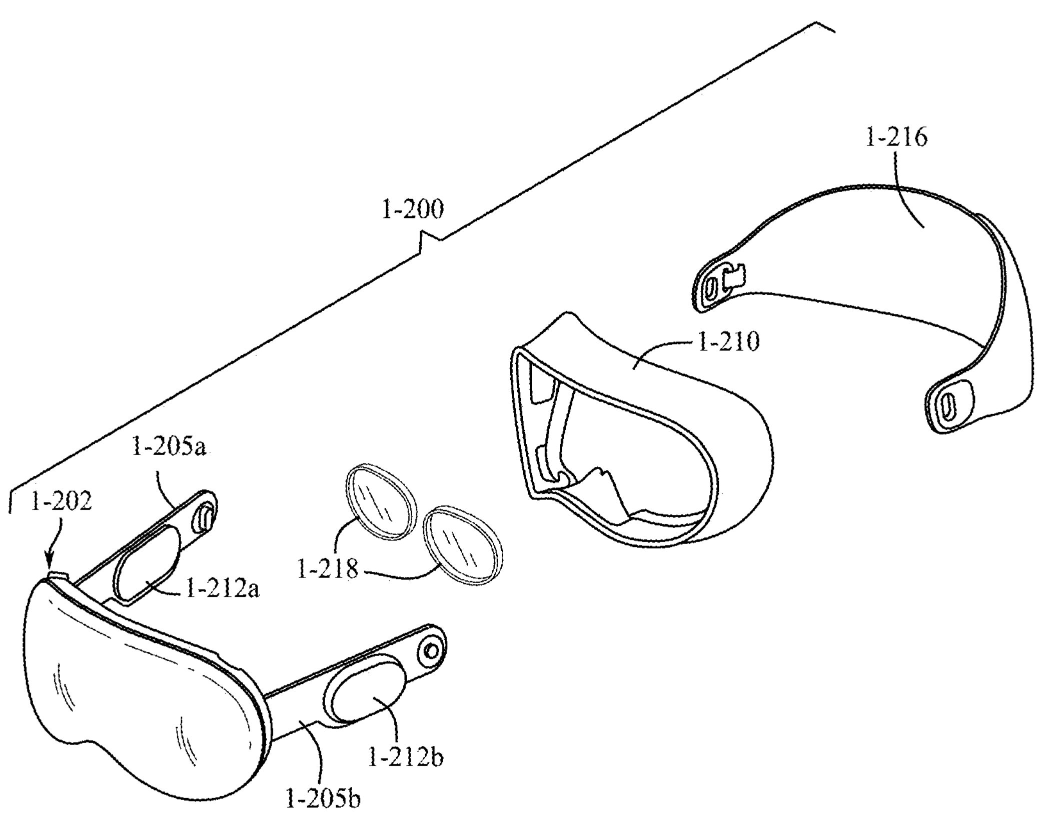
Figure 1E:
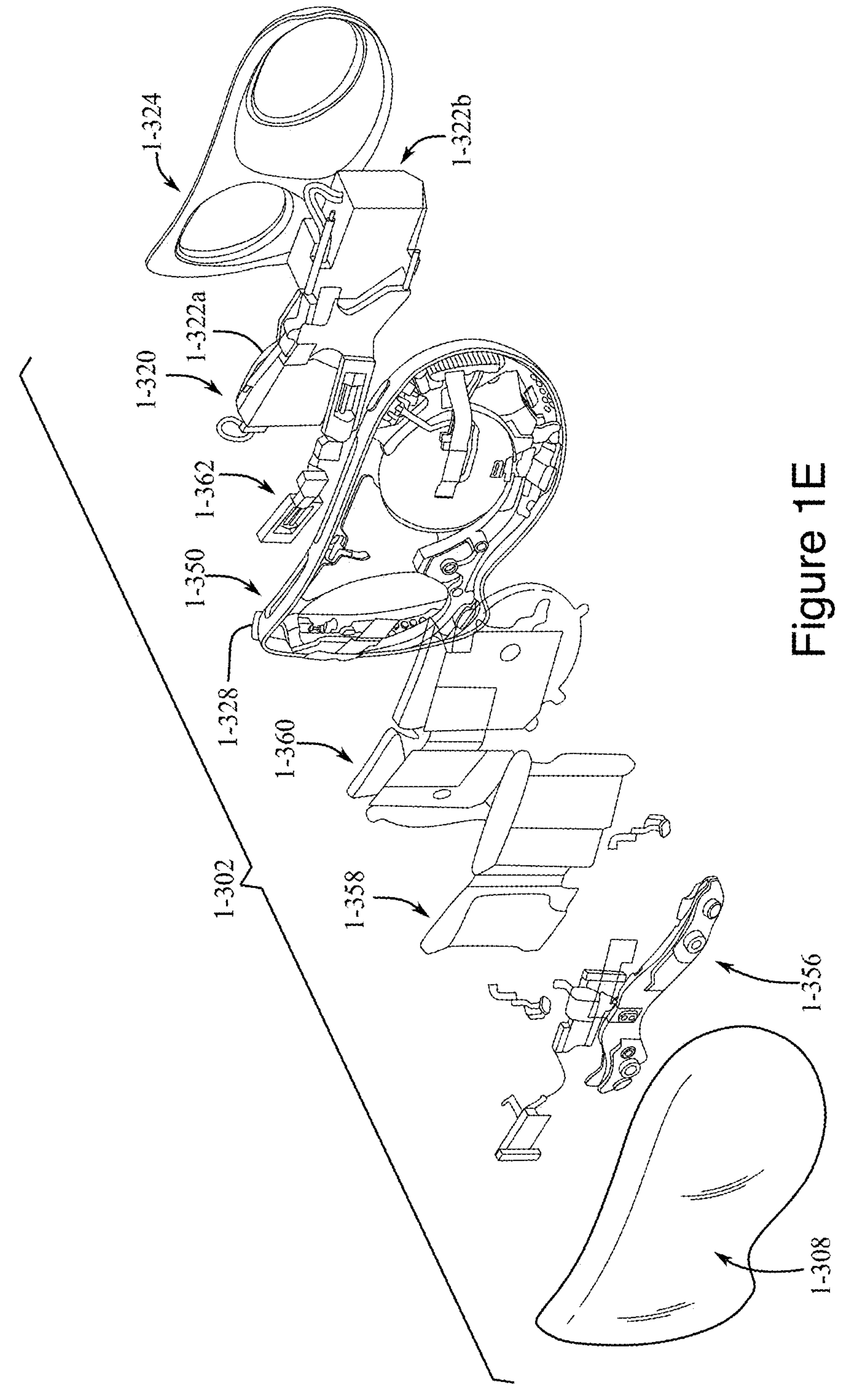
Figure 1F:
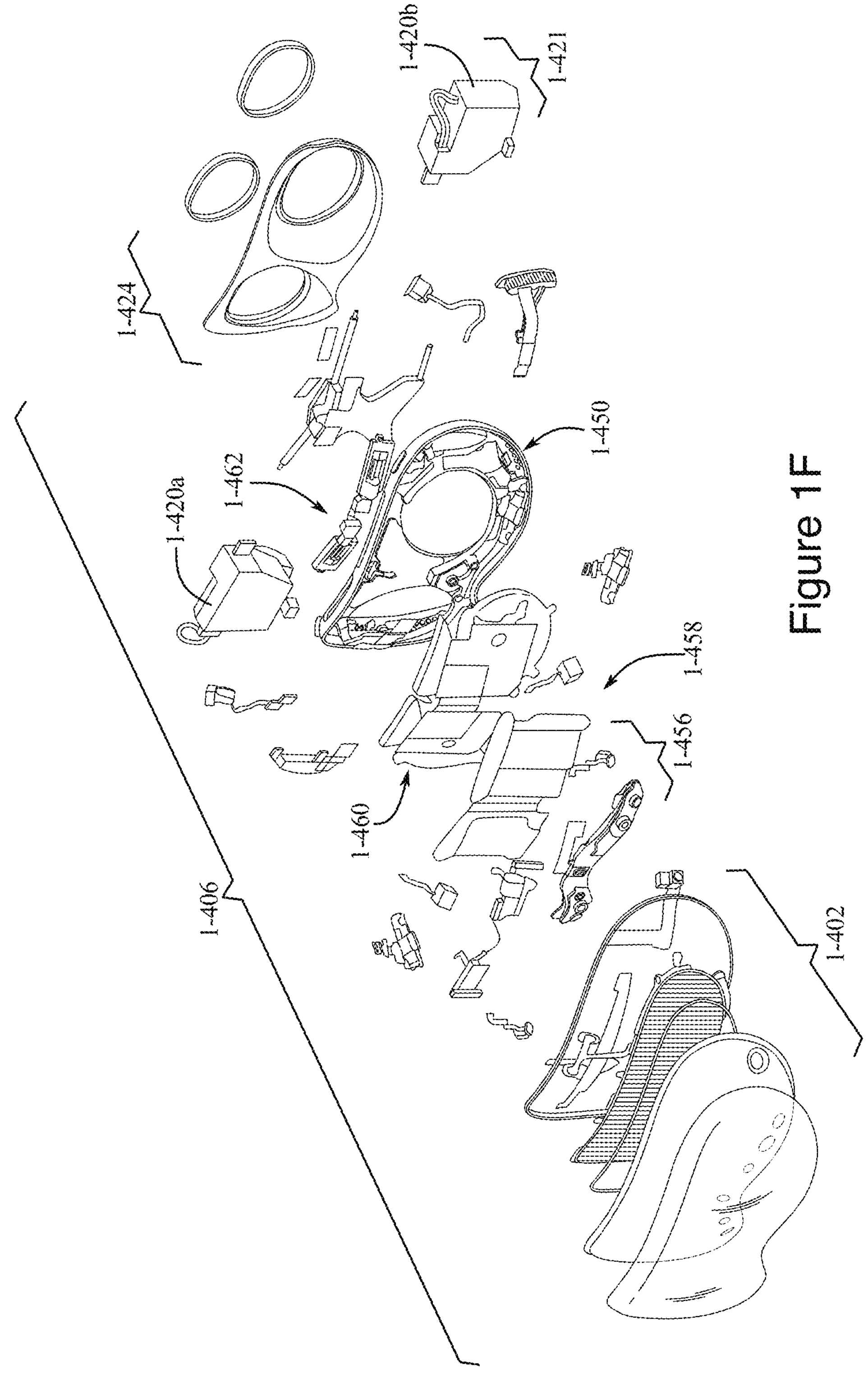
Figure 1G:
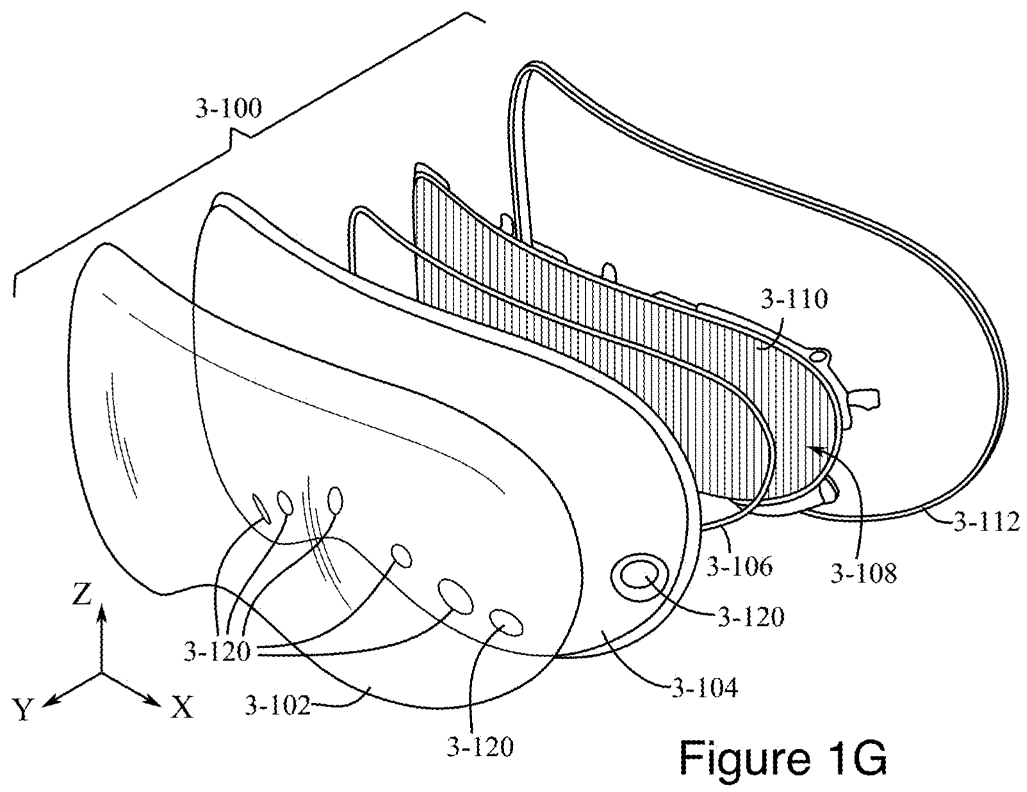
Figure 1H:
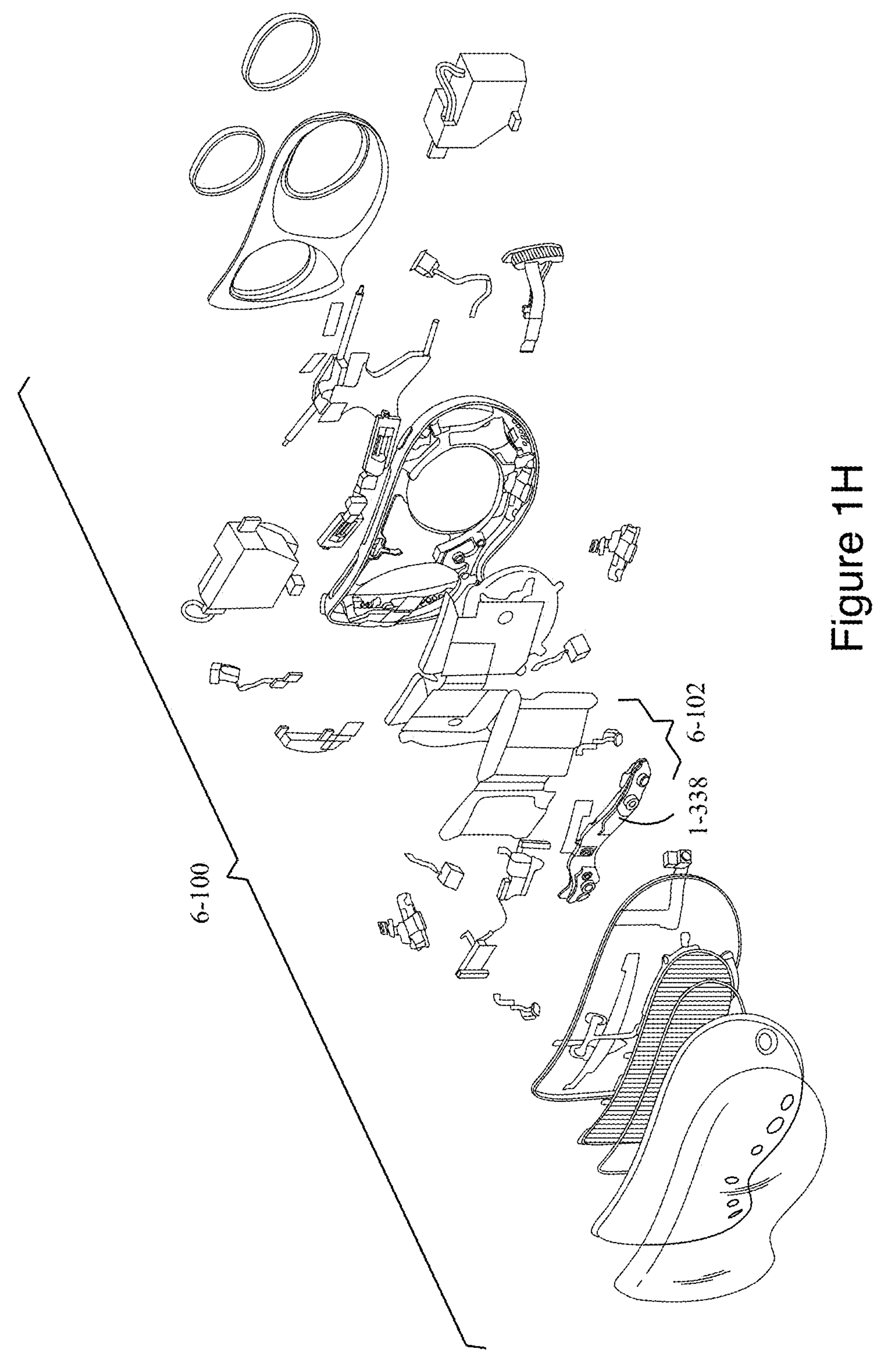
Figure 1I:
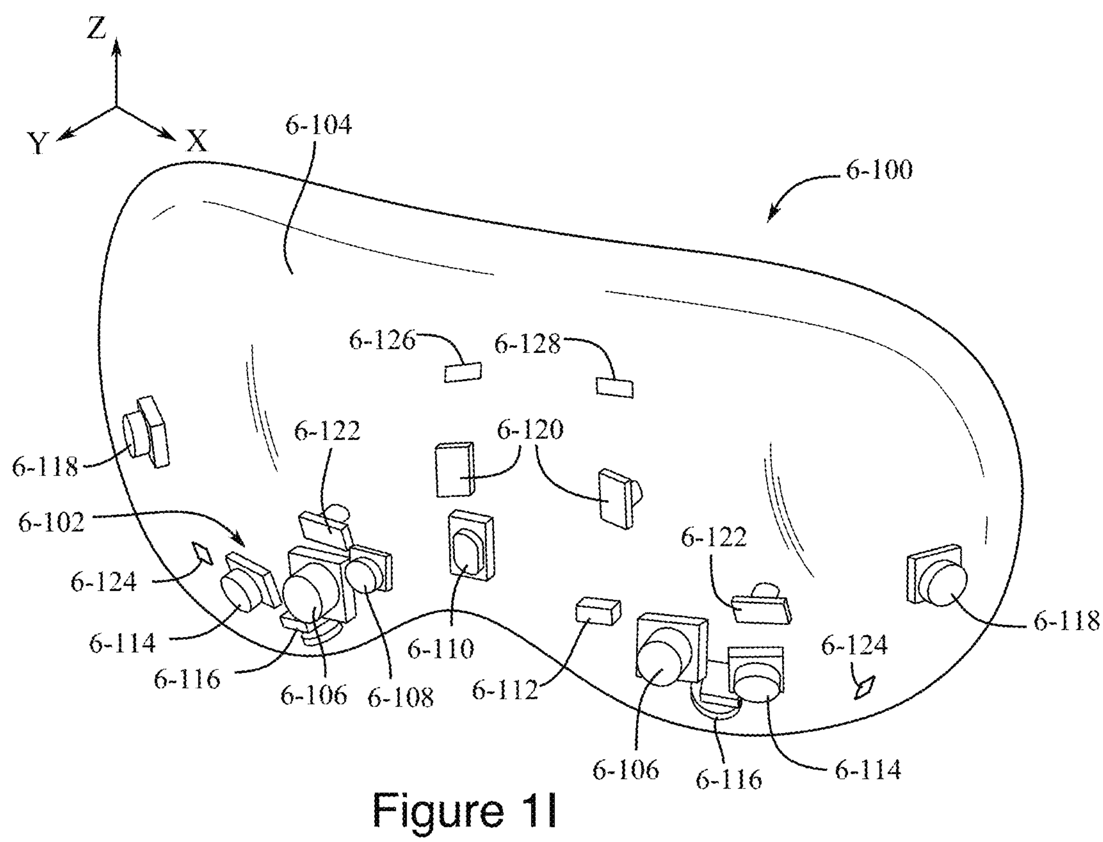
Figure 1J:
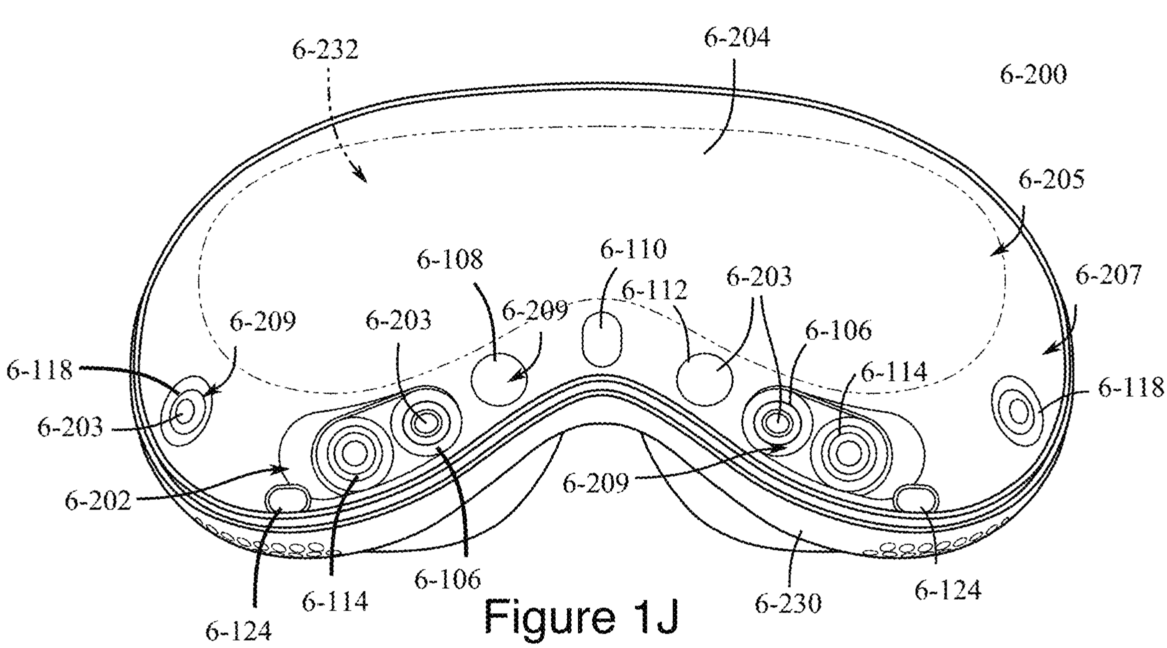
Figure 1K:
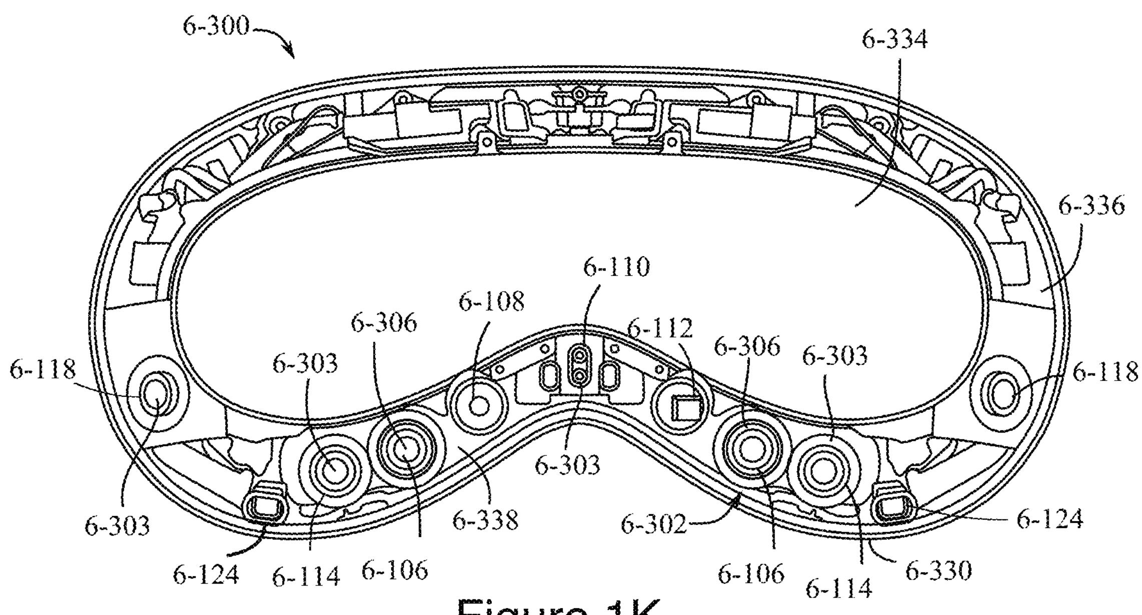
Figure 1L:
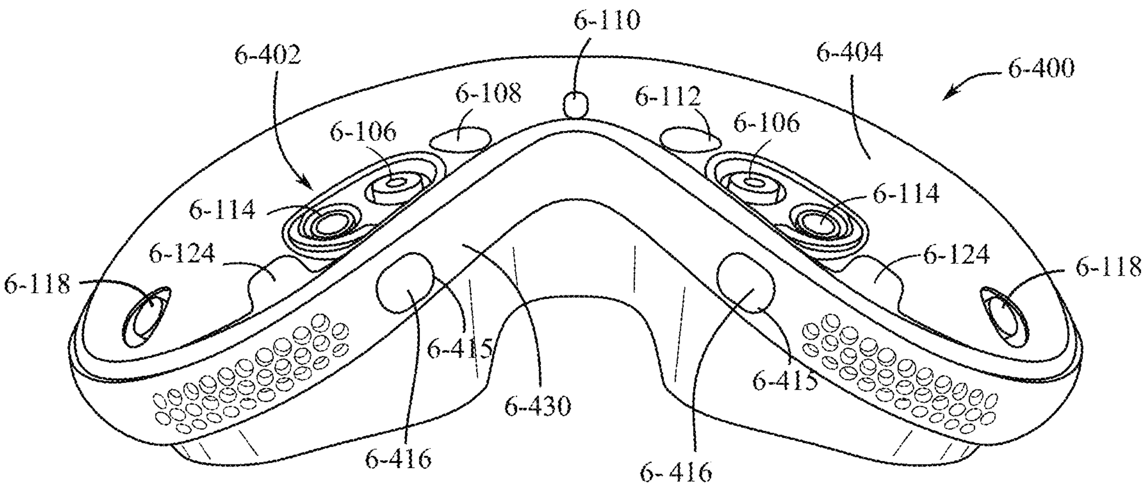
Figure 1M:
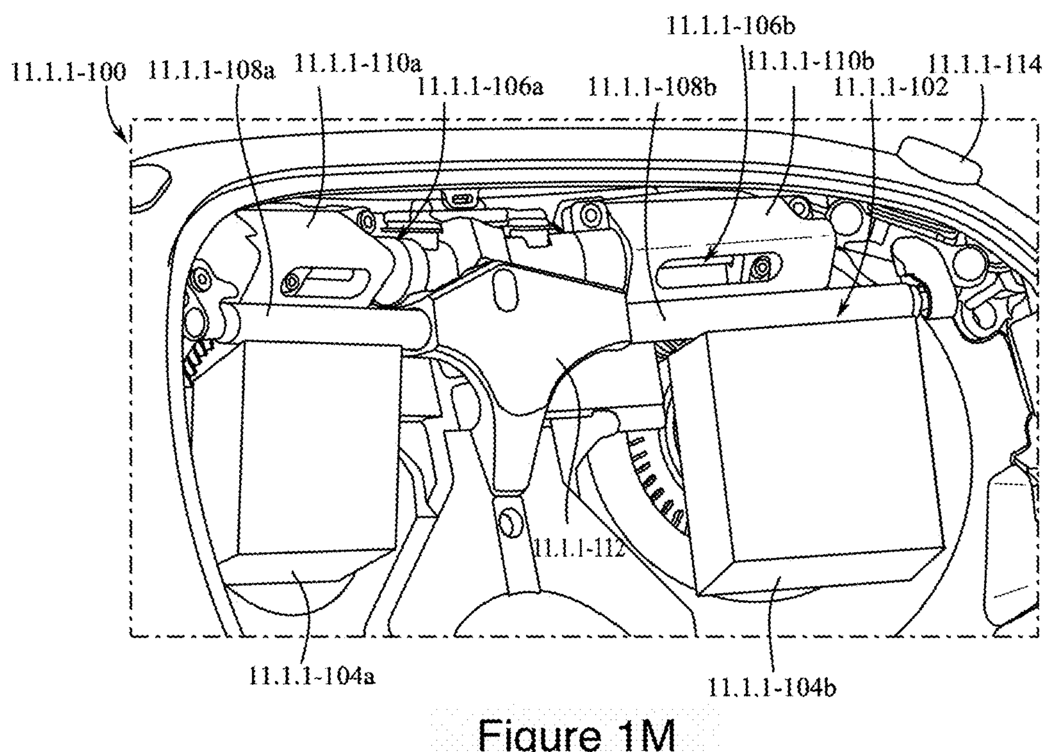
Figure 1N:
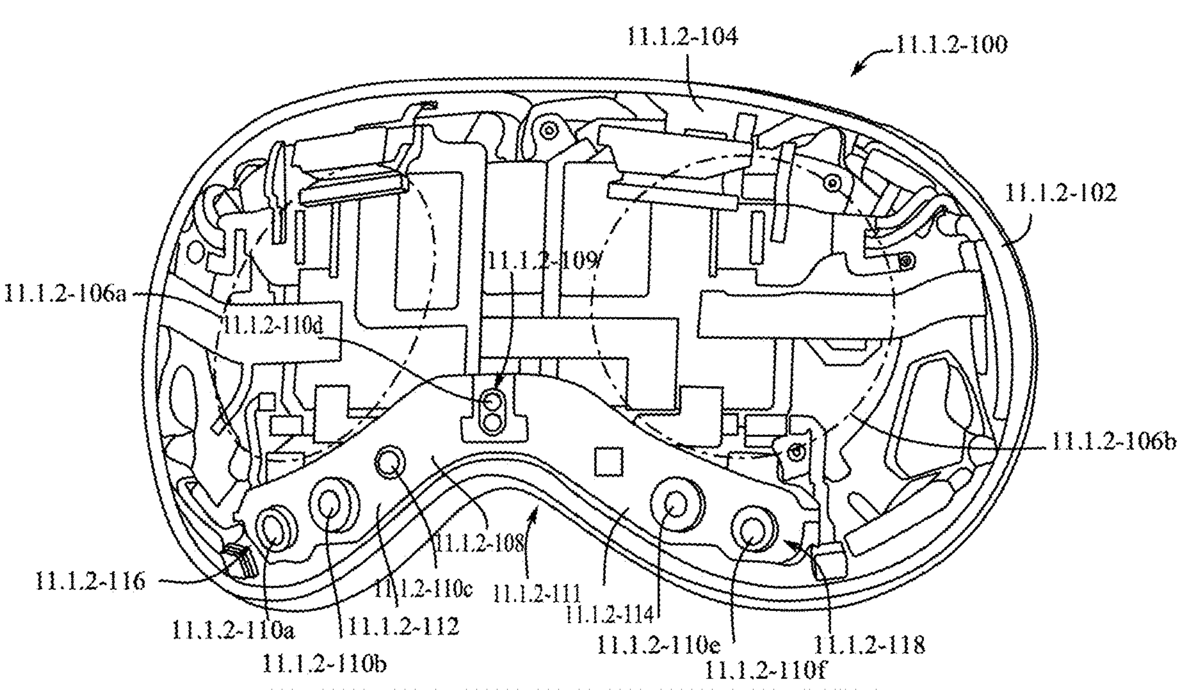
Figure 1O:
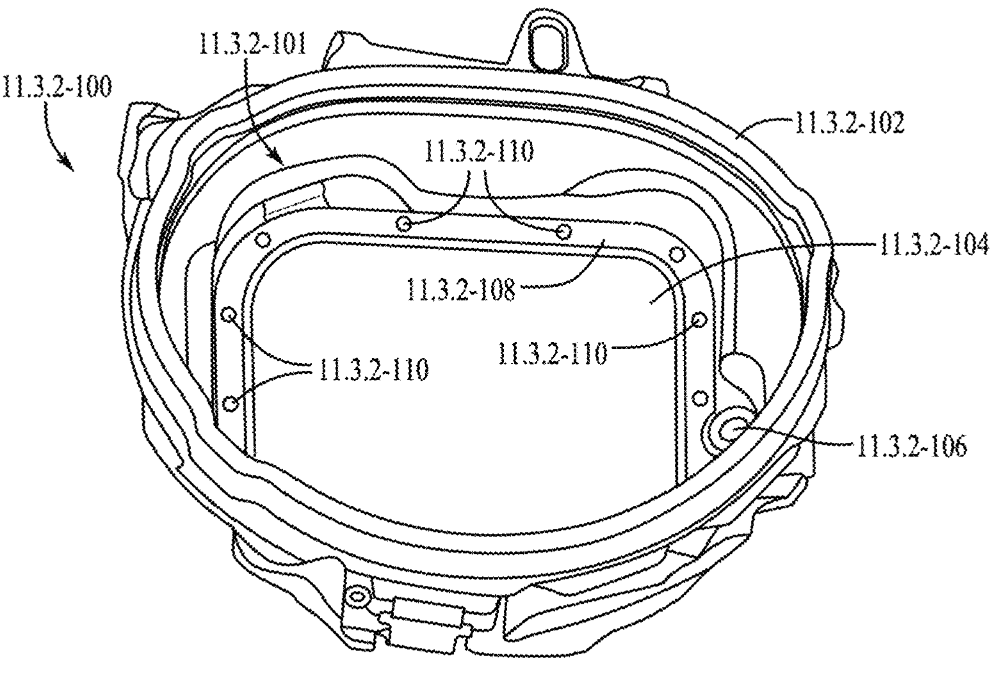
Figure 1P:
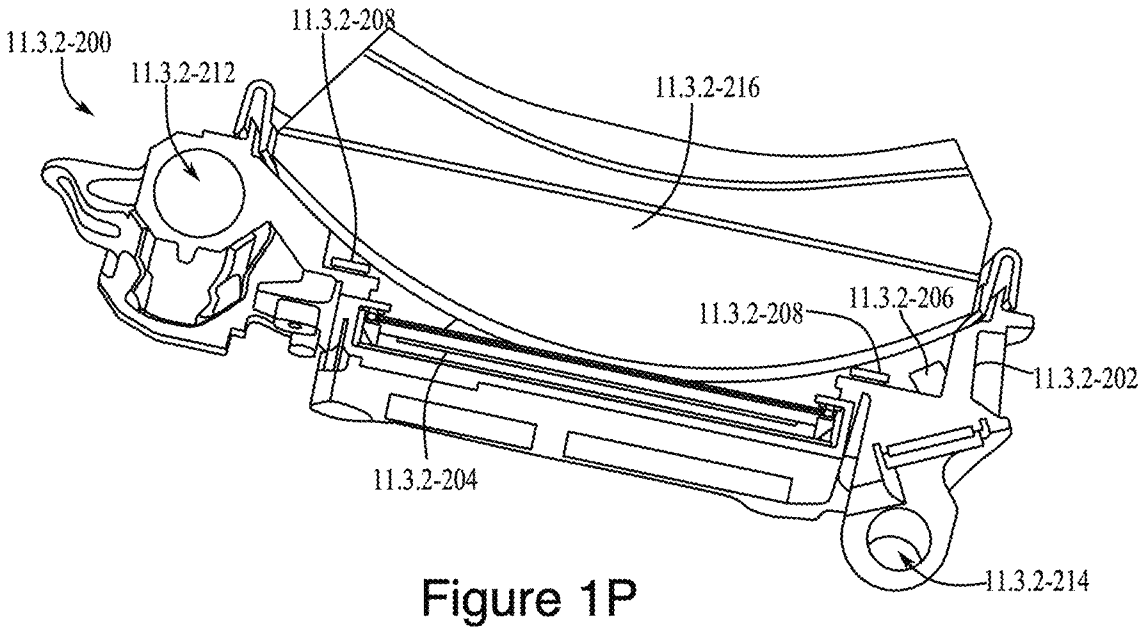

FIGS. 1A-1P illustrate various examples of a computer system that is used to perform the methods and provide audio, visual and/or haptic feedback as part of user interfaces described herein. In some embodiments, computer system includes one or more display generation components (e.g., first and second display assemblies **1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 11) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 11) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 10) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120***a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* includes plastic, metal, or other structural materials forming the shape the substantially rigid straps 1-105*a-b*. In at least one example, the first and second bands 1-116, 1-117 are formed of clastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the front cover assembly 1-108 is disposed to occlude the first opening 1-152 from view when the HMD is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-130 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display unit 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, IC, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, cither alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1B can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 11 and 1K-1L and described herein. Likewise, any of the features, components, and/or parts, including the arrangements and configurations thereof shown and described with reference to FIGS. 11 and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 11-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 11-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 11-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, cither alone or in any combination, in the example of the devices, features, components, and parts shown in FIG. 1N.

FIG. 10 illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 10 can be replicated in another (e.g., second) optical module disposed with the HMD to interact (e.g., project light and capture images) of another eye of the user.

Any of the features, components, and/or parts, including the arrangements and configurations thereof shown in FIG. 10 can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, cither alone or in any combination, in the example of the devices, features, components, and parts shown in FIG. 10.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
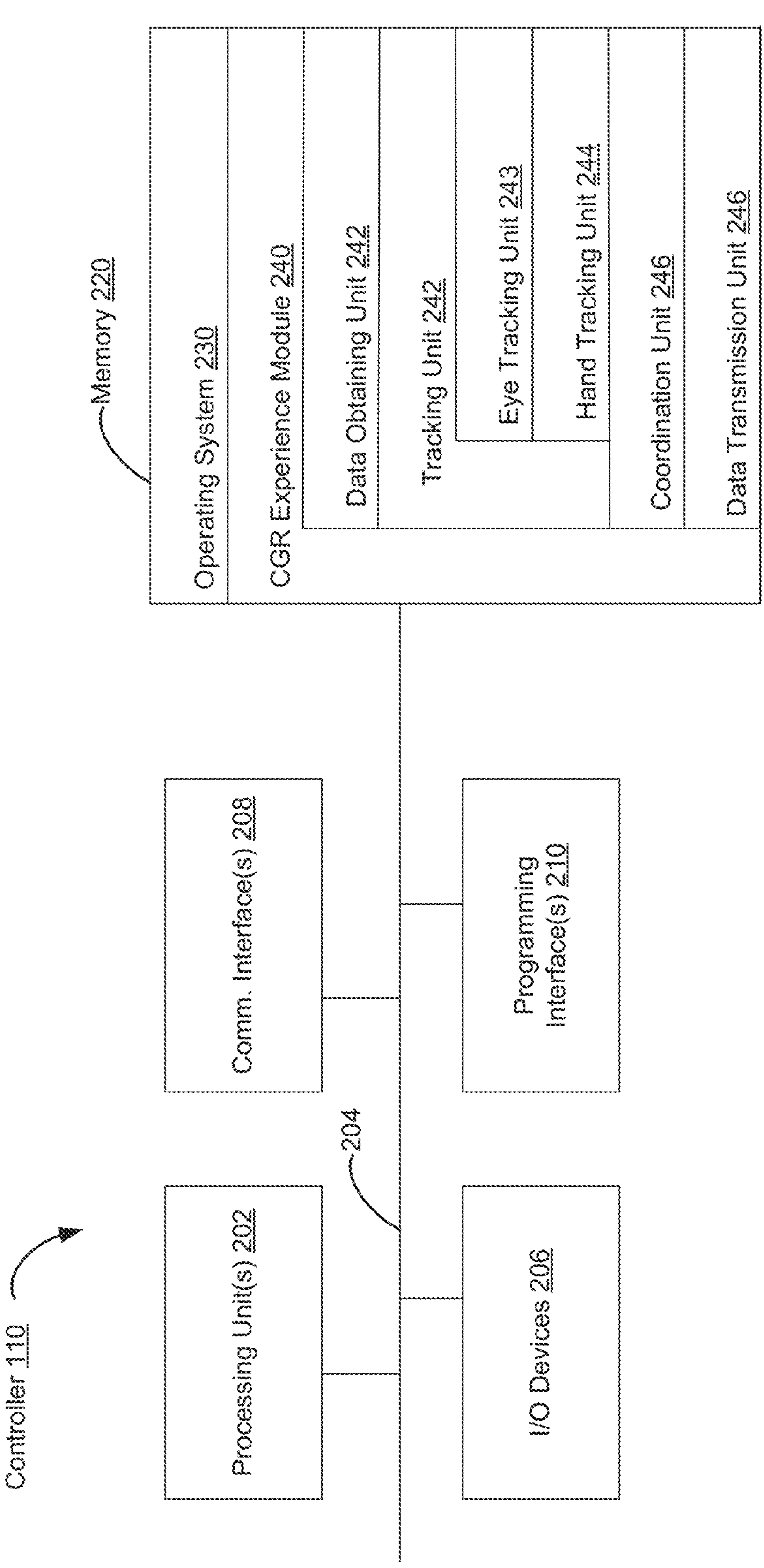
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
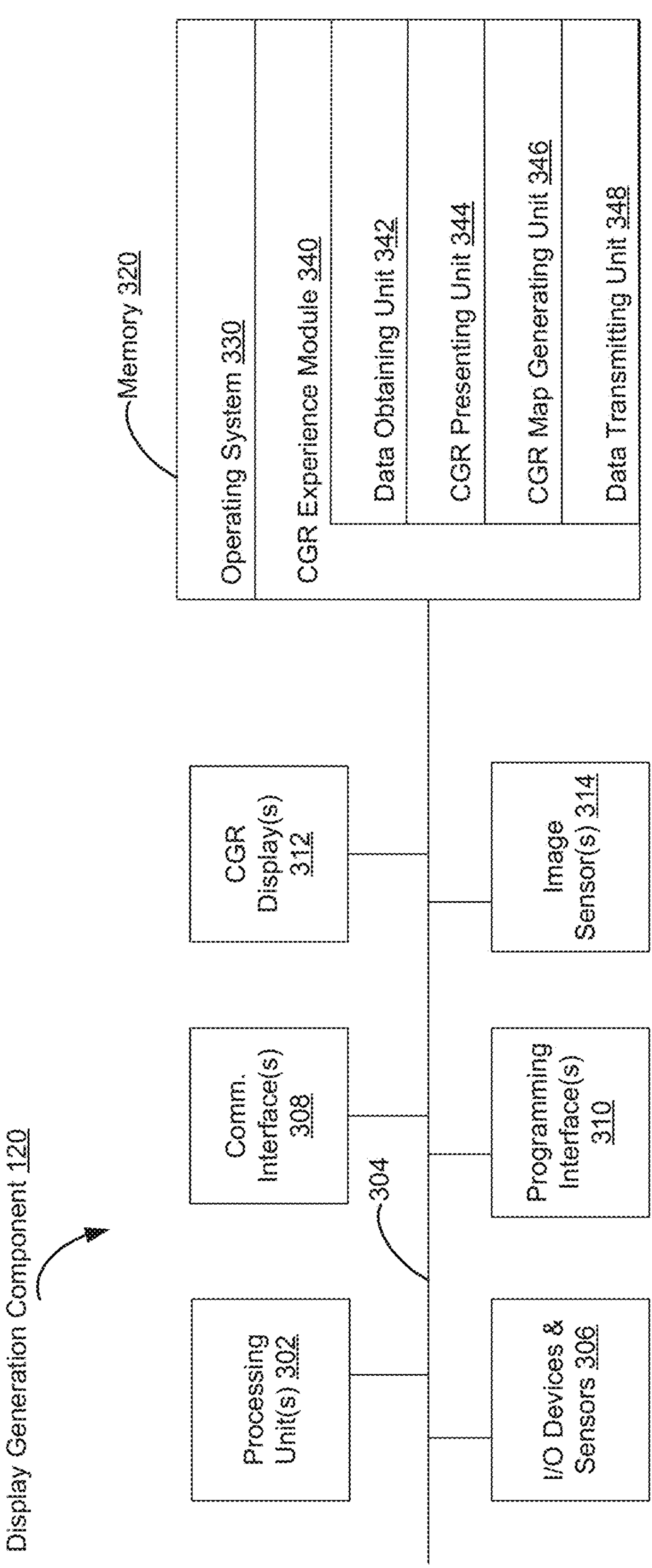
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
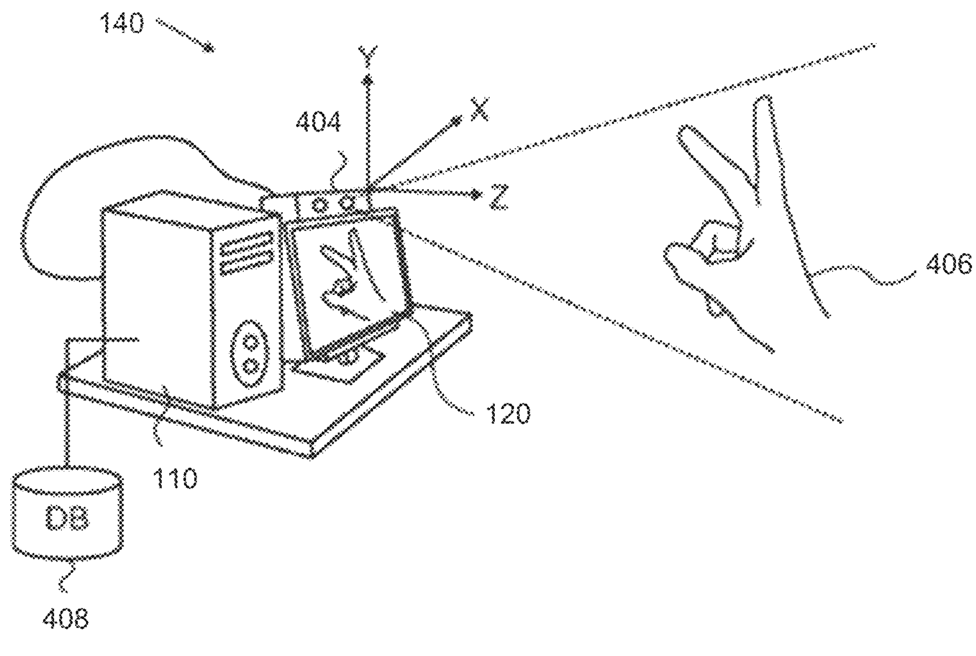
FIG. 4 is a block diagram illustrating a hand tracking unit of a computer system that is configured to capture gesture inputs of the user in accordance with some embodiments.
Figure 4:
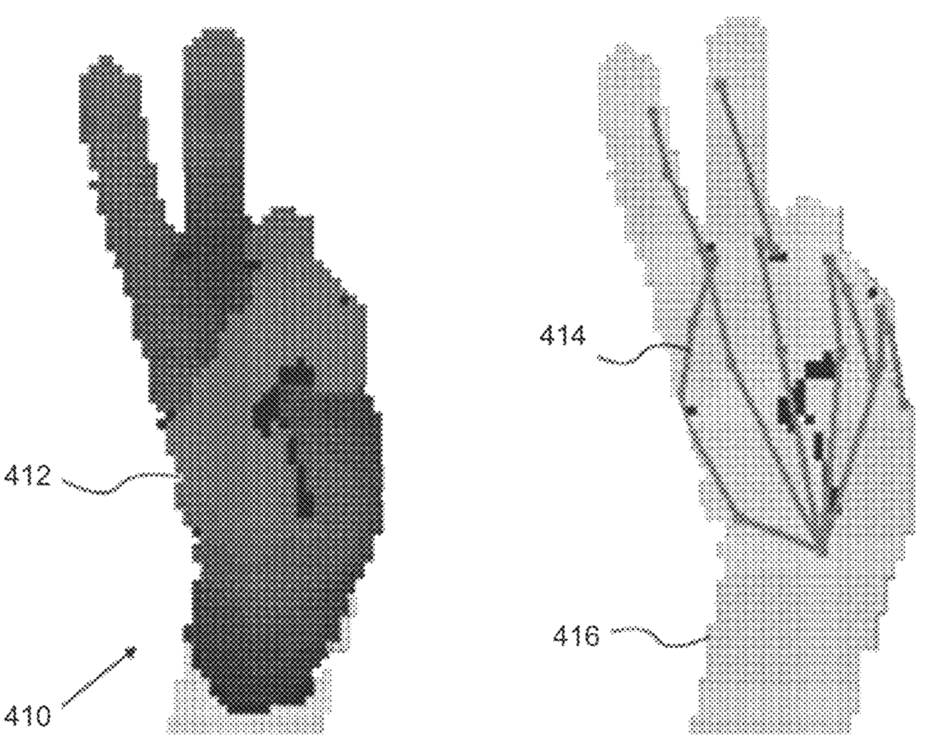

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
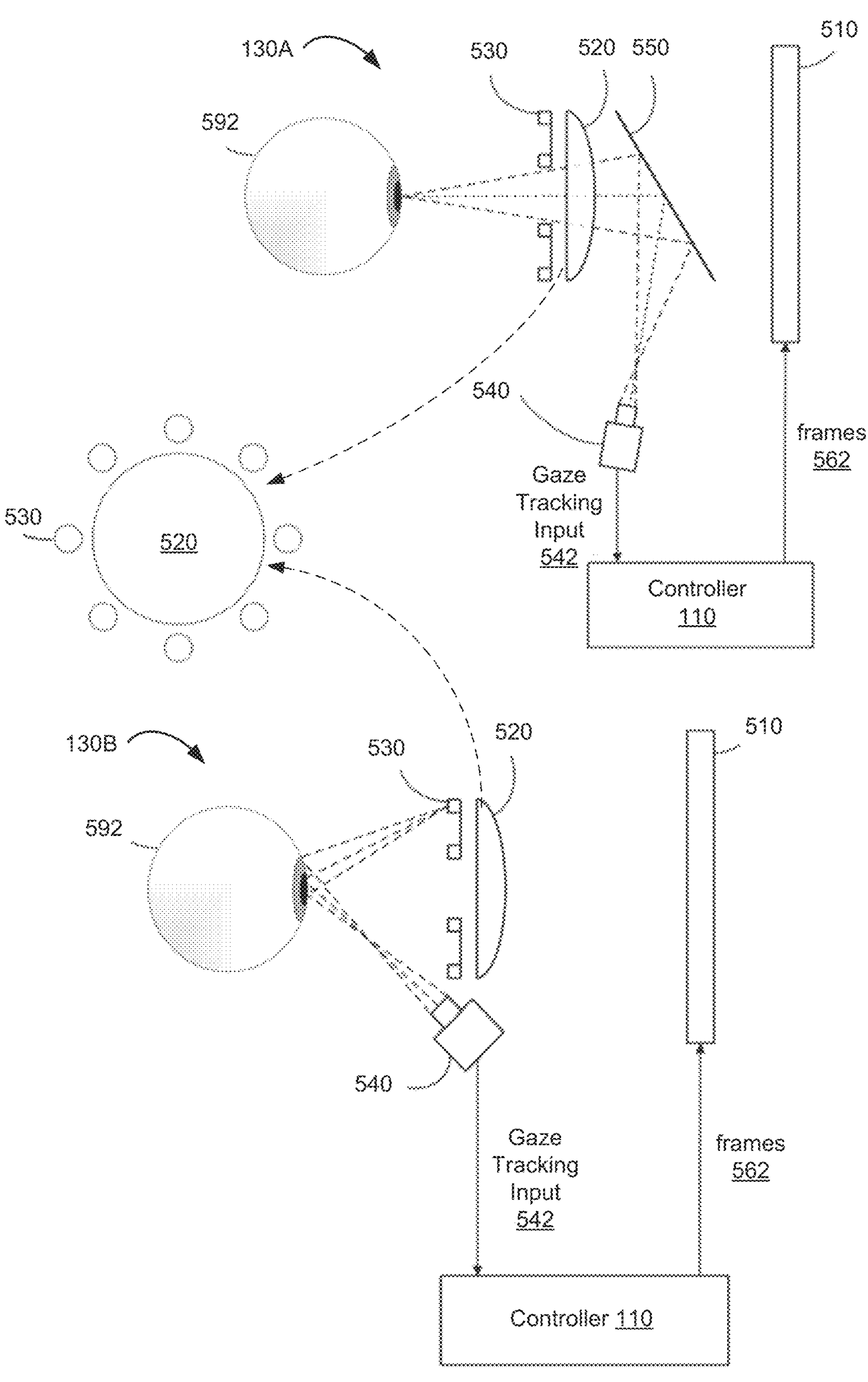
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
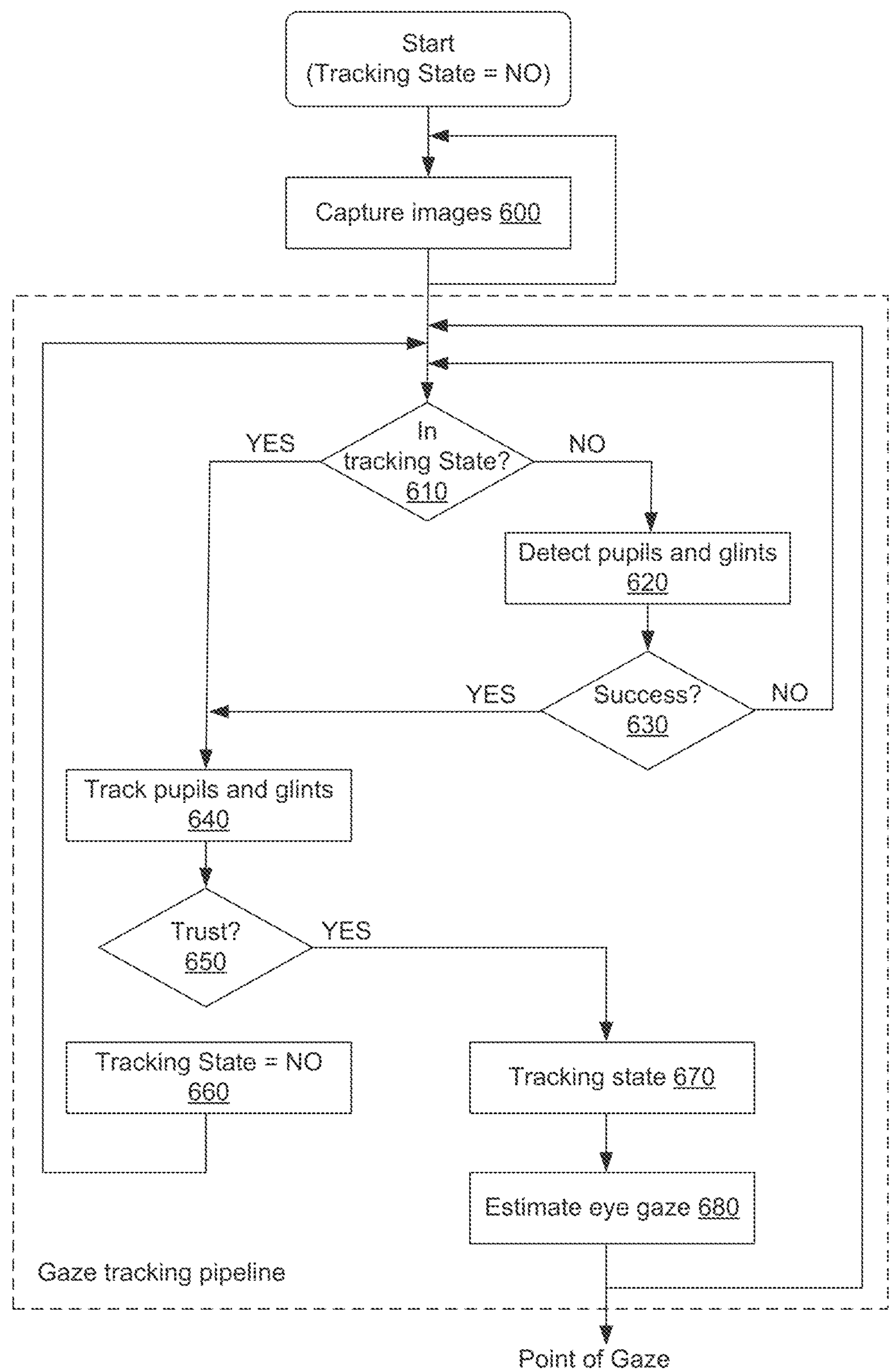
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7H illustrate examples of how a computer system generates virtual lighting effects while presenting a content item in accordance with some embodiments.

Figure 7A:
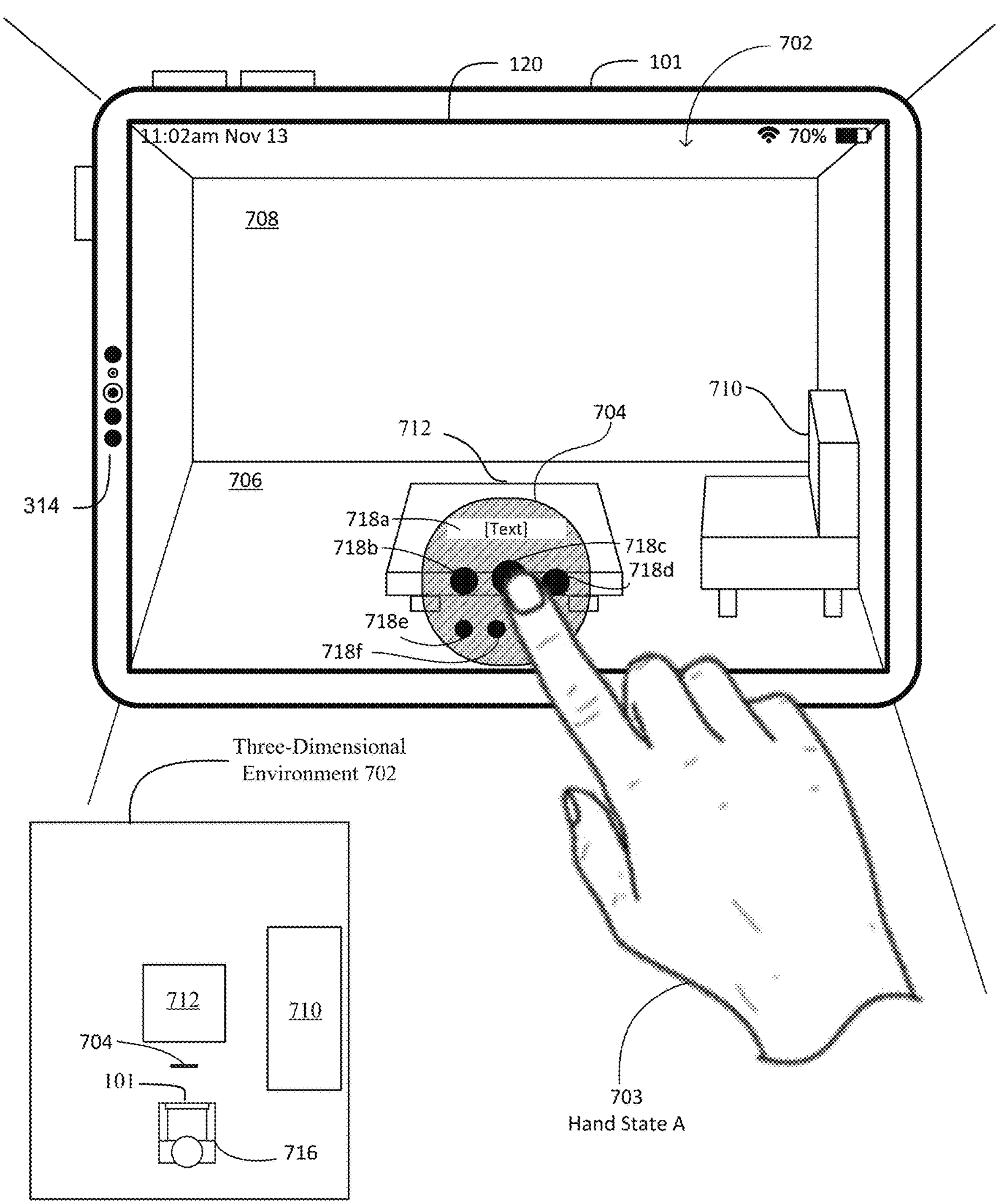
FIGS. 7A-7H illustrate examples of how a computer system generates virtual lighting effects while presenting a content item in accordance with some embodiments.
Figure 8:
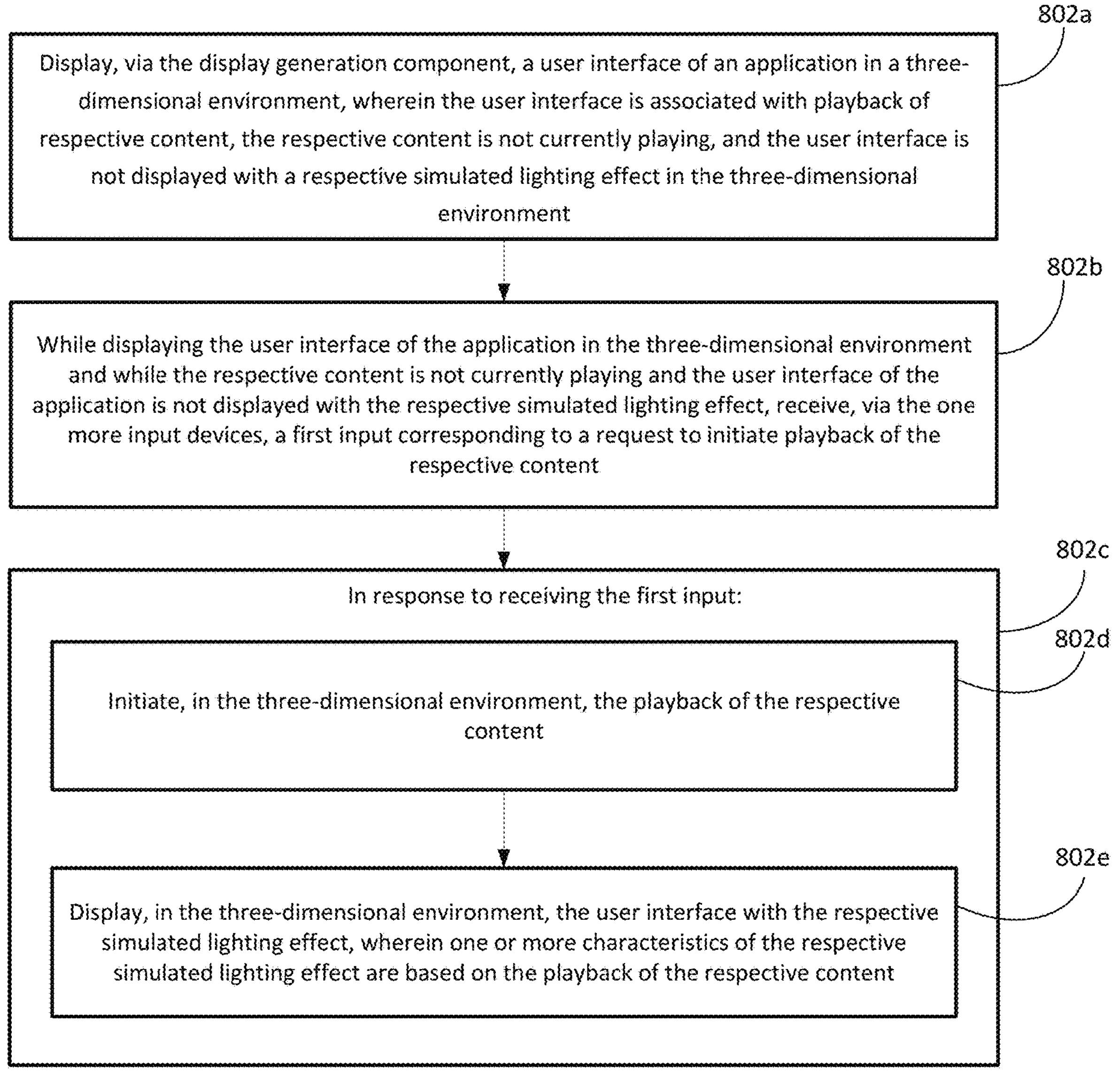
FIG. 8 is a flow diagram illustrating how a computer system generates virtual lighting effects while presenting a content item in accordance with some embodiments.

FIG. 7A illustrates a computer system (e.g., an electronic device) 101 displaying, via a display generation component (e.g., display generation component 120 of FIG. 1), a three-dimensional environment 702 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the computer system 101 is held by a user 716 in a physical environment. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In some embodiments, the computer system 101 displays user interfaces of a content (e.g., streaming, delivery, playback, browsing, library, sharing, etc.) application in the three-dimensional environment 702. In some embodiments, the content application includes a mini-player user interface (also referred to as a condensed user interface) and an expanded user interface. In some embodiments, the mini player user interface includes playback control elements that, in response to user inputs directed to the playback control elements, cause the computer system 101 to modify playback of a content item playing via the content application, and artwork (e.g., album artwork) associated with the content item currently playing via the content application. In some embodiments, the expanded user interface includes a greater number of user interface elements (e.g., containers such as windows, platters, or backplanes; selectable options, content, etc.) than the mini player user interface. In some embodiments, the expanded user interface includes a navigation element, a content browsing element, and a playback element. In some embodiments, the mini player user interface includes virtual lighting effects presented in regions of the three-dimensional environment outside of the content application user interface not included in the expanded user interface element. The mini player user interface is described in more detail below with reference to FIGS. 7A-7H and further in reference to method 800, method 1000, and method 1200 below. FIGS. 7A-7H also include a top down view of the three-dimensional environment 702, including a top down view of the user 716, the computer system 101, and other objects in the three-dimensional environment 702 (e.g., the mini player user interface 704, the table 712, and the sofa 710).

In FIG. 7A, the computer system 101 presents a three-dimensional environment 702 including virtual objects and representations of real objects. For example, the virtual objects include a mini player user interface 704 of the content application. In some embodiments, the mini player user interface 704 includes an image (e.g., album artwork) associated with a content item that is currently playing via the content application. As another example, the representations of real objects include a representation 706 of the floor in the physical environment of the computer system 101 and a representation 708 of a wall in the physical environment of the computer system 101. In some embodiments, the representations of real objects are displayed via the display generation component 120 (e.g., virtual or video passthrough) or are views of the real objects through a transparent portion of the display generation component 120 (e.g., real or optical passthrough). In some embodiments, the physical environment of the computer system 101 further includes a table and a sofa, and as such, the computer system 101 displays a representation of the table 712 and a representation of the sofa 710.

Figure 7B:
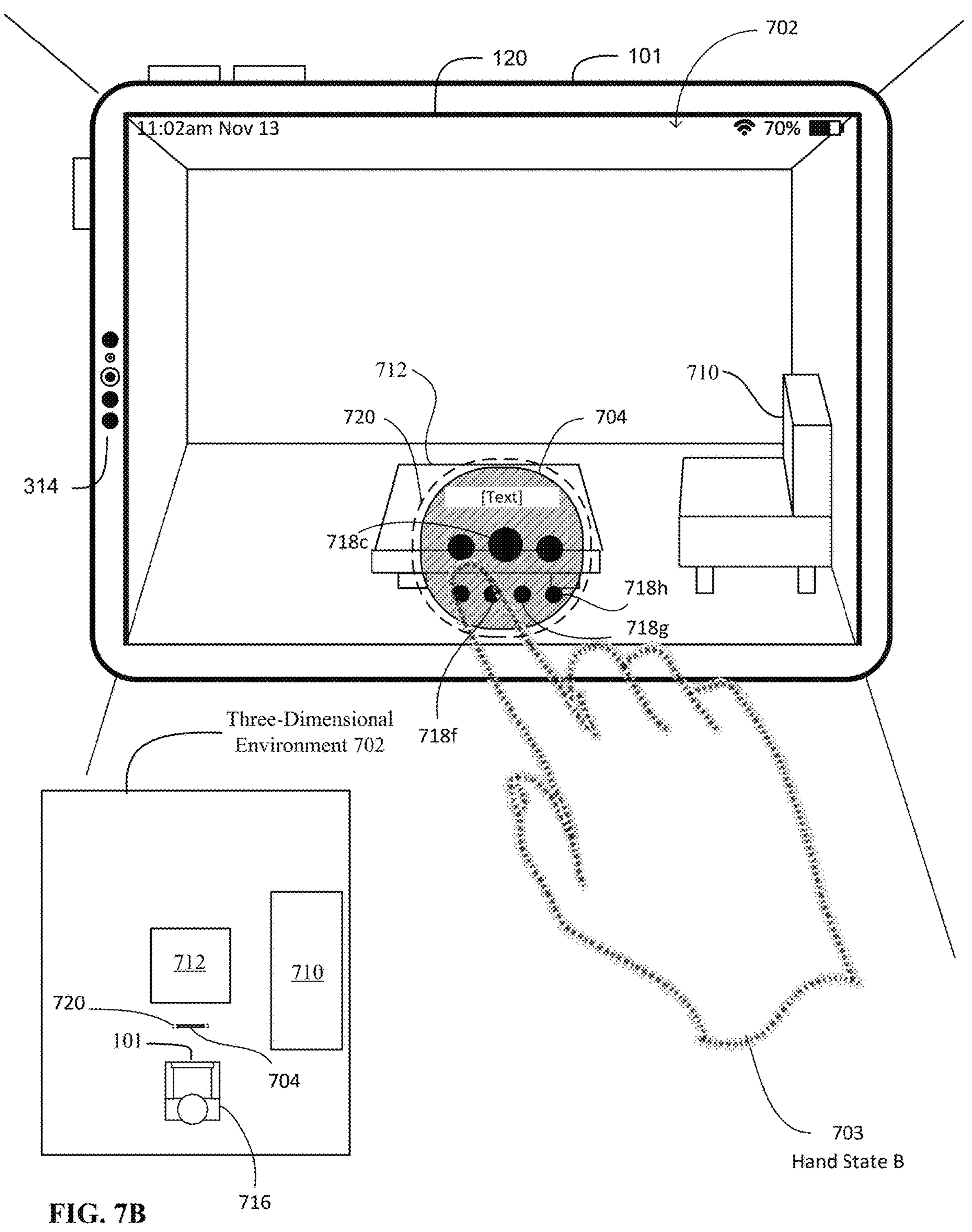
Figure 7C:
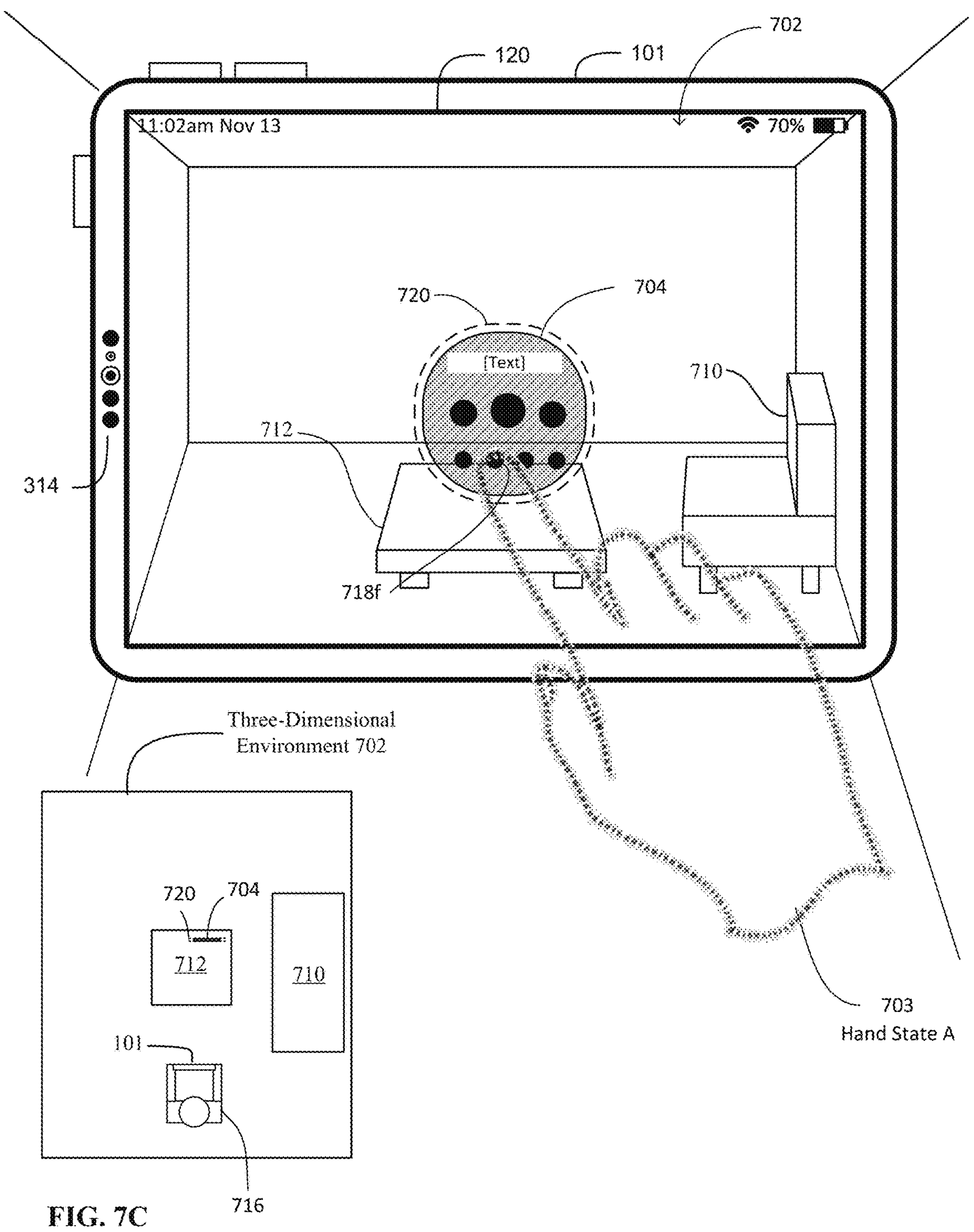
Figure 7D:
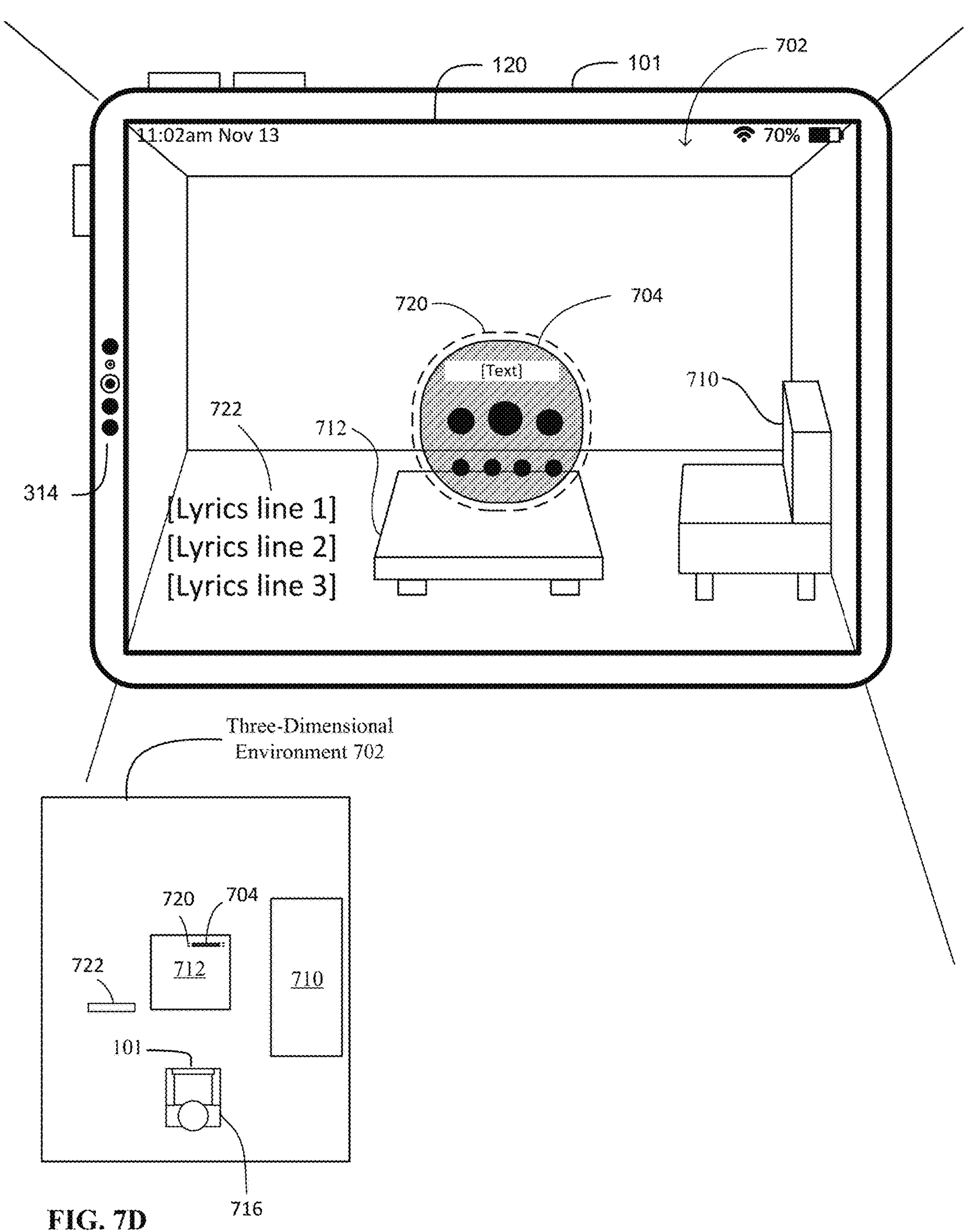

In some embodiments, the computer system 101 displays an indication 718*a* of the title and artist of the content item and a plurality of user interface elements 718*b*-718*h* for modifying playback of the content item overlaid on the image included in mini player user interface 704. User interface elements 718*g* and 718*h* are shown in FIG. 7B. In some embodiments, in response to detecting an input directed to one of the user interface elements 718*b*-718*h*, the computer system 101 modifies playback of the content item currently playing via the content application. In some embodiments, in response to detecting selection of user interface element 718*b*, the computer system 101 skips back in a content item playback queue to restart the content item that is currently playing or play a previous item in the content item playback queue. In some embodiments, in response to detecting selection of user interface element 718*c*, the computer system 101 plays the content item and updates the user interface element 718*c* to be a user interface element that, when selected, causes the computer system 101 to pause playback of the content item. As shown in FIG. 7A, a hand 703 in hand state A optionally indicates the selection of user interface element 718*c*. In some embodiments, in response to detecting selection of user interface element 718*d*, the computer system 101 ceases playback of the currently-playing content item and initiates playback of the next content item in the content item playback queue. In some embodiments, in response to detecting selection of user interface element 718*e*, the computer system 101 ceases display of the mini player user interface 704 and displays the expanded user interface described in more detail with reference to method 1000 and FIGS. 11A-11O. In some embodiments, in response to detecting selection of user interface element 718*f*, the computer system 101 displays time-synced lyrics of the content item that is currently playing, as illustrated in FIG. 7D. In some embodiments, in response to detecting selection of user interface element 718*g*, the computer system 101 presents and/or updates virtual lighting effects associated with the content item currently playing on the computer system 101, as described in more detail with reference to FIGS. 7B-H. In some embodiments, in response to detecting selection of user interface element 718*h*, the computer system 101 presents another user interface element for adjusting the playback volume of audio content of the content item and/or presents a menu of audio output options for modifying playback of the audio content.

In some embodiments, the computer system 101 detects selection of one of the user interface elements 718*b-h* by detecting an indirect selection input, a direct selection input, an air gesture selection input, or an input device selection input. In some embodiments, detecting a selection input includes first detecting a ready state corresponding to the type of selection input being detected (e.g., detecting an indirect ready state before detecting an indirect selection input, detecting a direct ready state before detecting a direct selection input). In some embodiments, detecting an indirect selection input includes detecting, via input devices 314, the gaze of the user directed to a respective user interface element while detecting the hand of the user make a selection gesture, such as an air pinch hand gesture in which the user touches their thumb to another finger of the hand. In some embodiments, detecting a direct selection input includes detecting, via input devices 314, the hand of the user make a selection air gesture, such as the air pinch gesture within a predefined threshold distance (e.g., 1, 2, 3, 5, 10, 15, or 30 centimeters) of the location of the respective user interface element or a pressing air gesture in which the hand of the user "presses" into the location of the respective user interface element while in a pointing hand shape. In some embodiments, detecting an air gesture input includes detecting the gaze of the user directed to a respective user interface element while detecting a pressing gesture into the location of an air gesture user interface element displayed in the three-dimensional environment 702 via display generation component 120. In some embodiments, detecting an input device selection includes detecting manipulation of a mechanical input device (e.g., a stylus, mouse, keyboard, trackpad, etc.) in a predefined manner corresponding to selection of a user interface element while a cursor controlled by the input device is associated with the location of the respective user interface element and/or while the gaze of the user is directed to the respective user interface element.

As shown in FIG. 7A, the computer system 101 detects selection of the selectable option 718*c* that, when selected, causes the computer system 101 to play the respective content item, as shown in FIG. 7B. The selection of the selectable option 718*c* also causes the computer system 101 to update the user interface element 718*c* to be a user interface element that, when selected, causes the computer system 101 to pause playback of the content item. Although the selection of selectable option 718*g* displays a virtual lighting effect associated with the content item, the selection of selectable option 718*c* optionally displays the virtual lighting effect associated with the content item as well as playing the respective content item. As shown in FIG. 7B, the virtual lighting effect includes simulated light rays 720 (represented by the dashed lines in FIG. 7B) that emanate from the mini player user interface 704. The simulated light rays 720 include one or more characteristics as described with reference to method 800. For example, the simulated light rays 720 optionally are two-dimensional and emanate from the backside of the mini player user interface 704. In some embodiments, the simulated light rays 720 extend 1-10 cm away from the mini player user interface 704. In some embodiments, as described in method 800, the simulated light rays 720 are synchronized with beats, volume, intensity of the bass, and/or motion in the video of the content item. In some embodiments, the distances that the simulated light rays 720 extend from the mini player user interface 704 is determined by the aforementioned factors. For example, during beat drops or more intense portions of the playback of the respective content item, the distance the simulated light rays 720 extend from the mini player user interface 704 may be greater than during quieter less intense portions of the playback of the respective content item. In some embodiments, and as described in method 800, the simulated light rays 720 are displayed with a color determined by a mood score, which is associated with the content item, and described further with reference to method 800.

FIG. 7B includes hand 703 in Hand State B which corresponds to a hand shape, pose, location, etc. that corresponds to a ready state or an input. Hand 703 is used to select mini player user interface 704 using a selection input, as discussed above, and then a dragging input to move mini player user interface 704 from a first location to a second location, as shown from FIG. 7B to FIG. 7C. The updated location of the mini player user interface 704 is shown in FIG. 7C. For example, the hand 703 may perform an air-dragging and air-releasing movement and/or an air pinching, air dragging, and air releasing movement on the mini player user interface 704 to move the mini player user interface 704 from a first location to a second location in the three-dimensional environment. In some embodiments, the second location is optionally in front of, behind, to the right, or to the left of the first location. In some embodiments, moving the mini player user interface 704 does not affect the playback of the respective content item or the display of visual lighting effects (e.g., simulated light rays 720) and lyrics 722, discussed in further detail below. Alternatively, in response to the mini player user interface 704 moving, the lyrics 722 and/or the visual lighting effects optionally ceases displaying.

In some embodiments, hand 703 selects selectable option 718*f* while the simulated light rays 720 are displayed and the content item is playing, as shown in FIG. 7C. In some embodiments, the computer system 101 detects selection of the selectable option 718*f* that, when selected, causes the computer system 101 to present time-synced lyrics associated with the content item, shown in FIG. 7D. For example, the computer system 101 detects indirect selection of option 718*f* including detecting a gaze of the user directed to the option 718*f* while detecting the hand 703 of the user make the selection gesture (e.g., Hand State A shown in FIG. 7A) and/or indirect selection of option 718*f*.

In some embodiments, in response to detecting selection of the lyrics option 718*f*, the computer system 101 updates the three-dimensional environment 702 to include time-synced lyrics 722 associated with the content item, as shown in FIG. 7D. In some embodiments and with reference to FIG. 7D, the time-synced lyrics 722 are lyrics associated with the content item currently playing via the content application of the computer system 101. The computer system 101 optionally presents a portion of the lyrics 722 corresponding to the portion of the content item currently playing on the computer system 101 via the content application and updates the portion of lyrics 722 in accordance with continued playback of the content item. In some embodiments, the lyrics 722 include a line of lyrics corresponding to the portion of the content item that is currently playing, one or more lines of lyrics corresponding to a portion of the content item prior to the portion of the content item that is currently playing, and/or one or more lines of lyrics corresponding to a portion of the content item that will play after the portion of the content item that is currently playing. As shown in FIG. 7D, the lyrics 722 are displayed outside of a boundary of and/or at a different location than the mini player user interface 704 in the three-dimensional environment 702. In some embodiments, the lyrics 722 are displayed proximate to (e.g., within 1, 2, 3, 5, 10, 15, 20, 30, or 50 centimeters or 1, 2, 3, or 5 meters of) the mini player user interface 704. In some embodiments, the lyrics 722 are displayed to the left or right of the mini player user interface 704. In some embodiments, the lyrics 722 are displayed at the same z-depth (e.g., distance) from the viewpoint of the user as the mini player user interface 704. In some embodiments, the lyrics 722 are in front of or behind the mini player user interface 704 (e.g., closer to or further from the viewpoint of the user than the mini player user interface 704), as described with reference to method 800. In some embodiments, the lyrics 722 are initially displayed with a predetermined spatial arrangement (e.g., position and/or orientation) relative to the mini player user interface 704 in three-dimensional environment 702.

FIG. 7D1 illustrates a hand 703 of the user 716 in Hand State A. Hand 703 is selecting selectable option 718*c* to pause the playback of the content item. In response to the selection of option 718*c*, the computer system 101 updates the selectable option 718*c* to show a "play" button, as shown in 7D2, such that the selection of the play button would resume the playback of the content item. In some embodiments, and as shown in FIG. 7D2, the selection of selectable option 718*c* to pause the playback of the respective content item further includes ceasing the display of the simulated lighting effect. Ceasing the display of the virtual lighting effect further includes reducing the visual prominence of the virtual lighting effects. For example, the virtual lighting effects are optionally dimmed and increasingly transparent.

Figure 7E:
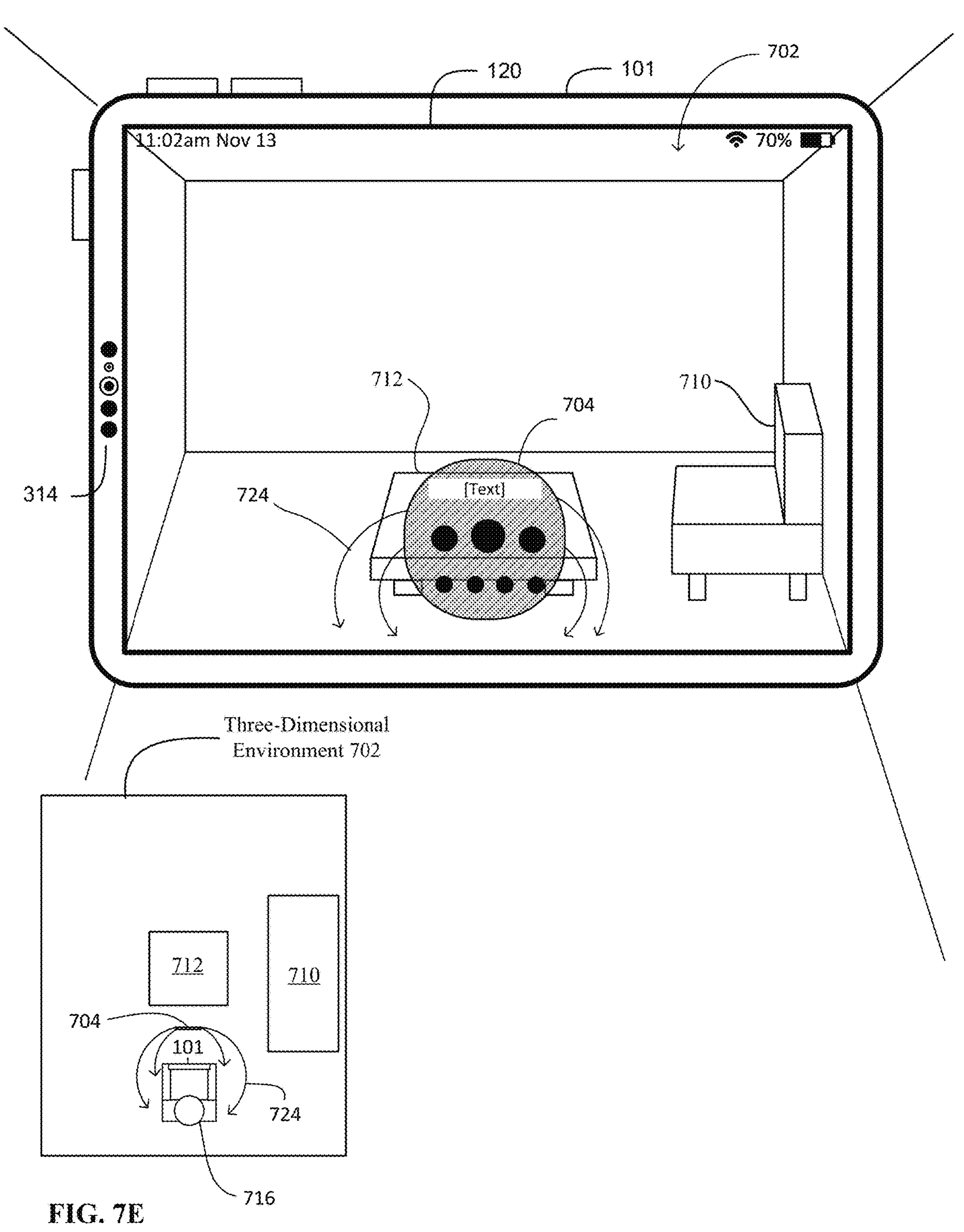

In some embodiments, hand 703 selects selectable option 718*g*, which updates and/or changes the display of the virtual lighting effects. For example, the selection of selectable option 718*g* may change the virtual lighting effects from the simulated light rays 720 shown in FIGS. 7A and 7B to a simulated three-dimensional particle effect 724, as shown in FIG. 7E. The three-dimensional particle effect 724 shown in FIG. 7E has a visual appearance similar to fireworks or circular projectiles and/or particles emanating from the sides of the mini player user interface 704 and/or from behind the mini player user interface 704, towards a location of the viewpoint of user 716, as discussed with reference to method 800, and shown in FIG. 7E. In some embodiments, the three-dimensional particle effect 724 emits virtual/simulated light into the three-dimensional environment 702. For example, the three-dimensional particle effect 724 optionally lights up/emits light onto objects in the three-dimensional environment such as the table 712 and/or sofa 710. In some embodiments, the three-dimensional particle effect 724 includes colors and animations corresponding to the respective content item, similar to the simulated light rays 720. For example, the mood score, discussed further in method 800, and/or the image associated with the respective content item affects the color of the three-dimensional particle effect 724. Additionally, beats, volume, intensity of the bass, and/or motion in the video of the content item optionally affects the display of the three-dimensional particle effect 724. For example, during bass drops, louder, and/or more intense portions of the playback of the respective content item, the three-dimensional particle effect 724 is optionally larger as compared to less intense portions of the playback of the respective content item.

Figure 7F:
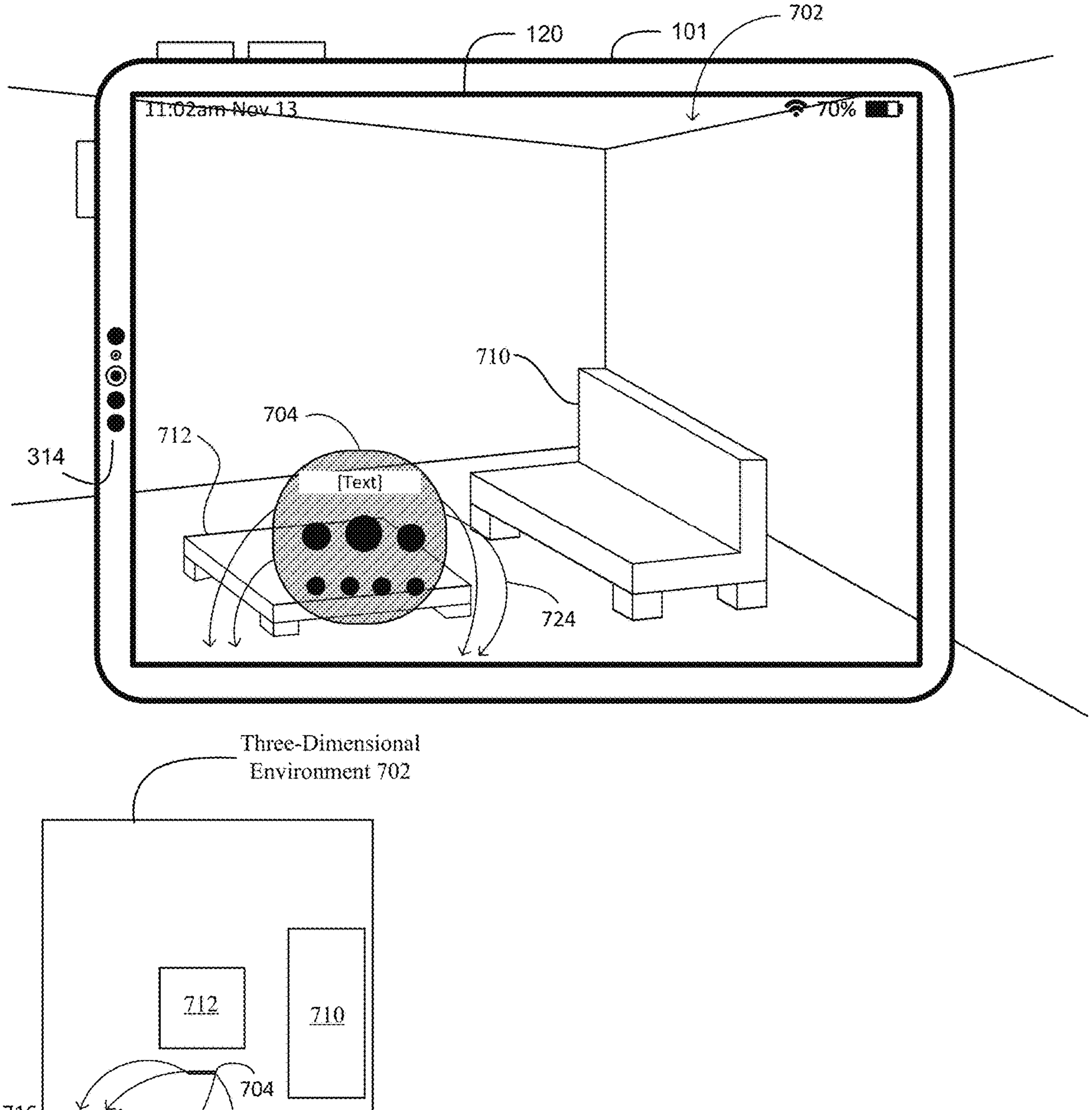
Figure 7G:
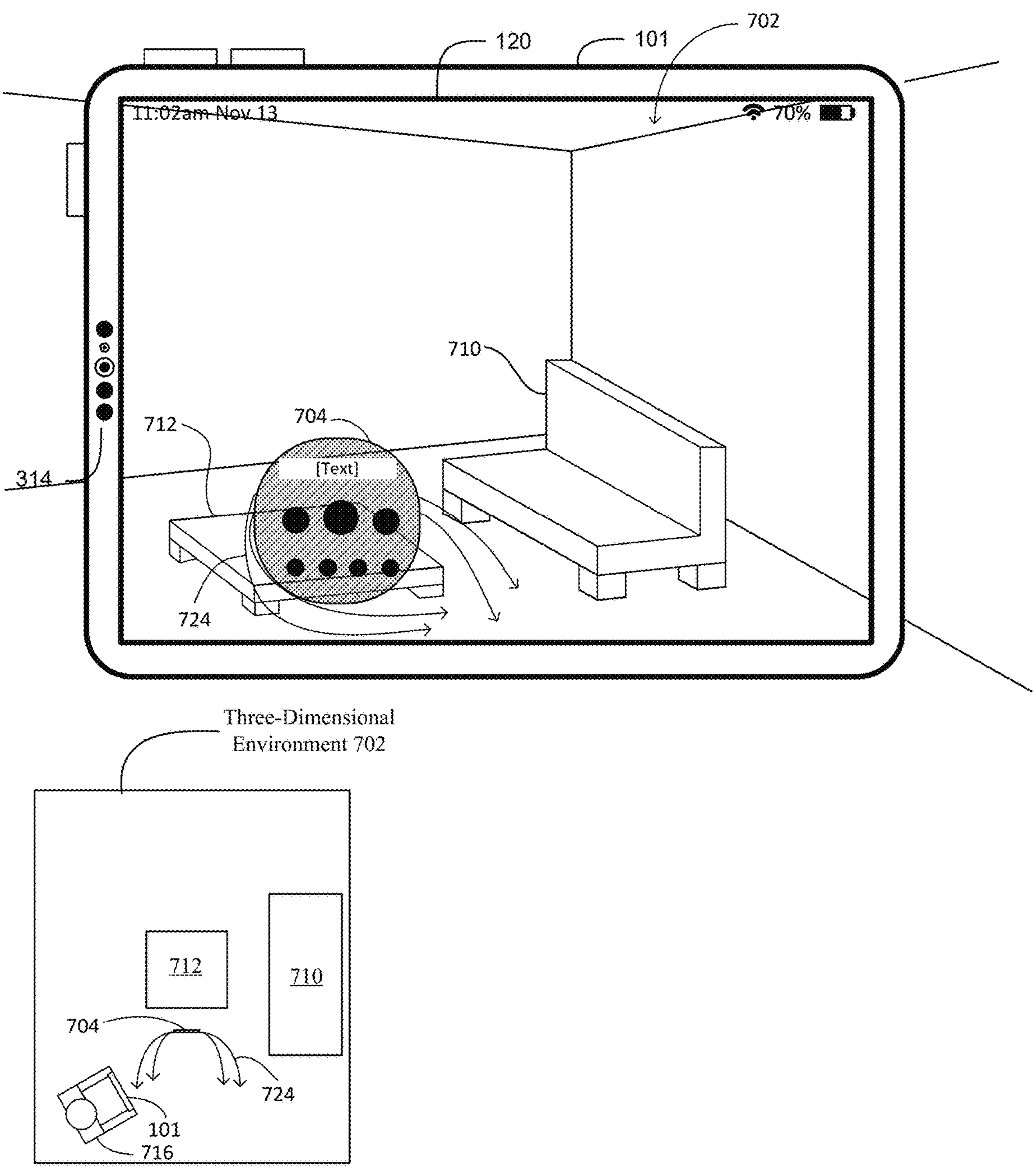

FIGS. 7F and 7G illustrate examples of how the computer system 101 updates the three-dimensional environment 702 and the three-dimensional particle effects 724 in response to detecting movement of the computer system 101 that causes the computer system 101 to update the viewpoint of the user in the three-dimensional environment 702 and field of view of the computer system 101. For example, the user 716 walks around the physical environment to a different location. As a result, in some embodiments, the computer system 101 updates the view of the mini player user interface 704 (e.g., the angle from which mini player user interface 704 is displayed) in three-dimensional environment 702 in response to the updated viewpoint of the user. For example, the mini player user interface 704 is shown at a different angle to account for the updated viewpoint. However, the mini player user interface 704 optionally remains in the same location in the three-dimensional environment and does not update locations in response to the movement of the computer system 101. In some embodiments, updating the field of view of the computer system 101 and viewpoint of the user also causes the computer system 101 to display representations of the table 712 and sofa 710 in the physical environment of the computer system 101 from a different view corresponding to the updated viewpoint of the user.

In some embodiments, and as shown in FIG. 7F, the three-dimensional particle effects 724 follow the viewpoint of the user 716. In some embodiments, the three-dimensional particle effects 724 change directions such that they are moving towards the updated viewpoint of the user 716, as described with reference to method 800. For example, the computer system 101 changes the direction and/or speed of the particle effects 724 to move from the mini player user interface 704 towards the new location of the viewpoint of the user 716. For example, FIG. 7F shows the viewpoint of the user 716 moving to the left and in response to the viewpoint moving, the three-dimensional particle effects 724 are updated to continue to point and/or move towards the viewpoint of the user 716.

Alternatively and in some embodiments, the three-dimensional particle effects 724 are displayed independently of the viewpoint of the user 716. As shown in FIG. 7G, the three-dimensional particle effects 724 are window-centric and are not affected as a result of the viewpoint of the user 716 changing (e.g., the viewpoint of the user 716 in FIG. 7G is optionally the same as the viewpoint of the user 716 in FIG. 7F). The one or more characteristics of the three-dimensional particle effects 724 (e.g., color, brightness, saturation, size, and/or direction) remain the same in response to the viewpoint of the user changing from FIG. 7E to 7G.

Figure 7H:
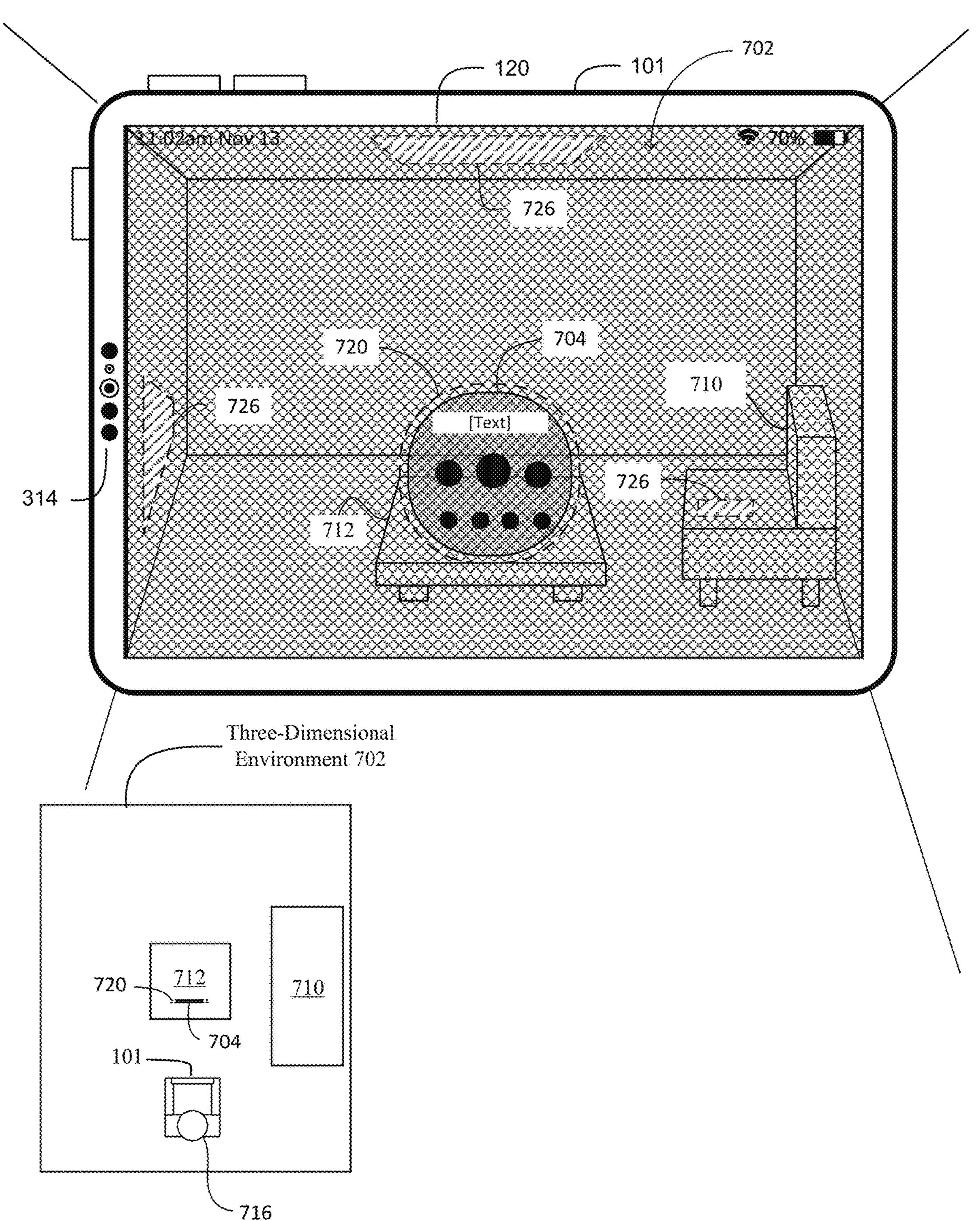

In some embodiments, the virtual lighting effects (e.g., simulated light rays 720 and/or three-dimensional particle effects 724) include a virtual light spill 726 displayed on surfaces in the three-dimensional environment 702. For example, the virtual light spill is displayed on surfaces of table 712, sofa 710, and walls, such as shown in FIG. 7H. In some embodiments, the virtual light spill simulates light emanating from the mini player user interface 704 that includes colors corresponding to the image associated with the currently-playing content item and/or the virtual lighting effects. In some embodiments, the virtual light spill is animated (e.g., flickers, changes intensities and/or colors) in a manner corresponding to the virtual lighting effect, such as a beat of audio content of the content item currently playing via the content application. In some embodiments, both simulated light rays 720 and three-dimensional particle effects 724 include the virtual light spill. In some embodiments, if the virtual lighting effect is a threshold distance (e.g., 1, 2, 3, 5, or 10 meters) away from a surface, a virtual light spill 726 is not shown on that surface. As shown in FIG. 7H, in some embodiments, the computer system 101 displays the virtual light spill 726 on representations of real surfaces in the three-dimensional environment 702. In some embodiments, the computer system 101 also displays the virtual light spill 726 on virtual objects in the three-dimensional environment 702 (e.g., user interfaces of other applications, representations of users, etc.). In some embodiments, displaying the virtual lighting effects includes dimming and/or blurring portions of the three-dimensional environment 702 that do not include the mini player user interface 704 and/or the virtual lighting effects, such as shown in FIG. 7H. In some embodiments, and as shown in FIG. 7H, the virtual light spill 726 is shown on surfaces in the three-dimensional environment 702 in response to a dimly lit environment. In some embodiments, the virtual light spill 726 appears on surfaces in the three-dimensional environment 702 when the dimness of the environment reaches a threshold value (e.g., is below a threshold brightness, such as 1 lumen, 10 lumens, 25 lumens, 100 lumens, 500 lumens, or 1000 lumens). In some embodiments, the virtual light spill 726 stops being displayed when the playback of the content item is stopped and/or paused. For example, an input (such as hand 703 in Hand State A) pauses the playback of the content item by selecting option 718*c*, and as a result of the input, the virtual light spill 726 stops being displayed.

Additional or alternative details regarding the embodiments illustrated in FIGS. 7A-7H are provided below in description of method 800 described with reference to FIG. 8.

FIG. 8 depicts a flowchart illustrating an exemplary method 800 of how a computer system generates virtual lighting effects while presenting a content item in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector), and one or more cameras (e.g., one or more cameras that point forward from the user's head or that point downward at a user's hand, such as color sensors, infrared sensors, and other depth-sensing cameras). In some embodiments, the method 800 is governed by instructions that are stored in a non-transitory computer-readable storage medium and that are executed by one or more processors of a computer system, such as the one or more processing units 202 of computer system 101 (e.g., controller 110 in FIG. 1A). Some operations in method 800 are, optionally, combined and/or the order of some operations is, optionally, changed.

In some embodiments, method 800 is performed at a computer system in communication with a display generation component and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad)). In some embodiments, the hand tracking device is a wearable device, such as a smart glove. In some embodiments, the hand tracking device is a handheld input device, such as a remote control or stylus.

In some embodiments, the computer system (e.g., computer system 101 in FIG. 7A) displays (802*a*), via the display generation component, a user interface of an application in a three-dimensional environment, such as mini player user interface 704 in FIG. 7B (e.g., the user interface is optionally a content player user interface of a content playback application, such as a music player, a video player, and/or a podcast player application). In some embodiments, the user interface is a user interface of a mini-player of the content playback application. The content playback application is optionally associated with an expanded user interface and a mini user interface (mini-player). In some embodiments, the mini-player is configured to display a condensed user interface of the content playback application. In some embodiments, while the mini-player is shown, the expanded user interface is optionally not shown. Additionally, while the expanded user interface is shown, the mini-player is optionally not shown. In some embodiments, the three-dimensional environment is an extended reality (XR) environment, such as a virtual reality (VR) environment, a mixed reality (MR) environment, or an augmented reality (AR) environment, and the virtual content container is displayed within the three-dimensional environment.

In some embodiments, the user interface is associated with playback of respective content, such as the playback of the content item discussed in FIG. 7B (e.g., the user interface is optionally a user interface at which the computer system detects inputs from the user of the computer system to control playback of the respective content, such as to initiate, pause and/or skip playback of the respective content). In some embodiments, the user interface includes one or more selectable controls that are selectable to play or pause the respective content, skip forward or backward through the respective content, or display lyrics concurrently with the user interface object for the respective content. The user interface has one or more of the characteristics of the user interface associated with playback of respective content described with reference to method 1200.

In some embodiments, the respective content is not currently playing (e.g., the respective content is paused or the computer system has not yet received input to play the respective content in the first instance), and the user interface is not displayed with a respective simulated lighting effect in the three-dimensional environment, such as the mini player user interface 704 shown in FIG. 7A (e.g., the user interface is displayed in the three-dimensional environment on its own without being displayed with virtual lighting effects, as will be described later).

In some embodiments, while displaying the user interface of the application in the three-dimensional environment and while the respective content is not currently playing and the user interface of the application is not displayed with the respective simulated lighting effect, the computer system receives, via the one more input devices, a first input, such as the input from hand 703 in Hand State A in FIG. 7A, corresponding to a request to initiate playback of the respective content (802*b*). In some embodiments, and discussed in greater detail hereinafter, the first input includes a user interaction with one of the selectable options included in and/or displayed concurrently with the user interface object, such as an air pinch gesture from a hand of a user of the computer system including pinching (e.g., a thumb and index finger of the hand of the user coming together and touching), dragging (e.g., movement of the hand while the hand of the user is in a pinch hand shape), and/or releasing (e.g., the hand of the user de-pinching to cause the thumb and index finger to move apart) directed to the selectable option (e.g., while attention of the user is directed to the selectable option). In other embodiments, the first input includes an user interaction of the above user interactions with a mouse, trackpad, and/or touch screen.

In some embodiments, in response to receiving the first input (802*c*), the computer system initiates (802*d*), in the three-dimensional environment, the playback of the respective content, as shown in FIG. 7B. In some embodiments, the playback of the respective content includes playback of audio (e.g., music), one or more videos, one or more podcasts, and/or one or more audiobooks.

In some embodiments, the computer system displays (802*e*), in the three-dimensional environment, the user interface with the respective simulated lighting effect, such as simulated light rays 720 in FIG. 7B and/or the three-dimensional particle effect 724 shown in FIG. 7E, wherein one or more characteristics of the respective simulated lighting effect are based on the playback of the respective content. In some embodiment, the characteristics of the respective simulated lighting effect includes the color of the lighting effect, the movement of the lighting effect, the animation of the lighting effect, the size and/or amplitude of the lighting effect, and/or the brightness of the lighting effect. In some embodiments, displaying the user interface with the respective simulated lighting effect further includes displaying the above characteristics (e.g., movements and/or color and/or brightness changes) of the lighting effect that are synchronized with beats, volume of music, intensity of bass, and/or motion in the audio playback and/or video playback. For example, the simulated lighting effect is optionally shown around the outline or border of the user interface. In some embodiments, the characteristics of the respective simulated lighting effect are determined by an artist of the respective content. For example, the artist optionally selects hue, saturation, and/or brightness that corresponds to the respective content. Displaying a user interface with simulated lighting effects depending on the playback of corresponding content reduces resources needed for displaying the simulated lighting effects when the corresponding content is not being played and reduces the need for manual inputs to enable and/or disable the simulated lighting effects manually.

In some embodiments, while displaying the user interface at a first location in the three-dimensional environment (e.g., and while displaying, via the display generation component the respective simulated lighting effect in the three-dimensional environment), the computer system receives, via the one or more input devices, a second input corresponding to a request to move the user interface in the three-dimensional environment, such as an input by hand 706*b* on the mini player user interface 704 shown in FIG. 7B. For example, the second input includes a user interaction with one of the selectable options included in and/or displayed concurrently with the user interface object, and/or interaction with the user interface itself, such as an air pinch gesture from a hand of a user of the computer system including pinching (e.g., a thumb and index finger of the hand of the user coming together and touching), dragging (e.g., movement of the hand while the hand of the user is in a pinch hand shape), and/or releasing (e.g., the hand of the user de-pinching to cause the thumb and index finger to move apart) directed to the selectable option (e.g., while attention of the user is directed to the selectable option) and/or the user interface. In some embodiments, the second input includes input from a mouse, trackpad, and/or touch screen.

In some embodiments, in response to receiving the second input, the computer system moves the user interface from the first location to a second location in the three-dimensional environment, as shown with mini player user interface 704 moving between FIG. 7B and FIG. 7C. For example, moving the user interface from the first location to the second location also includes moving the respective simulated lighting effect from the first location to the second location in the three-dimensional environment. In some embodiments, the user interface is a free-floating entity wherein the movement of the user interface does not affect the other objects in the three-dimensional environment. Updating the location of the user interface of the application in response to an input corresponding to a request to move the user interface allows for efficient access to the user interface thereby reducing resources needed to display the user interface and reduces likelihood of erroneous inputs directed to the user interface.

In some embodiments, the user interface of the application includes an image corresponding to the respective content, such as if mini player user interface 704 in FIG. 7A included an image corresponding to the content. For example, the image includes an album cover of a music album (e.g., the respective content is a song included in a music album, and the user interface includes the image of that album). In some embodiments, the colors of the respective simulated lighting effects are based on the colors of the image. Displaying a user interface with an image corresponding to the respective content provides feedback about the respective content being played, thereby reducing the number of inputs needed to retrieve additional information relating to the respective content.

In some embodiments, while displaying the user interface of the application without displaying a representation of lyrics corresponding to the respective content in the three-dimensional environment, the computer system receives, via the one or more input devices, an input corresponding to a request to present lyrics corresponding to the respective content, such an input by hand 703 on option **718*f* in FIG. 7**B. In some embodiments, the input includes selection of a selectable option displayed in the user interface. In some embodiments, the selectable option is not displayed unless and until the pose of a respective portion of the user satisfies one or more criteria. In some embodiments, the pose of the hand of the user satisfies the one or more criteria when the hand of the user is within a field of view of a hand tracking device in communication with the computer system. In some embodiments, the pose of the hand of the user satisfies the one or more criteria when the hand of the user is within a predetermined area of the three-dimensional environment, such as being raised relative to the rest of the body of the user (e.g., by a threshold amount). In some embodiments, the pose of the hand of the user satisfies the one or more criteria when the hand of the user is in a pose corresponding to the ready state of the computer system corresponding to the beginning of an input provided by the hand of the user, such as a pointing hand shape (e.g., in which one or more fingers are extended and one or more fingers are curled to the palm) or pre-pinch hand shape (e.g., a hand shape in which the thumb is within a predetermined threshold distance (e.g., 0.1, 0.2, 0.3, 0.5, 1, 2, 3, etc. centimeters) of another finger of the hand without touching the finger). In some embodiments, the pose of the hand does not satisfy the one or more criteria when the hand is not detected by the hand tracking device.

In some embodiments in response to receiving the input corresponding to the request to present the lyrics, the computer system concurrently displays, in the three-dimensional environment, the user interface of the application and the representation of the lyrics corresponding to the respective content, wherein the representation of the lyrics (e.g., lyrics 722 in FIG. 7C) is displayed at a location in the three-dimensional environment that has a predefined spatial arrangement relative to the user interface of the application, such as the lyrics 722 shown proximal to the mini player user interface 704 in FIG. 7C. In some embodiments, the representation of the lyrics is positioned outside of a boundary of the user interface of the application. The representation of the lyrics is optionally positioned to the left, right, top, or bottom of the user interface of the application. In some embodiments, the representation of the lyrics is displayed at the same or a different distance from the viewpoint of the user as the user interface. In some embodiments, the representation of the lyrics are initially displayed at a predetermined spatial arrangement relative to the user interface in response to the input (e.g., above, below, to the left, or to the right of, optionally at the same or different distance from the viewpoint of the user as the user interface). In some embodiments, the spatial relationship between the user interface and the representation of the lyrics changes in response to a user input directed at the representation of the lyrics and/or the user interface. In some embodiments, the representation of the lyrics includes a time synchronized representation of lyrics corresponding to a portion of the respective content that is currently playing. In some embodiments, as the respective content continues to play, the representation of the lyrics updates to include a representation of the lyrics corresponding to the portion of the respective content that is currently playing. In some embodiments, the representation of the lyrics has one or more characteristics of the lyrics described with reference to method 1200. Displaying a representation of lyrics corresponding to the respective content at a predefined spatial relationship relative to the user interface provides an efficient way of viewing the lyrics and ensures the lyrics are visible without the need for further input from the user, thereby improving user-device interaction.

In some embodiments, the respective simulated lighting effect includes one or more simulated light rays emanating from the user interface of the application, such as the simulated light rays 720 shown in FIG. 7B-7D. In some embodiments, the simulated light rays are two-dimensional as opposed to volumetric. In some embodiments, the simulated light rays are volumetric. In some embodiments, the generation of the respective simulated lighting effects is timed with the beat or transition of the respective content. In some embodiments, the respective simulated light rays cast virtual light onto the user interface and/or other parts of the three-dimensional environment outside of the user interface. In some embodiments, the virtually cast light has various characteristics corresponding to the characteristics of the simulated light rays. For example, the virtually cast light has the same color characteristic as the simulated light rays. Displaying simulated light rays emanating from the user interface of the application provides feedback about the source of the content that is being played, thereby lowering the likelihood of erroneous interactions with the device.

In some embodiments, displaying the one or more simulated light rays further includes displaying a color of the one or more simulated light rays determined by a mood score, such as if simulated light rays 720 in FIG. 7D was a color (e.g., red, blue, or fuchsia). In some embodiments, the mood score is pre-defined in a database accessible to the computer system. Moods optionally include calm, exciting, positive, or negative. In some embodiments, the moods are a combination of the above. In some embodiments, each mood, determined by the mood score, is associated with a different color. For example, a calm positive mood is associated with blue, while an aggressive mood is associated with red. Alternatively and in some embodiments, the color of the simulated light rays is dependent on the image corresponding to the respective content. For example, an image with a fuchsia background results in a fuchsia color for the simulated light rays, and an image with a red background results in a red color for the simulated light rays. In some embodiments, the color of the simulated light rays is intensified if the image is not sufficiently salient. In some embodiments, sufficiently salient is based on saturation and brightness of color. For example, magenta optionally becomes red because the brightness and saturation of magenta is low. In some embodiments, the color of the image is assigned a value based on the salience of the color and compared against predetermined threshold values to determine whether to use the image color or a mood color. For example, a grey or white image color would not meet the predetermined threshold value. For example, a grey image color has a value of 12 and the threshold value is 50. In some embodiments, the predetermined threshold value is 25, 50, 100, or 1000. In some embodiments, environmental characteristics determine the brightness and/or final color of the simulated light rays. In some embodiments, environmental characteristics include the brightness and color of the three-dimensional environment. For example, in a dim environment, the simulated light rays are optionally dimmer than if the environment was bright. Displaying the simulated light rays with a color determined by a mood score enables the computer system better align the simulated lighting effect to the content, thereby reducing the need for additional inputs from the user to change and/or correct the lighting effects.

In some embodiments, the mood score is associated with the respective content, such as if the mood score is associated with the content item discussed in FIG. 7A. For example, the mood score is optionally predefined in a database for each respective content, and is optionally different for different content items. In some embodiments, an owner or creator of the respective content defines or updates the mood score. Associating the mood score with the respective content allows for an efficient way to determine a color of the respective simulated lighting effect without the need for user input, and also provides clear feedback that different content items are currently playing at the device, thereby reducing resources needed to determine a color.

In some embodiments, while displaying, in the three-dimensional environment, the user interface with the respective simulated lighting effect and while playback of the respective content is ongoing, the computer system receives, via the one or more input devices, an input corresponding to a request to cease the playback of the respective content, such as an input by hand 703 on option **718*c* in FIG. 7D1**. In some embodiments, the input includes selection of a selectable option displayed in the user interface, as described above. In some embodiments, the selectable option is not displayed unless and until the pose of a respective portion of the user satisfies one or more criteria as described above. A request to cease the playback of the respective content optionally includes a request to pause the playback of the respective content or a request to close the user interface and cease playing and/or displaying the respective content.

In some embodiments, in response to receiving the input corresponding to the request to cease the playback of the respective content, the computer system ceases the playback of the respective content and reduces a visual prominence of the respective simulated lighting effect displayed with the user interface of the application, as shown by the mini player user interface 704 no longer displayed with simulated light rays 720 in FIG. 7D2. In some embodiments, visual prominence includes brightness, size, color saturation, and/or transparency. In some embodiments, reducing the visual prominence includes dimming the simulated lighting effect. Dimming the simulated lighting effect optionally includes turning the simulated lighting effect transparent. In some embodiments, reducing the visual prominence includes making the simulated lighting effect smaller in the three-dimensional environment. For example, the simulated lighting effect extends 3 cm away from the user interface. Reducing the visual prominence optionally includes shrinking the simulated lighting effect to extend 0-1 cm away from the user interface. In some embodiments, reducing the visual prominence includes changing the color value of the simulated lighting effect to be below the threshold value, as described above. For example, a sufficiently salient color (e.g., magenta) becomes an insufficiently salient color (e.g., red) to reduce the visual prominence. In some embodiments, reducing the visual prominence includes reducing the saturation and/or increasing the transparency of the simulated lighting effect. In some embodiments, reducing a visual prominence of the respective lighting effect includes dissipating and/or increasing a transparency of (e.g. not showing) the respective lighting effect. Reducing a visual prominence of the respective simulated lighting effect as a result of a request to cease the playback of the respective content reduces the visual distractions to the user until the user provides another input, and reduces clutter in the three-dimensional environment, thereby reducing errors in interactions with the computer system.

In some embodiments, displaying, in the three-dimensional environment, the user interface with the respective simulated lighting effect includes displaying the respective simulated lighting effect as including a simulated three-dimensional particle effect, such as the three-dimensional particle effects 724 in FIG. 7E. In some embodiments, the simulated three-dimensional particle effect looks like fireworks or circular projectiles. In some embodiments, the simulated three-dimensional particle effect is shown on and/or as emanating from the sides of the user interface. In some embodiments, the simulated three-dimensional particle effect is shown as bursting and/or emanating from the center of the user interface. Displaying the simulated three-dimensional particle effect enables the computer system to provide better feedback about the source of the playback of the content, thereby lowering the likelihood of erroneous interactions with the computer system.

In some embodiments, the computer system displays the simulated three-dimensional particle effect including displaying an animation of the simulated three-dimensional particle effect moving from a location of the user interface in the three-dimensional environment towards a location of a viewpoint of a user of the computer system, such as the three-dimensional particle effects 724 surrounding user 716 in FIG. 7E. For example, the simulated three-dimensional particles are flying around and/or towards the viewpoint of the user. In some embodiments, the simulated three-dimensional particle effect encompasses the viewpoint of the user, such that the effect is formed and/or exists in a sphere around the viewpoint of the user. In some embodiments, the computer system detects movement of the viewpoint of the user to a new location in the three-dimensional environment and/or relative to the user interface, and in response to the movement, changes the animation of the particle effect. For example, the computer system changes the direction and/or speed of the particles to move from the user interface towards the new location of the viewpoint of the user. In some embodiments, the three-dimensional particle effects include simulated particles that, as part of their animation, change in distance from the viewpoint of the user (e.g., get closer to the viewpoint of the user as part of their animation), whereas the user interface does not change in distance relative to the viewpoint of the user (optionally absent user input for changing such distance). Directing the simulated three-dimensional particle effect towards a location of a viewpoint of a user of the computer system enables the computer system to improve directionality feedback for the source of playback of the content.

In some embodiments, a color of the simulated three-dimensional particle effect is determined using a mood score, such as if the three-dimensional particle effects 724 were colored as determined by a mood score in FIGS. 7E-7G. The mood score is described above. Displaying the simulated light rays with a color determined by a mood score enables the computer system to better align the simulated lighting effect to the content, thereby reducing the need for additional inputs from the user to change and/or correct the lighting effects.

In some embodiments, the computer system displays the respective simulated lighting effect independently of a location of a viewpoint of the user in the three-dimensional environment, such as shown by the three-dimensional particle effects 724 continuing to fly forward even as the position of the viewpoint of the user 716 has changed in FIG. 7G. For example, the respective simulated lighting effect is window-centric and the position of the viewpoint of the user is irrelevant to the location of the object or the simulated lighting effect. For example, the brightness, saturation, size, and/or direction in which the respective simulated lighting effect emanates are not affected by the location of the viewpoint. Displaying the respective simulated lighting effect independent of a location of a viewpoint of the user in the three-dimensional environment increases consistency of the presentation of feedback in the three-dimensional environment, thereby reducing errors in usage and improving user-device interaction.

In some embodiments, while displaying, in the three-dimensional environment, the user interface with the respective simulated lighting effect and while a viewpoint of a user of the computer system has a first spatial arrangement (e.g., position and/or orientation) relative to the user interface, such as shown in FIG. 7E, the computer system receives, via the one or more input devices, an input corresponding to a movement of the viewpoint of the user of the computer system to have a second spatial arrangement, different from the first spatial arrangement, relative to the user interface in the three-dimensional environment, such as shown by the movement of user 716 between FIGS. 7E and 7F. In some embodiments, the viewpoint of the user moves in accordance with movement of the user and/or movement of the computer system and/or display generation component in a physical environment of the computer system and/or display generation component (e.g., the direction and/or magnitude of the change in the viewpoint correspond to the direction and/or magnitude of the movement of the user in the physical environment. In some embodiments, while the viewpoint of the user is at the first location, the viewpoint of the user relative to the user interface has the first spatial arrangement.

In some embodiments, in response to receiving the input corresponding to the movement of the viewpoint of the user of the computer system, the computer system updates the display of the three-dimensional environment to be from the moved viewpoint of the user (e.g. the moved viewpoint at a second location has the second spatial arrangement relative to the user interface in the three-dimensional environment) and continues to display the user interface of the application with the respective simulated lighting effect, such as shown by the three-dimensional particle effects 724 flying towards the updated viewpoint of the user 716 in FIG. 7F. In some embodiments, when the viewpoint of the user moves around the user interface, different views of the respective lighting effect are displayed by the computer system. For example, at the first spatial arrangement, the first viewpoint is on a first side of the user interface (e.g., front). For example, at the second spatial arrangement, the moved viewpoint is on a second, different side of the user interface (e.g., opposite side of the first view point or backside). In some embodiments, the difference in orientation of the position of the first viewpoint and the moved viewpoint relative to the user interface is 1, 5, 10, 30, 45, 90, 180, 270, or 359 degrees. In some embodiments, while the computer system displays the respective simulated lighting effect from different viewing angles while the viewpoint of the user changes, one or more or all of the characteristics of the respective simulated lighting effect remains the same in the three-dimensional environment. For example, the color of the lighting effect, the movement of the lighting effect, the animation of the lighting effect, the size and/or amplitude of the lighting effect, and/or the brightness of the lighting effect remain the same. Allowing the user to view different spatial arrangements in the three-dimensional environment enables consistency of the presentation of feedback in the three-dimensional environment, thereby reducing errors in usage and improving user-device interaction.

FIGS. 9A-9E illustrate examples of how a computer system generates an animated three-dimensional object while presenting a content item in accordance with some embodiments.

Figure 9A:
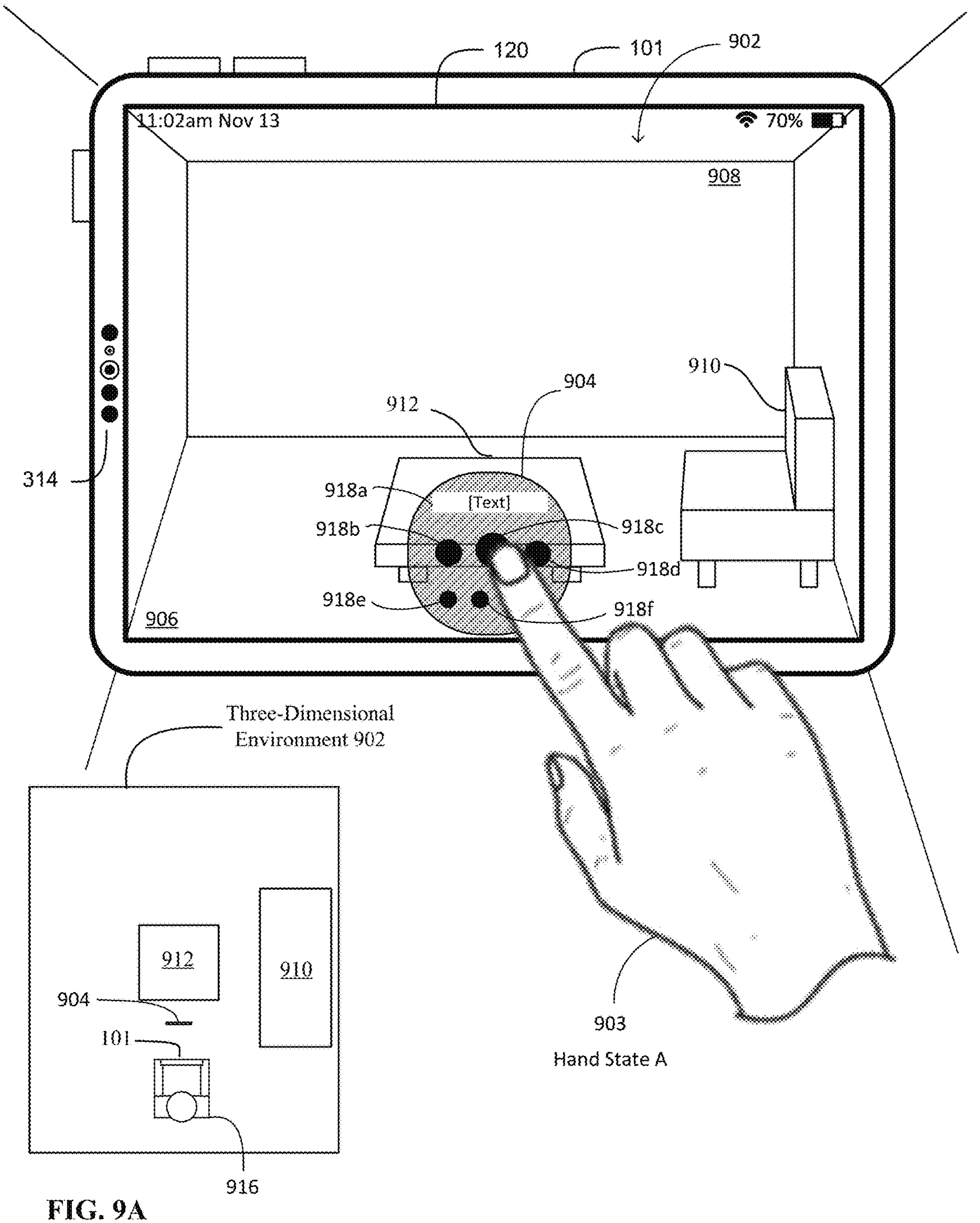
FIGS. 9A-9E illustrate examples of how a computer system generates an animated three-dimensional object while presenting a content item in accordance with some embodiments.

FIG. 9A illustrates a computer system (e.g., an electronic device) 101 displaying, via a display generation component (e.g., display generation component 120 of FIG. 1), a three-dimensional environment 902 from a viewpoint of the user 916 of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the computer system 101 is held by a user 916 in a physical environment. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In some embodiments, the computer system 101 displays user interfaces of a content (e.g., streaming, delivery, playback, browsing, library, sharing, etc.) application in the three-dimensional environment 902. In some embodiments, the content application includes a mini-player user interface (also referred to as a condensed user interface) and an expanded user interface. In some embodiments, the mini player user interface includes playback control elements that, in response to user inputs directed to the playback control elements, cause the computer system 101 to modify playback of a content item playing via the content application, and artwork (e.g., album artwork) associated with the content item currently playing via the content application. In some embodiments, the expanded user interface includes a greater number of user interface elements (e.g., containers such as windows, platters, or backplanes; selectable options, content, etc.) than the mini player user interface. In some embodiments, the expanded user interface includes a navigation element, a content browsing element, and a playback element. In some embodiments, the content application includes a three-dimensional virtual object, such as animated virtual object 922. The animated object is optionally displayed alongside the mini player user interface. The mini player user interface is described in more detail with reference to FIGS. 9A-9E and further in reference to method 800, method 1000, and method 1200 below. The animated object is described in more detail below with reference to method 1000.

FIGS. 9A-9E also include a top down view of the three-dimensional environment 902, including a top down view of the user 916, the computer system 101, and other objects in the three-dimensional environment 902 (e.g., the mini player user interface 904, the animated virtual object 922, the table 912, and the sofa 910).

In FIG. 9A, the computer system 101 presents a three-dimensional environment 902 including virtual objects and representations of real objects. For example, the virtual objects include a mini player user interface 904 of the content application. In some embodiments, the mini player user interface 904 includes an image (e.g., album artwork) associated with a content item that is currently playing via the content application. As another example, the representations of real objects include a representation 906 of the floor in the physical environment of the computer system 101 and a representation 908 of a wall in the physical environment of the computer system 101. In some embodiments, the representations of real objects are displayed via the display generation component 120 (e.g., virtual or video passthrough) or are views of the real objects through a transparent portion of the display generation component 120 (e.g., real or optical passthrough). In some embodiments, the physical environment of the computer system 101 further includes a table and a sofa, and as such, the computer system 101 displays a representation of the table 912 and a representation of the sofa 910.

Figure 9B:
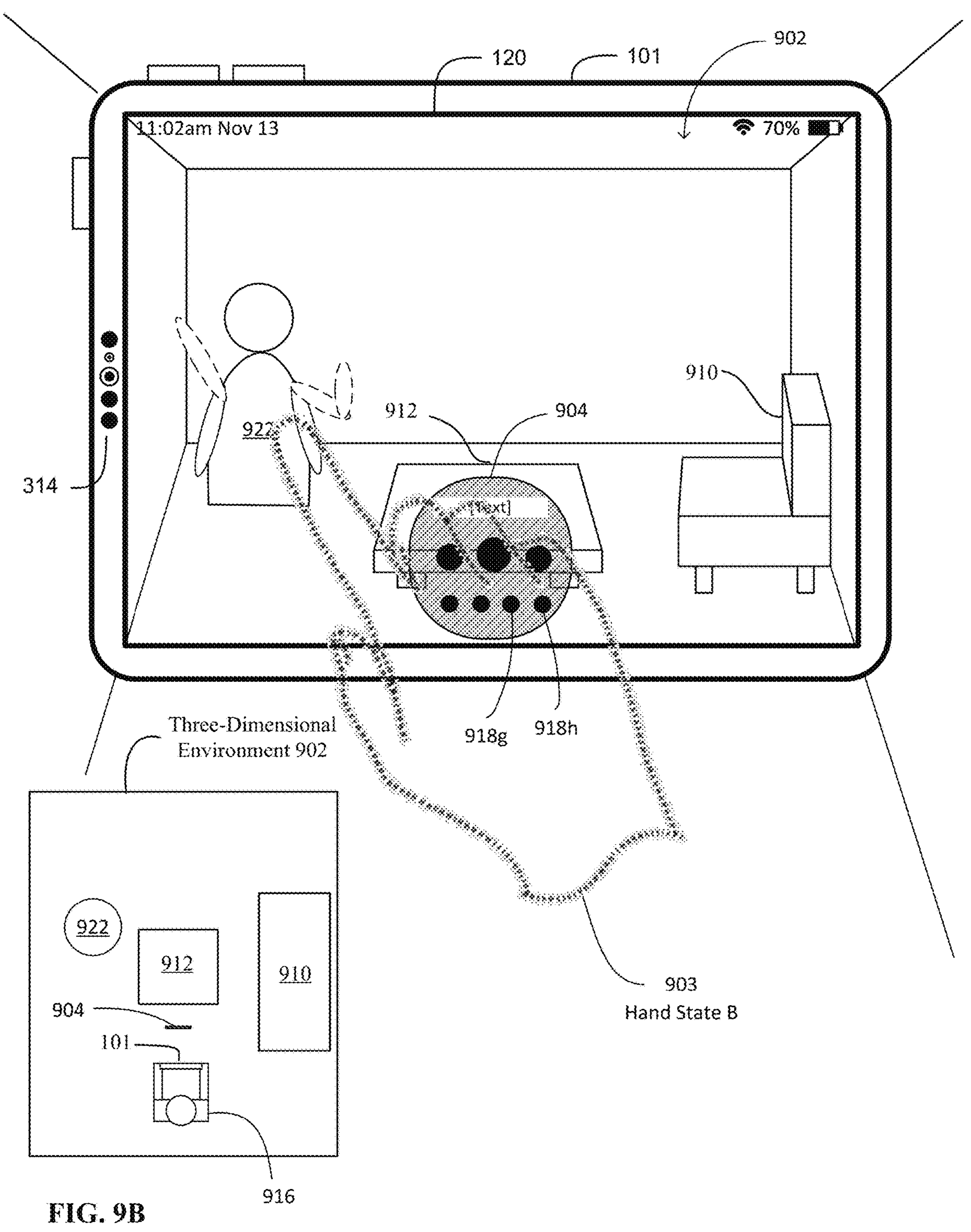

In some embodiments, the computer system 101 displays an indication 918*a* of the title and artist of the content item and a plurality of user interface elements 918*b*-918*h* for modifying playback of the content item overlaid on the image included in mini player user interface 904. User interface elements 918*g* and 918*h* are shown in FIG. 9B. In some embodiments, in response to detecting an input directed to one of the user interface elements 918*b*-918*h*, the computer system 101 modifies playback of the content item currently playing via the content application. In some embodiments, in response to detecting selection of user interface element 918*b*, the computer system 101 skips back in a content item playback queue to restart the content item that is currently playing or play a previous item in the content item playback queue. In some embodiments, in response to detecting selection of user interface element 918*c*, the computer system 101 plays the content item and updates the user interface element 918*c* to be a user interface element that, when selected, causes the computer system 101 to pause playback of the content item. As shown in FIG. 9A, a hand 903 in hand state A optionally indicates the selection of user interface element 918*c*. In some embodiments, in response to detecting selection of user interface element 918*d*, the computer system 101 ceases playback of the currently playing content item and initiates playback of the next content item in the content item playback queue. In some embodiments, in response to detecting selection of user interface element 918*e*, the computer system 101 ceases display of the mini player user interface 904 and displays the expanded user interface described in more detail with reference to FIGS. 11A-110 and with reference to one or more steps of method 1000. In some embodiments, in response to detecting selection of user interface element 918*f*, the computer system 101 displays time-synced lyrics of the content item that is currently playing, as illustrated in FIG. 9E. In some embodiments, in response to detecting selection of user interface element 918*g*, the computer system 101 ceases to present the three-dimensional virtual object associated with the content item currently playing on the computer system 101 and updates the user interface element 918*g* to be a user interface element that, when selected, causes the computer system 101 to re-display the virtual object. In some embodiments, in response to detecting selection of user interface element 918*h*, the computer system 101 presents another user interface element for adjusting the playback volume of audio content of the content item and/or presents a menu of audio output options for modifying playback of the audio content.

In some embodiments, the computer system 101 detects selection of one of the user interface elements 918*b*-*h* by detecting an indirect selection input, a direct selection input, an air gesture selection input, or an input device selection input. In some embodiments, detecting a selection input includes first detecting a ready state corresponding to the type of selection input being detected (e.g., detecting an indirect ready state before detecting an indirect selection input, or detecting a direct ready state before detecting a direct selection input). In some embodiments, detecting an indirect selection input includes detecting, via input devices 314, the gaze of the user directed to a respective user interface element while detecting the hand of the user make a selection gesture, such as an air pinch hand gesture in which the user touches their thumb to another finger of the hand. In some embodiments, detecting a direct selection input includes detecting, via input devices 314, the hand of the user make a selection air gesture, such as the air pinch gesture within a predefined threshold distance (e.g., 1, 2, 3, 5, 10, 15, or 30 centimeters) of the location of the respective user interface element or a pressing air gesture in which the hand of the user "presses" into the location of the respective user interface element while in a pointing hand shape. In some embodiments, detecting an air gesture input includes detecting the gaze of the user directed to a respective user interface element while detecting a pressing gesture into the location of an air gesture user interface element displayed in the three-dimensional environment 902 via display generation component 120. In some embodiments, detecting an input device selection includes detecting manipulation of a mechanical input device (e.g., a stylus, mouse, keyboard, trackpad, etc.) in a predefined manner corresponding to selection of a user interface element while a cursor controlled by the input device is associated with the location of the respective user interface element and/or while the gaze of the user is directed to the respective user interface element.

As shown in FIG. 9A, the computer system 101 detects selection of the selectable option 918*c* that, when selected, causes the computer system 101 to play the respective content item, such as shown in FIG. 9B. In some embodiments, selecting the selectable option 918*c* also causes the computer system 101 to play the animations associated with the virtual object, which is presented with the mini player user interface 904. The animations associated with the virtual object, shown in further detail in FIG. 9B, optionally include movements associated with the respective content item. For example, the virtual object optionally dances/moves in synchrony with the beat of the music, which is discussed further with reference to method 1000. The selection of the selectable option 918*c* also optionally causes the computer system 101 to update the user interface element 918*c* to be a user interface element that, when selected, causes the computer system 101 to pause playback of the content item. In some embodiments, the selection of selectable option 918*c* to pause the playback of the respective content item further includes pausing the animations associated with the virtual object. In some embodiments, the selection of selectable option 918*c* to pause the playback of the respective content further includes blurring and/or increasing the transparency of the animated virtual object 922. In some embodiments, when the playback of the respective content is paused, the animated virtual object 922 ceases to be displayed.

FIG. 9B illustrates an example of how the computer system 101 updates the mini player user interface 904 and displays the virtual object in response to detecting the input from hand 903 selecting option 918*c* in FIG. 9A. In some embodiments, the computer system 101 updates the mini player user interface 904 in response to detecting the ready state of the user described above (e.g., hand 903 in Hand State A). Updating the mini player user interface 904 includes updating the selectable option 918*c* to be a user interface element that, when selected, causes the computer system 101 to pause playback of the content item.

In some embodiments, in response to detecting the selection of selectable option 918*c* in FIG. 9A, the virtual object appears and becomes animated (e.g., animated virtual object 922 shown in FIG. 9B). In some embodiments, and as described with reference to method 1000, the animations of animated virtual object 922 are converted from movements in a video. In some embodiments, characteristics associated with the animated virtual object 922 may include the likeness of a user (e.g., user 916 and/or a user in a video). For example, the animated virtual object 922 optionally has the same gender, skin color, hair color, hair style, clothing color, clothing style, movements, and facial features of the user 916. In some embodiments, user 916 may be in the video upon which the animated virtual object 922 is based.

In some embodiments, the animated virtual object 922 is presented outside of a boundary of the mini player user interface 904. In some embodiments, the animated virtual object 922 is displayed proximate to (e.g., within 1, 2, 3, 5, 10, 15, 20, 30, or 50 centimeters or 1, 2, 3, or 5 meters of) the mini player user interface 904. In some embodiments, the animated virtual object 922 is displayed to the left or right of the mini player user interface 904. In some embodiments, the animated virtual object 922 is displayed at the same z-depth (e.g., distance) from the viewpoint of the user as the mini player user interface 904. In some embodiments, the animated virtual object 922 is displayed in front of or behind the mini player user interface 904 (e.g., closer to or further from the viewpoint of the user than the mini player user interface 904). In some embodiments, the animated virtual object 922 is displayed at a predetermined spatial arrangement (e.g., position and/or orientation) relative to the mini player user interface 904 when it is first displayed.

In some embodiments, the computer system 101 detects a hand 903 of the user 916 performing an air-pinch gesture (e.g., hand state B) directed towards the animated virtual object 922, such as shown in FIG. 9B. In response to detecting a movement of hand 903 in Hand State B while the hand 903 is in a pre-defined shaped (e.g., air-pinch hand shape or index finger pointing shape), the computer system 101 moves the animated virtual object 922 to a different location in the three-dimensional environment 902, shown in FIG. 9C. In some embodiments, the computer system 101 moves the animated virtual object 922 to the location where hand 903 releases the air-pinch gesture or releases the touch screen. For example, computer system 101 detects the end of the selection input of hand 903 when the hand 903 releases the air pinch hand shape and/or lifts off from the touch screen, shown in FIG. 9C. In some embodiments, the magnitude and/or direction of the movement of hand 903 determines the updated location of the animated virtual object 922 and/or the magnitude and/or direction of the movement of the animated virtual object.

Figure 9C:
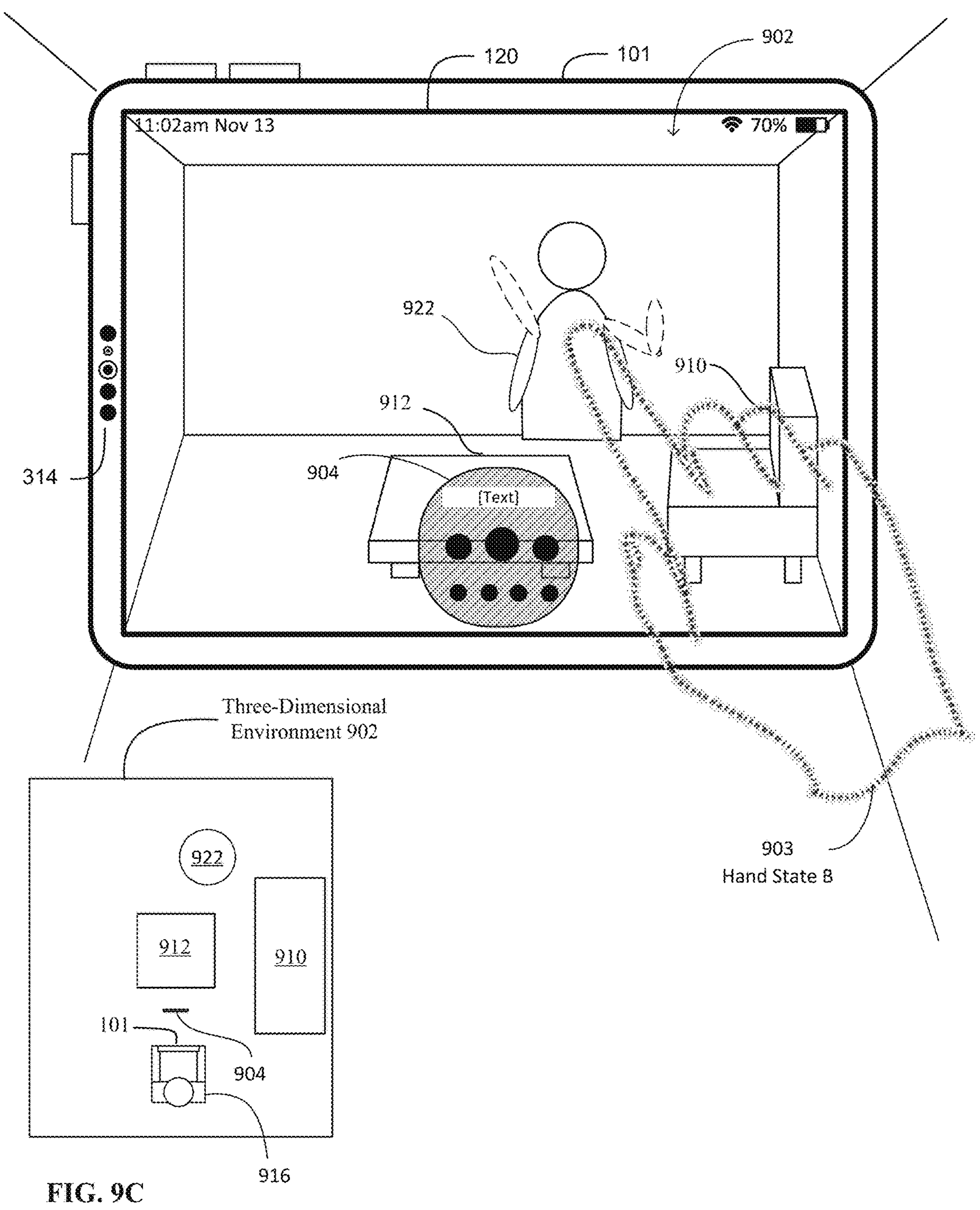

In some embodiments, the animated virtual object 922 continues to be animated while it is being moved, as shown in FIG. 9C. Alternatively, and in some embodiments, the animated virtual object 922 ceases to be animated in response to and/or while being moved. In some embodiments, the animations fade and/or blur out in response to the animated virtual object 922 moving locations. In some embodiments, the animated virtual object 922 fades out from the old location and fades in at the updated location (e.g., where hand 903 is located in FIG. 9C). Fading in or fading out optionally includes an increase or decrease in transparency, respectively. In some embodiments, a non-animated virtual object is moved in the same method as described above and in method 1000. In some embodiments, the animated virtual object 922 moves independently of the mini player user interface 904 and the other virtual objects in the three-dimensional environment. For example, the mini player user interface 904 remains in the same location while the animated virtual object 922 moves as a result of an input (e.g., using hand 903). In some embodiments, moving the animated virtual object 922 further includes moving the mini player user interface 904. For example, an input to move the animated virtual object 922 optionally results in the mini player user interface 904 moving with the same magnitude and/or in the same direction. Similarly, an input to move the mini player user interface 904 (hand 903 in Hand State B from FIG. 9B to 9C) optionally results in the animated virtual object 922 moving in the same magnitude and direction.

Figure 9D:
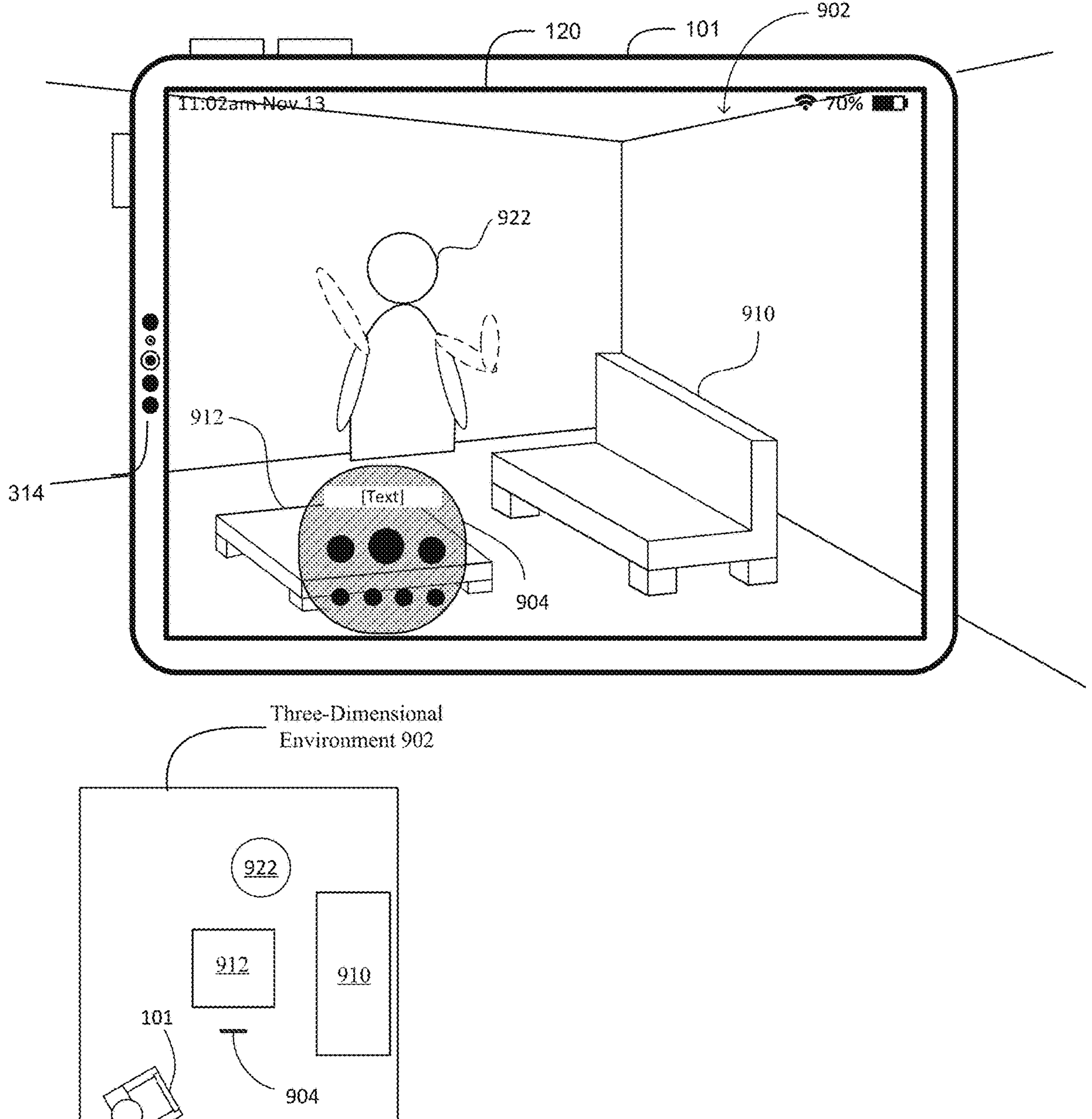
Figure 9E:
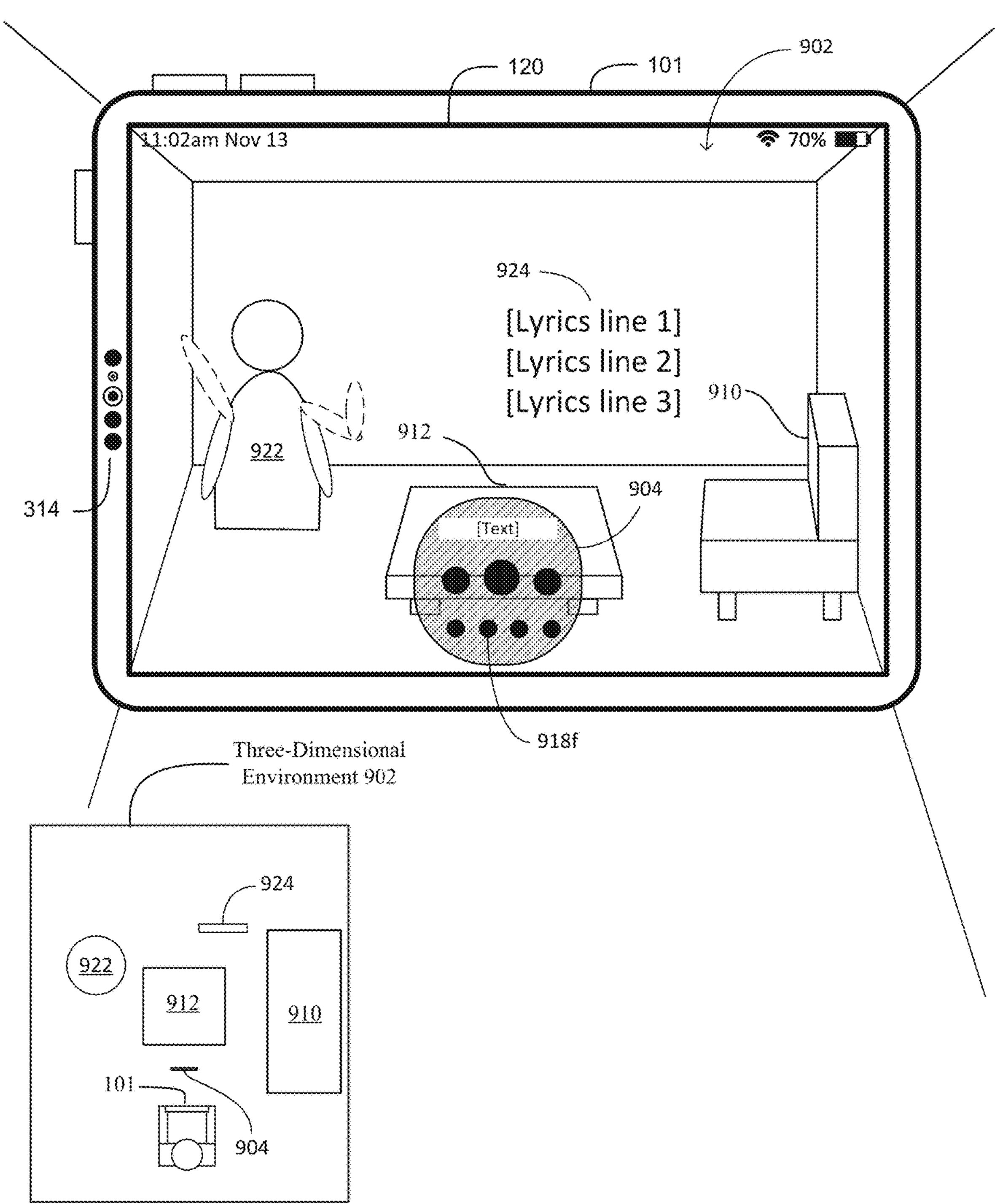

FIG. 9D illustrates an example of how the computer system 101 updates the three-dimensional environment 902, including the mini player user interface 904 and the animated virtual object 922, in response to detecting movement of the computer system 101 that causes the computer system 101 to update the viewpoint of the user in the three-dimensional environment 902 and the field of view of the computer system 101. In some embodiments, the computer system 101 updates the view of the mini player user interface 904 in the three-dimensional environment 902 in response to the updated viewpoint of the user. For example, FIG. 9D shows the mini player user interface 904 at a different angle to account for the updated viewpoint. However, the mini player user interface 904 remains in the same location in the three-dimensional environment 902 despite the updated viewpoint. Similarly, the animated virtual object 922 is optionally displayed at a different angle to account for the updated viewpoint. The animated virtual object 922 optional remains in the same location in the three-dimensional environment 902 despite the updated viewpoint. In some embodiments, while updating the viewpoint of the user in the three-dimensional environment 902 and the field of view of the computer system 101, the animated virtual object 922 continues to be animated. In some embodiments, changing the viewpoint of the user in the three-dimensional environment 902 results in updating the animation to be displayed from an updated view associated with the new viewpoint of the user.

FIG. 9E illustrates an example of time-synced lyrics 924 associated with the content item presented alongside the mini player user interface 904 and the animated virtual object 922. In some embodiments, the time-synced lyrics 924 are presented in response to the computer system 101 detecting an input corresponding to the selection of selectable option 918*f*. For example, the computer system 101 detects indirect selection of option 918*f* including detecting a gaze of the user (e.g., using the user's eyes) while detecting the hand (e.g., hand 903) making the selection gesture (e.g., Hand State A or Hand State B). In some embodiments, the animated virtual object 922 continues to be animated in response to the presentation of the time-synced lyrics 924. Alternatively, the animated virtual object 922 optionally transitions to a non-animated virtual object in response to the time-synced lyrics 924 being presented.

In some embodiments, the time-synced lyrics 924 are lyrics associated with the content item currently playing via the content application of the computer system 101. The computer system 101 optionally presents a portion of the lyrics 924 corresponding to the portion of the content item currently playing on the computer system 101 via the content application and updates the portion of lyrics 924 in accordance with continued playback of the content item. In some embodiments, the lyrics 924 include a line of lyrics corresponding to the portion of the content item that is currently playing, one or more lines of lyrics corresponding to a portion of the content item prior to the portion of the content item that is currently playing, and/or one or more lines of lyrics corresponding to a portion of the content item that will play after the portion of the content item that is currently playing. As shown in FIG. 9E, the lyrics 924 are displayed outside of a boundary of and/or at a location different from the mini player user interface 904 in the three-dimensional environment 902. In some embodiments, the lyrics 924 are displayed proximate to (e.g., within 1, 2, 3, 5, 10, 15, 20, 30, or 50 centimeters or 1, 2, 3, or 5 meters of) the mini player user interface 904. In some embodiments, the lyrics 924 are displayed to the left or right of the mini player user interface 904 and/or the animated virtual object 922. In some embodiments, the lyrics 924 are displayed at the same z-depth (e.g., distance) from the viewpoint of the user as the mini player user interface 904 and/or the animated virtual object 922. In some embodiments, the lyrics 924 are displayed in front of or behind the mini player user interface 904 and/or the animated virtual object 922 from the viewpoint of user 916 (e.g., closer to or further from the viewpoint of the user than the mini player user interface 904). In some embodiments, the lyrics 924 are initially displayed with a predetermined spatial arrangement (e.g., position and/or orientation) relative to the mini player user interface 904 and/or the animated virtual object 922 in three-dimensional environment 902.

Additional or alternative details regarding the embodiments illustrated in FIGS. 9A-9E are provided below in description of method 1000 described with reference to FIG. 10.

FIG. 10 depict a flowchart illustrating an exemplary method 1000 of how a computer system generates an animated three-dimensional object while presenting a content item in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector), and one or more cameras (e.g., one or more cameras that point forward from the user's head or that point downward at a user's hand, such as color sensors, infrared sensors, and other depth-sensing cameras). In some embodiments, the method 1000 is governed by instructions that are stored in a non-transitory computer-readable storage medium and that are executed by one or more processors of a computer system, such as the one or more processing units 202 of computer system 101 (e.g., controller 110 in FIG. 1A). Some operations in method 1000 are, optionally, combined and/or the order of some operations is, optionally, changed.

In some embodiments, method 1000 is performed at a computer system in communication with a display generation component and one or more input devices. In some embodiments, the computer system has one or more of the characteristics of the computer system of method 800. In some embodiments, the display generation component has one or more of the characteristics of the display generation component of method 800. In some embodiments, the one or more input devices have one or more of the characteristics of the one or more input devices of method 800.

In some embodiments, the computer system (e.g., computer system 101) displays (1002*a*), via the display generation component, a user interface of an application in a three-dimensional environment, such as the mini player user interface 904 as shown in FIG. 9A, (e.g., the user interface, the application, and/or the three-dimensional environment optionally have one or more of the characteristics of the user interface, the application and/or the three-dimensional environment described with reference to method 800), wherein the user interface is associated with playback of respective content (e.g., as described with reference to method 800), the respective content is not currently playing (e.g., as described with reference to method 800), and the user interface is not displayed with a respective animated object (e.g., a two- or three-dimensional object) in the three-dimensional environment, shown in FIG. 9A (e.g., the user interface is displayed in the three-dimensional environment on its own). In some embodiments, the respective animated object is an avatar. In some embodiments, the respective animated object depicts a human, animal (e.g. dog, cat, or bird), and/or plant (e.g. flowers or trees). Alternatively, and in some embodiments, the respective animated object is displayed with the user interface, but not animated, when the respective content is not currently playing. In other embodiments, the respective animated objected is not displayed at all when the respective content is not currently playing. In some embodiments, the respective animated object is displayed external to the user interface. For example, the respective animated object is optionally displayed at a location in the three-dimensional environment different from the user interface.

In some embodiments, while displaying the user interface of the application in the three-dimensional environment and while the respective content is not currently playing and the user interface of the application is not displayed with the respective animated object, the computer system receives, via the one or more input devices, a first input corresponding to a request to initiate playback of the respective content (1002*b*), such as an input using hand 903 in Hand State A shown in FIG. 9A. In some embodiments, the first input has one or more of the characteristics of the first input described with reference to method 800.

In some embodiments, in response to receiving the first input (1002*c*), the computer system initiates (1002*d*), in the three-dimensional environment, the playback of the respective content, such as shown in FIG. 9B. In some embodiments, the playback of the respective content includes playback of audio (e.g., music), one or more videos, one or more podcasts, and/or one or more audiobooks.

In some embodiments, the computer system displays (1002*e*), in the three-dimensional environment, the respective animated object (e.g., animated virtual object 922 shown in FIG. 9B), wherein the respective animated object is displayed with a respective spatial arrangement (e.g., position and/or orientation) relative to the user interface of the application in the three-dimensional environment, and wherein one or more characteristics of the respective animated object are based on the playback of the respective content, such as shown in FIG. 9B wherein the animated virtual object 922 is to the left and behind the mini player user interface 904. In some embodiments, the respective animated object is positioned to the left, right, top, bottom, front, or back of the user interface. In some embodiments, the respective animated object is closer to the viewpoint of the user than the user interface, or further from the viewpoint of the user than the user interface. In some embodiments, the respective animated object animates, moves and/or changes with the playback of the respective content. For example, the respective animated object dances/moves in synchrony with the beat of music, intensity of the bass, volume of music, and/or motion of a video. Additionally or alternatively, in some embodiments, the respective animated object changes expressions, colors, and/or moods based on the playback of the respective content. In some embodiments, and in response to receiving an input to stop or pause the respective content, the respective animated object is not animated. In some embodiments, while pausing or stopping the respective content, the respective animated object is still displayed. Displaying a user interface with a respective animated object depending on the playback of corresponding content reduces resources needed for displaying the simulated lighting effects when the corresponding content is not being played and reduces the need for manual inputs to enable and/or disable the simulated lighting effects manually.

In some embodiments, before displaying the respective animated object, the computer system imports the respective animated object from a second computer system to the computer system, such as if the animated virtual object 922 is imported from a second computer system. (In some embodiments, importing the respective animated object includes importing a USD file including the respective animated object. In some embodiments, the second computer system records and transforms a video to an animated object. Importing the respective animated object reduces the resources needed to generate the respective animated object on the computer system.

In some embodiments, the computer system displays the respective animated object including displaying an animation of the respective animated object, wherein the animation is prerecorded, such as if the animations used in the animated virtual object 922 was prerecorded. In some embodiments, recording the animation includes using a sensor in communication with the computer system, the one or more characteristics associated with the respective animated object. The one or more characteristics associated with the respective animated object optionally includes those as described above. In some embodiments, the respective animated object is converted from a video of a person. In some embodiments, characteristics associated with the respective animated object includes a person's likeness, such as their gender, skin color, hair style, clothing style, movements, and facial features. In some embodiments, the video of the person is a video recorded of the user. The computer system optionally converts the movement of the user in the video into the movement of the avatar. Using a sensor to record one or more characteristics associated with the respective animated object improves usability and thereby improves user device interaction.

In some embodiments, while displaying, in the three-dimensional environment, the user interface (e.g., mini player user interface 904) with the respective animated object and while a viewpoint of a user of the computer system has a first spatial arrangement relative to the respective animated object, shown by the spatial arrangement of the objects in FIG. 9C, (e.g., a first portion of the respective animated object is displayed in the three-dimensional environment by the computer system while the viewpoint of the user has a first spatial arrangement relative to the respective animated object), the computer system receives, via the one or more input devices, an input corresponding to a movement of the viewpoint of the user of the computer system to have a second spatial arrangement, different from the first spatial arrangement, relative to the respective animated object in the three-dimensional environment, such as shown by the user 916 moving locations and thereby moving viewpoints from FIG. 9C to 9D. The input to change the spatial arrangement is described in further detail in method 800.

In some embodiments, in response to receiving the input corresponding to the movement of the viewpoint of the user of the computer system, the computer system updates the display of the respective animated object in the three-dimensional environment to be from the moved viewpoint of the user, such as shown by the updated display of the animated virtual object 922 in FIG. 9D (e.g. the moved viewpoint of the user has the second spatial arrangement relative to the respective animated object). In some embodiments, a second portion, different from the first portion, of the respective animated object is displayed in the three-dimensional environment at the moved viewpoint of the user, such as display of a different angle of the respective animated object.

In some embodiments, the computer system continues to display the user interface of the application with the respective animated object, such as shown by the updated display of the mini player user interface in FIG. 9D. In some embodiments, when the viewpoint of the user moves around the respective animated object and/or user interface, different views of the respective animated object and/or user interface are displayed by the computer system. For example, at the first spatial arrangement, the first viewpoint is on a first side of the user interface (e.g., front). For example, at the second spatial arrangement, the moved viewpoint is on a second, different side of the user interface (e.g., opposite side of the first view point or backside). In some embodiments, the difference in orientation of the position of the first viewpoint and the moved viewpoint relative to the user interface is 1, 5, 10, 30, 45, 90, 180, 270, or 359 degrees. In some embodiments, while the computer system displays the respective animated object from different viewing angles while the viewpoint of the user changes, one or more or all of the characteristics of the respective animated object remain the same in the three-dimensional environment. For example, the color, mood, and/or animations remain the same. Allowing the user to view the respective animated object from different spatial arrangements in the three-dimensional environment enables consistency of the presentation of feedback in the three-dimensional environment, thereby reducing errors in usage and improving user-device interaction.

In some embodiments, while displaying the user interface of the application and the respective animated object at a first location in the three-dimensional environment, the computer system detects, via the one or more input devices, an input corresponding to a request to move the respective animated object in the three-dimensional environment, such as an input by hand 903 in Hand State B shown in FIG. 9B. A request to move the respective animated object optionally includes an input of a selection of a selectable option displayed in the user interface, as described with reference to method 800. In some embodiments, the magnitude and direction of the input (e.g., pinching, dragging, and/or releasing) directed towards the respective animated object determines the updated location of the animated object. For example, tapping/touching and then dragging the animated object (in the case of a touch-sensitive surface) indicates a request to move the respective animated object. For example, air pinching (e.g., with a thumb and index finger of the hand of the user) and dragging the hand in the pinch hand shape the respective animated object (in the case of wearable device) indicates a request to move the respective animated object to the location that the hand is dragging to.

In some embodiments, in response to detecting the input corresponding to the request to move the respective animated object in the three-dimensional environment, the computer system displays, via the display generation component, the respective animated object at a second location in the three-dimensional environment (e.g., including moving the respective animated object to the second location in the three-dimensional object in accordance with the input) and continues to display the user interface of the application at the first location in the three-dimensional environment, such as shown by the movement of virtual animated object 922 from a first location to a second location from FIG. 9B to FIG. 9C. In some embodiments, the computer system updates the location of the respective animated object by initiating display of the respective animated object at the updated location with a fade-in animation effect. In some embodiments, the respective animated object fades out from its old location using a fade-out animation effect (e.g., increase in transparency) before subsequently fading-in (e.g., decrease in transparency) at the updated location. In some embodiments, the respective animated object and the user interface are "world locked" and remain at respective locations in the three-dimensional environment unless and until an input to update their locations is received. Maintaining the location in the three-dimensional environment at which the user interface is displayed while changing the location of the respective animated object provides an efficient way of allowing the user to view other user interfaces and content in the three-dimensional environment without being required to move the user interface of the application, thereby improving user device interaction.

FIGS. 11A-11N illustrate examples of how a computer system displays a condensed user interface in place of an expanded user interface in response to different inputs.

FIG. 11A illustrates a computer system (e.g., an electronic device) 101 displaying, via a display generation component (e.g., display generation component 120 of FIG. 1), a three-dimensional environment 1102 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In some embodiments, the computer system 101 displays user interfaces of a content (e.g., streaming, delivery, playback, browsing, library, sharing, etc.) application in the three-dimensional environment 1102. In some embodiments, the content application includes a mini-player user interface (also referred to as a condensed user interface) and an expanded user interface. In some embodiments, the mini player user interface includes playback control elements that, in response to user inputs directed to the playback control elements, cause the computer system 101 to modify playback of a content item playing via the content application, and artwork (e.g., album artwork) associated with the content item currently playing via the content application. In some embodiments, the expanded user interface includes a greater number of user interface elements (e.g., containers such as windows, platters, or backplanes; selectable options, content, etc.) than the mini player user interface. In some embodiments, the expanded user interface includes a navigation element, a content browsing element, and a playback element. The mini player user interface and the expanded user interface are described in more detail below with reference to FIGS. 11A-110 and in further reference to method 1200 below.

In FIG. 11A, the computer system 101 presents a three-dimensional environment 1102 including virtual objects and representations of real objects. For example, the virtual objects include an expanded user interface 1104 of the content application. The expanded user interface 1104 optionally includes a navigation element 1124 and a content browsing element 1126. In some embodiments, the virtual objects also include a playback control element 1128 displayed below the expanded user interface 1104. As another example, the representations of real objects include a representation 1106 of the floor in the physical environment of the computer system 101 and a representation 1108 of a wall in the physical environment of the computer system 101. In some embodiments, the representations of real objects are displayed via the display generation component 120 (e.g., virtual, active or video passthrough) or are views of the real objects through a transparent portion of the display generation component 120 (e.g., real or passive passthrough). In some embodiments, the physical environment of the computer system 101 further includes a table and a sofa, and as such, the computer system 101 displays a digital representation of the table 1112 and a digital representation of the sofa 1110.

FIG. 11A shows the navigation element 1124 of the expanded user interface 1104. The navigation element 1124 includes a plurality of selectable options 1118*a-e* that, when selected, cause the computer system 101 to navigate to a different user interface of the content application in the content browsing element 1126 of the expanded user interface 1104. In FIG. 11A, the "listen now" option 1118*a* is currently selected, so the computer system 101 presents a user interface for browsing content items recommended to the user based on the content consumption history of the user. In some embodiments, in response to detecting selection of a "browse" option 1118*b*, the computer system 101 presents a content browsing user interface in the content browsing element 1126 that includes user interface elements for browsing content items based on genre, artist, playback charts for all users of the content delivery service associated with the content application, and the like. In some embodiments, in response to detecting selection of a "radio" option 1118*c*, the computer system 101 presents a radio user interface in the content browsing element 1126 that includes information about and selectable options to initiate playback of internet-based radio shows and stations available via the content delivery service associated with the content application. In some embodiments, in response to detecting selection of a "library" option 1118*d*, the computer system 101 presents a user interface in the content browsing element 1126 that includes representations of content items in a content library associated with a user account of the user of the computer system 101. In some embodiments, in response to detecting selection of a "search" option 1118*e*, the computer system 101 displays a search user interface in the content browsing element 1126 that includes a user interface element for providing a search term to be searched in the content delivery service associated with the content application.

In some embodiments, the expanded user interface of the content application includes a content browsing element 1126 displaying the "Listen Now" user interface described above. FIG. 11A illustrates the content browsing element 1126 including a plurality of representations, such as representation 1116*a* and 1116*b*. In some embodiments, the representations 1116*a* and 1116*b* are arranged alphabetically (e.g., by artist, content item title, content item collection (e.g., album, playlist) title) and, in response to detecting selection of a respective portion of an alphabetical scroll bar 1120, the computer system 101 scrolls the representations 1116*a* and 1116*b* to representations of content items corresponding to the letter of the respective portion of the alphabetical scroll bar 1120.

FIG. 11A also includes the playback control element 1128 that includes an image 1130 corresponding to a content item currently playing via the content application on the computer system 101 (e.g., album artwork), an indication 1132 of the title of the content item, and a plurality of user interface elements 1134*a*-1134*i* that, in response to detecting an input directed to one of the user interface elements 1134*a*-1134*i*, cause the computer system 101 to modify playback of the content item currently playing via the content application. In some embodiments, the image 1130 is a selectable option that, when selected, causes the computer system 101 to cease display of the expanded user interface of the content application and display the mini player user interface of the content application, described in further detail below and with reference to methods 800 and 1000. In some embodiments, the playback control element 1128 includes a skip back option 1134*a* that, when selected, causes the computer system 101 to restart the content item that is currently playing and/or play a previous content item in a playback queue of the content application. In some embodiments, the playback control element 1128 includes a pause option 1134*b* that, when selected, causes the computer system to pause playback of the content item and update the option 1134*b* to be a play option that, when selected, causes the computer system 101 to resume playback of the content item (e.g., from the playback position at which the content item was paused). In some embodiments, the playback control element 1128 includes a skip ahead option 1134*c* that, when selected, causes the computer system 101 to play the next content item in the content item playback queue of the content application. In some embodiments, the playback control element 1124 includes a favorites option 1134*d* that, when selected, causes the computer system to flag the content item as a favorite of the user account associated with computer system 101. In some embodiments, favoriting the content item includes updating the characteristics of the content item such that the content item appears in a playlist (e.g., favorites playlist) and/or a content library (e.g., which may be navigated to by selecting option 1118*d*). In some embodiments, the playback control element 1124 includes an option 1134*e*, that when selected, causes the computer system 101 to display time-synced lyrics of the content item. The time-synced lyrics are optionally generated and/or displayed in accordance with one or more steps of method 800, method 1000, and/or method 1200. In some embodiments, the playback control element 1124 includes an option 1134*f* that, when selected, causes the computer system 101 to present another user interface element (e.g., a slider) for adjusting the playback volume of audio content of the content item and/or present a menu of audio output options for modifying playback of the audio content. In some embodiments, the playback control element 1124 includes an option 1134*g* for displaying one or more audio output settings to configure the output of the audio portion of the content item (e.g., selecting an output device). In some embodiments, the playback control element 1124 includes a scrubber bar 1134*h* that indicates the playback position in a content item currently being played via the content application and, in response to an input directed to the scrubber bar 1134*h*, causes the computer system 101 to update the playback position in accordance with the input, as opposed to in accordance with continued playback of the content item. In some embodiments, and as shown in FIG. 11A, the playback position of the content item is displayed next to the scrubber bar 1134*h*.

FIG. 11A includes an illustration of a hand 1103 of the user in Hand State A, which corresponds to a hand shape, pose, location, etc. that corresponds to a ready state or an input. In some embodiments, the computer system 101 is able to detect an indirect ready state, a direct ready state, an air gesture ready state, and/or an input device ready state. In some embodiments, detecting the indirect ready state includes detecting (e.g., via one or more of input devices 314) the hand 1103 of the user in a ready state pose, such as a pre-pinch gesture in which the thumb is within a threshold distance (e.g., 0.5, 1, 2, 3, 4, or 5 centimeters) of, but not touching, another finger of the hand or a pointing hand shape in which one or more fingers are extended and one or more fingers are curled towards the palm while the hand 1103 is within a predefined threshold distance (e.g., 1, 2, 3, 5, 10, 15, or 30 centimeters) of a respective interactive user interface element. In some embodiments, detecting the indirect ready state includes detecting (e.g., via one or more of input devices 314) the hand 1103 of the user in a ready state pose, such as the pre-pinch hand shape, while detecting (e.g., via one or more of input devices 314) the gaze of the user is directed to a respective interactive user interface element. In some embodiments, detecting an air gesture ready state includes detecting (e.g., via one or more of input devices 314) the hand 1103 in the ready state pose, such as the pointing hand shape within a threshold distance (e.g., 1, 2, 3, 5, 10, 15, or 30 centimeters) of an input element displayed via display generation component 120 while detecting (e.g., via one or more of input devices 314) the gaze of the user directed to a respective interactive user interface element. In some embodiments, detecting the input device ready state includes detecting a predefined portion of the user (e.g., a hand 1103 of the user) proximate to, but not providing input to, a mechanical input device in communication with the computer system 101 (e.g., a stylus, trackpad, mouse, keyboard, etc.), optionally while a cursor controlled by the input device corresponds to a respective interactive user interface element or optionally while detecting (e.g., via one or more of input devices 314) the gaze of the user directed to the respective interactive user interface element.

In some embodiments, the computer system 101 detects selection of a respective user interface element by detecting an indirect selection input, a direct selection input, an air gesture selection input, or an input device selection input. In some embodiments, detecting a selection input includes first detecting a ready state corresponding to the type of selection input being detected (e.g., detecting an indirect ready state before detecting an indirect selection input, detecting a direct ready state before detecting a direct selection input). In some embodiments, detecting an indirect selection input includes detecting, via input devices 314, the gaze of the user directed to a respective user interface element while detecting the hand of the user make a selection gesture, such as a pinch hand air gesture in which the user touches their thumb to another finger of the hand. In some embodiments, detecting a direct selection input includes detecting, via input devices 314, the hand of the user make a selection air gesture, such as the pinch gesture within a predefined threshold distance (e.g., 1, 2, 3, 5, 10, 15, or 30 centimeters) of the location of the respective user interface element or a pressing air gesture in which the hand of the user "presses" the location of the respective user interface element while in a pointing hand shape. In some embodiments, detecting an air gesture input includes detecting the gaze of the user directed to a respective user interface element while detecting a pressing gesture at the location of an air gesture user interface element displayed in the three-dimensional environment 1102 via display generation component 120. In some embodiments, detecting an input device selection includes detecting manipulation of a mechanical input device (e.g., a stylus, mouse, keyboard, trackpad, etc.) in a predefined manner corresponding to selection of a user interface element while a cursor controlled by the input device is associated with the location of the respective user interface element and/or while the gaze of the user is directed to the respective user interface element. FIG. 11A illustrates a selection of image 1130 using hand 1103 in Hand State A.

Figure 11B:
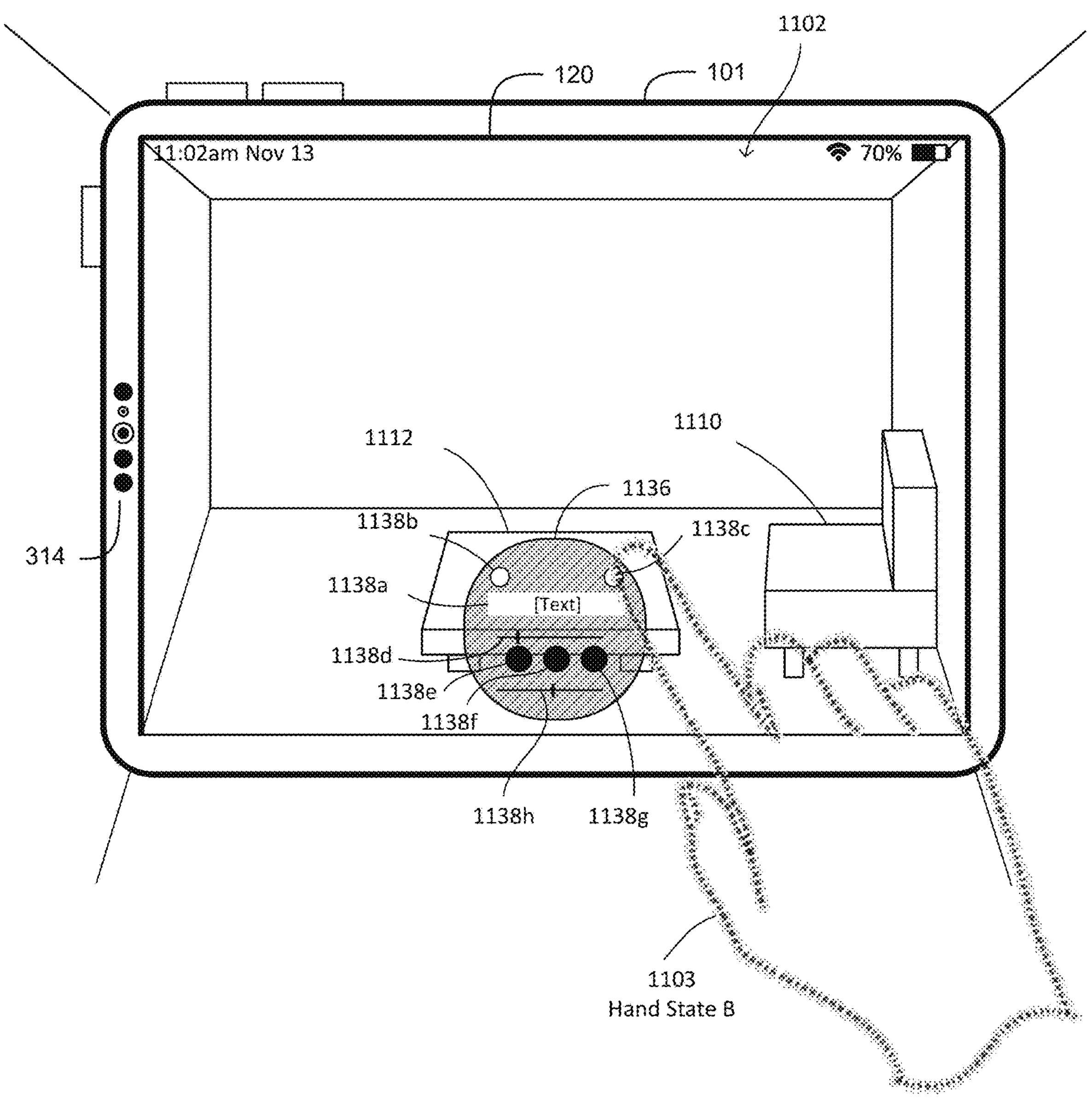

FIG. 11B illustrates the computer system 101 updating the three-dimensional environment 1102 to cease displaying the expanded user interface 1104 and to display the mini player user interface 1136 in response to the selection of image 1130. In some embodiments, the mini player user interface 1136 appears in the same location in three-dimensional environment 1102 that the expanded user interface 1104 was located. Alternatively, in some embodiments, the mini player user interface 1136 appears in a different location in the three-dimensional environment 1102, different than where the expanded user interface 1104 was located. In some embodiments, the expanded user interface 1104 fades out to cease displaying and the mini player user interface 1136 fades in, in response to the selection of image 1130. In some embodiments, the mini player user interface 1136 is able to be moved in accordance with method 800.

The mini player user interface 1136 in FIG. 11B includes an indication 1138*a* of the title and artist of the content item and a plurality of user interface elements 1138*b*-1138*h* for modifying playback of the content item overlaid on the image, as described in FIG. 7A-H, and method 800 and 1000. In some embodiments, in response to detecting the selection of user interface element 1138*b*, the computer system 101 ceases the display of the mini player user interface 1136 and redisplays the expanded user interface 1104. In some embodiments, in response to detecting the selection of user interface element 1138*c*, the computer system 101 displays time-synced lyrics of the content item in accordance with one or more steps of method 1200. In some embodiments, the mini player user interface 1136 includes a scrubber bar 1138*h* that indicates the playback position of the computer system 101 in a content item currently being played via the content application and, in response to an input directed to the scrubber bar 1138*d*, causes the computer system 101 to update the playback position in accordance with the input, as opposed to in accordance with continued playback of the content item. In some embodiments, the playback position of the content item is displayed next to the scrubber bar 1138*d*. For example, the time remaining of the content item is be displayed. In some embodiments, the mini player user interface 1136 includes a skip back option 1138*e* as described in further detail in FIG. 7A. In some embodiments, the mini player user interface 1136 includes a pause option 1138*f* as described in further detail in FIG. 7A. In some embodiments, the mini player user interface 1136 includes a skip ahead option 1138*g* as described in further detail in FIG. 7A. In some embodiments, the mini player user interface 1136 includes a slider 1138*h* that, in response to an input manipulating the slider 1138*h*, causes the computer system 101 to modify the playback volume of the content item on the computer system 101.

FIG. 11B also illustrates hand 1103 in Hand State B at a corner of the mini player user interface 1136. In some embodiments, hand 1103 makes a selection gesture described above towards the corner of the mini player user interface 1136 (an input directed towards the corner of the mini player user interface). In some embodiments, making the selection gesture includes making a respective hand shape (e.g., Hand State B), such as making a pinch hand shape as part of performing the pinch gesture.

Figure 11C:
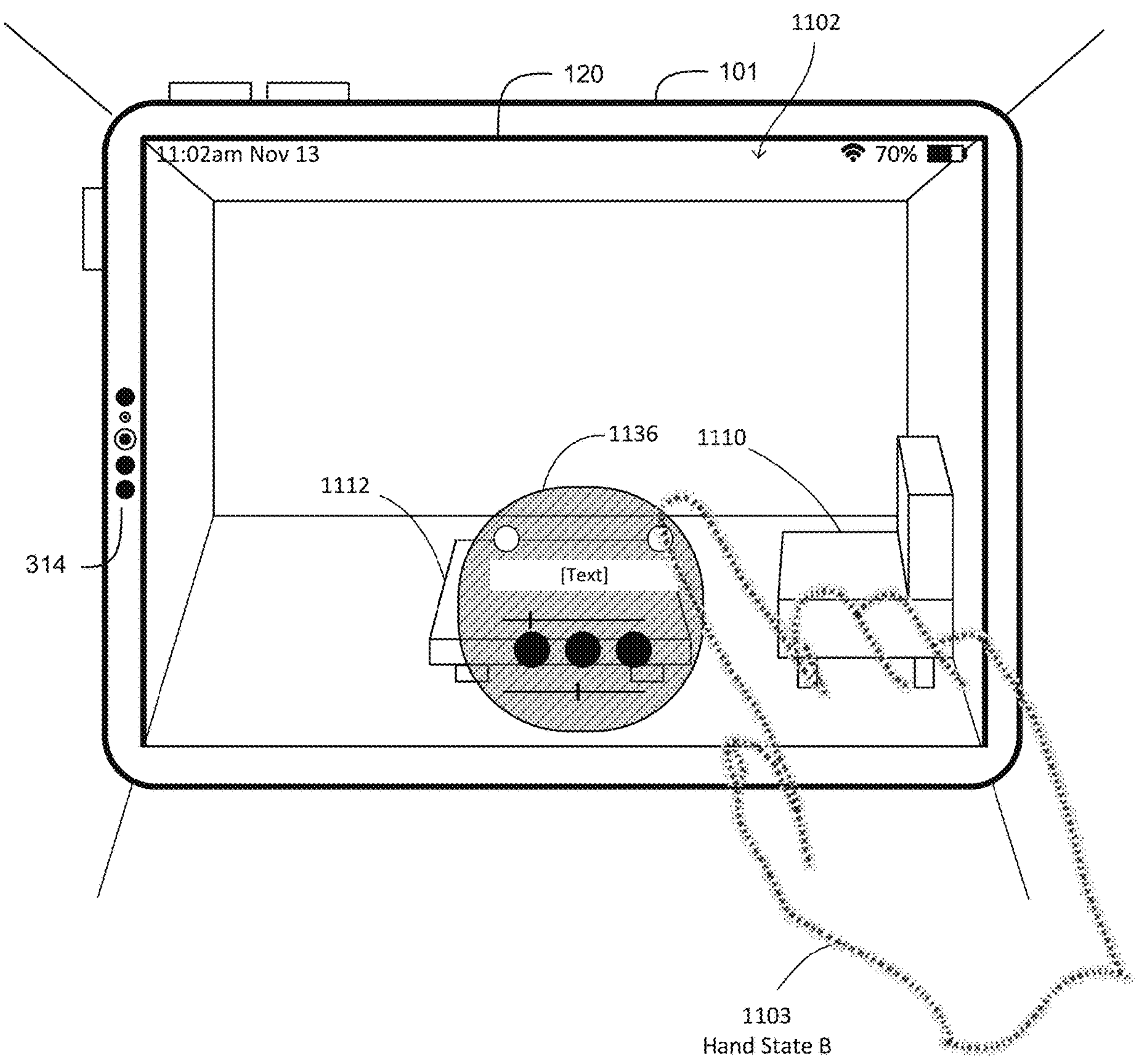

In FIG. 11C, the user moves hand 1103 while maintaining the respective hand shape (e.g., Hand State B) after selecting the corner of the mini player user interface 1136. In response to detecting the movement of hand 1103 while in Hand State B, the computer system 101 enlarges the mini player user interface 1136 in accordance with the movement of the hand 1103 (or in accordance with the movement of an input (e.g., a gaze from the user)). For example, the hand 1103 moves up and right in a diagonal movement, so the computer system 101 enlarges the mini player user interface 1136 in the same magnitude and direction as the hand movement. In some embodiments, if the hand 1103 were to move down and left, the computer system would shrink the mini player user interface 1136 in the same magnitude and direction. In some embodiments, the plurality of user interface elements

1138*a*-1138*h* also scale upward or downward in accordance with the movement of the hand 1103. In some embodiments, other virtual objects remain the same size unless an input directed towards the objects to modify the size of the object is detected by computer system 101.

Figure 11D:
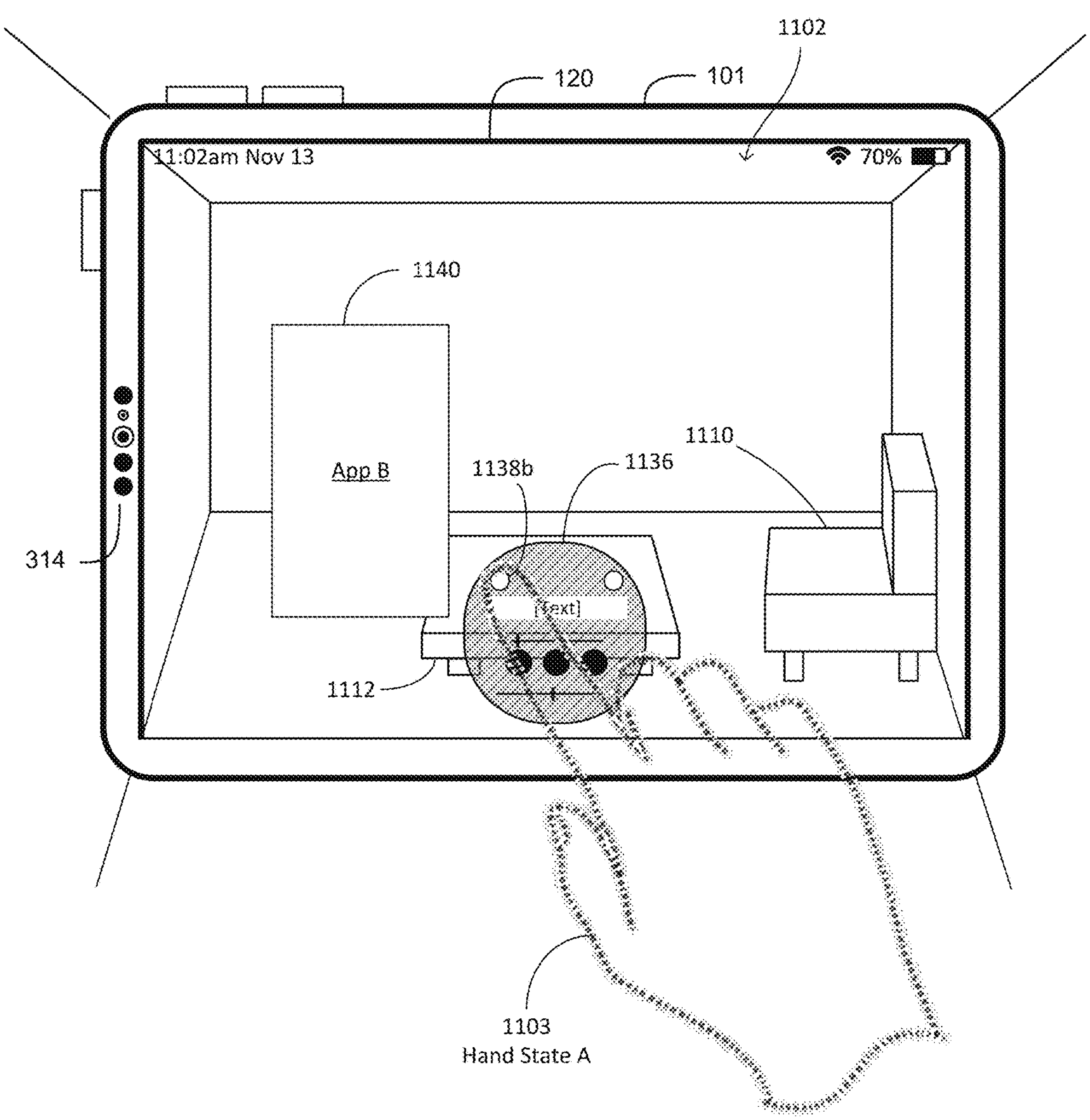

FIG. 11D illustrates an example of a user interface 1140 for a second application other than the content application displayed alongside the mini player user interface 1136 of the content application. In some embodiments, after ceasing the display of the expanded user interface 1104, the computer system 101 detects an input from the user to display user interface 1140. In some embodiments, user interface 1140 is a user interface of a web browsing application, files application, document editing application, media viewing application, and/or other applications found on computer system 101. In some embodiments, in response to an input from a user (e.g., an air-pinch or a gaze), the user interface 1140 is placed at a location in the three-dimensional environment 1102. In some embodiments, the user interface 1140 is presented outside of a boundary of the mini player user interface element 1136. In some embodiments, the user interface 1140 is displayed proximate to (e.g., within 1, 2, 3, 5, 10, 15, 20, 30, or 50 centimeters or 1, 2, 3, or 5 meters of) the mini player user interface 1136. In some embodiments, the user interface 1140 is displayed to the left or right of the mini player user interface 1136. In some embodiments, the user interface 1140 is displayed at the same z-depth (e.g., distance) from the viewpoint of the user as the mini player user interface 1136. In some embodiments, the user interface 1140 is displayed in front of or behind the mini player user interface 1136. In some embodiments, the mini player user interface 1136 moves independently of the user interface 1140. In some embodiments, the mini player user interface 1136 moves jointly with the user interface 1140.

FIG. 11D also illustrates hand 1103 in Hand State A selecting user interface element 1138*b*. The computer system 101 detects hand 1103 in the selection gesture (or other input in the selection gesture such as a gaze from the user), as described above. In some embodiments, the user selects user interface element 1138*b* using indirect selection (e.g., using a gaze of the user). As a result of the selection of user interface element 1138*b*, the computer system redisplays the expanded user interface 1104 in FIG. 11E. In some embodiments, the expanded user interface 1104 is displayed at the first location (e.g., the location in FIG. 11A). In response to the selection of element 1138*b*, the mini player user interface 1136 and user interface 1140 cease being display displayed by computer system 101. In some embodiments, the user interface 1140 continues to be displayed while the computer system 101 redisplays the expanded user interface 1104 if the user interface 1140 is not located at the first location, where the expanded user interface 1104 was previously displayed and at which it is now redisplayed. In some embodiments, applications other than the content application are displayed concurrently with the mini player user interface 1136. However, in some embodiments, applications other than the content application are not displayed concurrently with the mini player user interface 1136. In some embodiments, the mini player user interface 1136 and/or user interface 1140 cease being display by fading out from the three-dimensional environment 1102. Fading out optionally includes blurring the mini player user interface 1136 and/or user interface 1140 and increasing the translucency. In some embodiments, the selection of element 1138*b* does not affect playback of the content item or the location of other objects in the three-dimensional environment 1102.

Figure 11E:
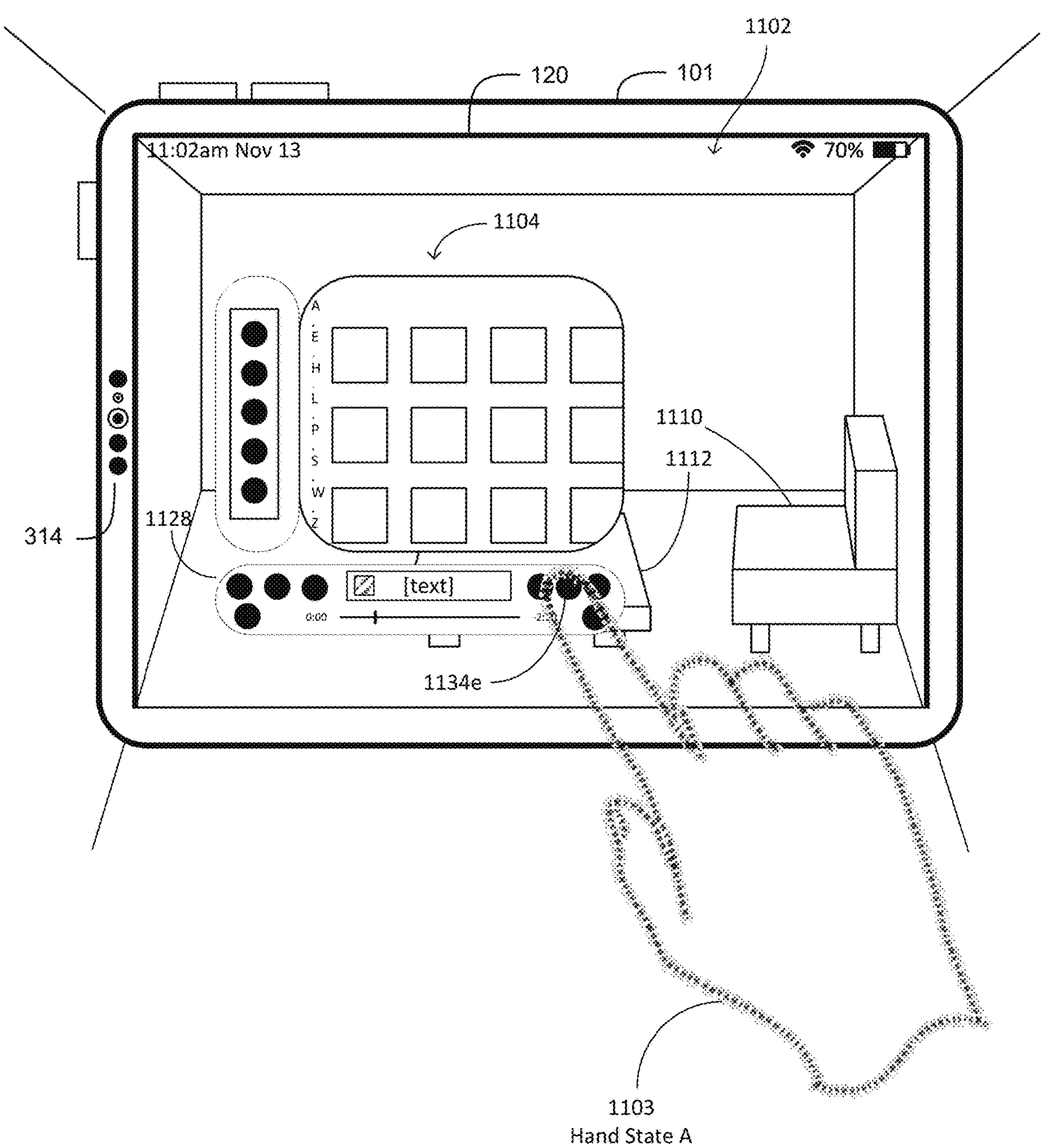
Figure 11F:
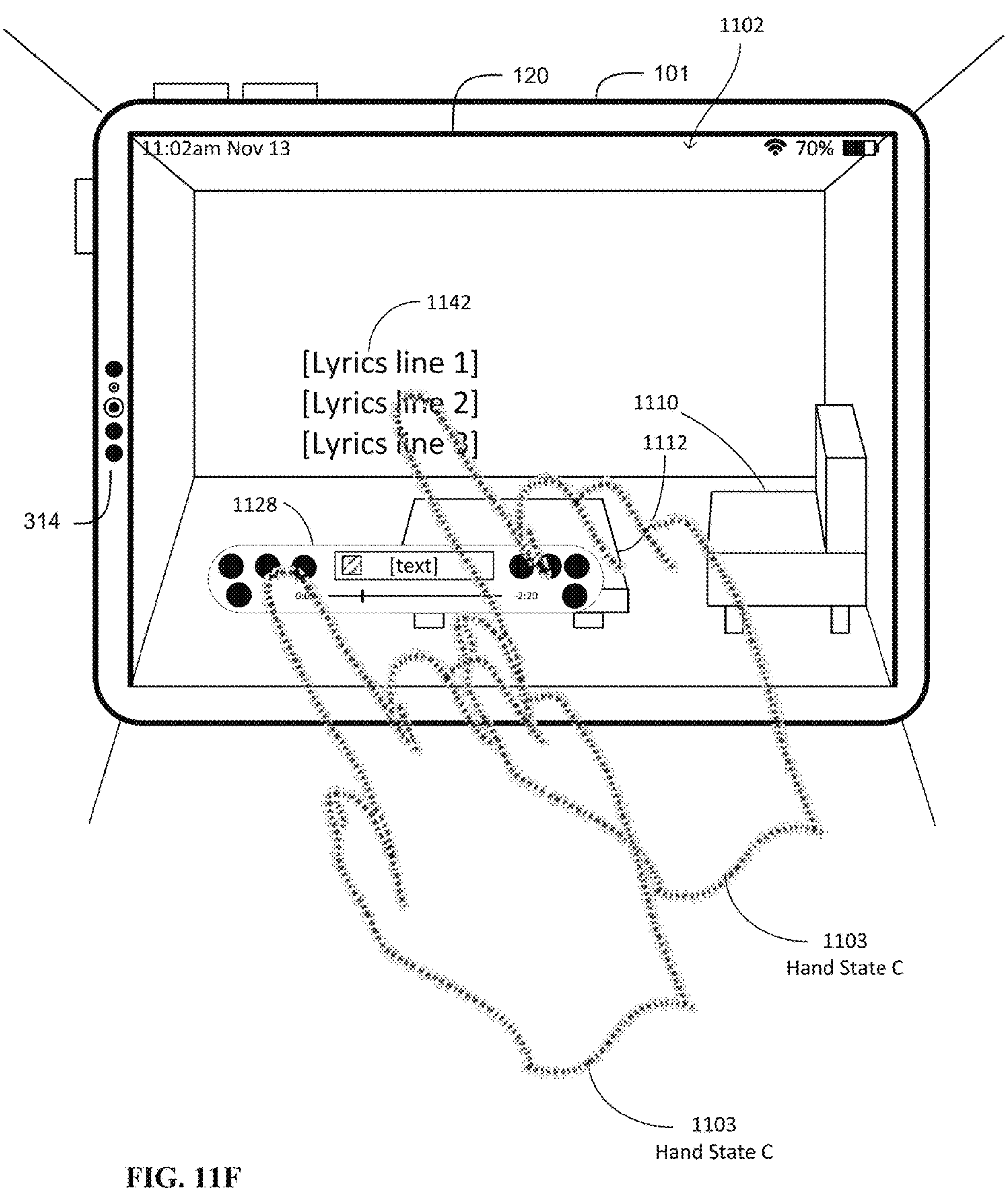

FIG. 11E illustrates the selection of option 1134*e* using hand 1103*d* in Hand State A. In some embodiments, hand 1103*d* makes a selection gesture, as described above. In some embodiments, a selection input, such as a gaze of a user, is detected by computer system 101 towards option 1134*c*. In response to detecting an input directed at option 1134*e*, the time-synced lyrics 1142 are displayed, as shown in FIG. 11F. The time-synced lyrics 1142 are optionally displayed in place of the expanded user interface 1104 and the expanded user interface 1104 ceases to be displayed. In some embodiments, the playback control element 1128 continues to be displayed. For example, the time-synced lyrics 1142 may be displayed at a location at which the navigation element 1124 and the content browsing element 1126 were previously displayed. The time-synced lyrics 1142 are optionally displayed at a location with reference one or more steps of method 1200. In other examples, the time-synced lyrics 1142 are optionally displayed at a different location than where the navigation element 1124 and the content browsing element 1126 were displayed. In some embodiments, the selection of option 1134*e* does not affect the playback of the content item. For example, the content item continues playing during and after the selection of the option 1134*c*.

In some embodiments, the time-synced lyrics 1142 are lyrics associated with the content item currently playing via the content application of the computer system 101. The computer system 101 optionally presents a portion of the lyrics 1142 corresponding to the portion of the content item currently playing on the computer system 101 via the content application and updates the portion of lyrics 1142 in accordance with continued playback of the content item. In some embodiments, the lyrics 1142 include a line of lyrics corresponding to the portion of the content item that is currently playing, one or more lines of lyrics corresponding to a portion of the content item prior to the portion of the content item that is currently playing, and/or one or more lines of lyrics corresponding to a portion of the content item that will play after the portion of the content item that is currently playing.

FIG. 11E also illustrates an input to move an object (e.g., playback control element 1128 and/or lyrics 1142) using hand 1103 (or an indirect input such as a gaze of a user). For example, the computer system 101 detects the direct selection of playback control element 1128 using hand 1103 in Hand State C and/or the direct selection of lyrics 1142 using hand 1103 in Hand State C, as shown in FIG. 11F. In some embodiments, hand 1103 performs an indirect selection of playback control element 1128 or lyrics 1142. Direct and indirect selections are described in further detail above. In some embodiments, hand 1103 moves (e.g., to the right) the playback control element 1128 or the lyrics 1142. In some embodiments, computer system 101 responds to each input using hand 1103 as described herein, independently.

Figure 11G:
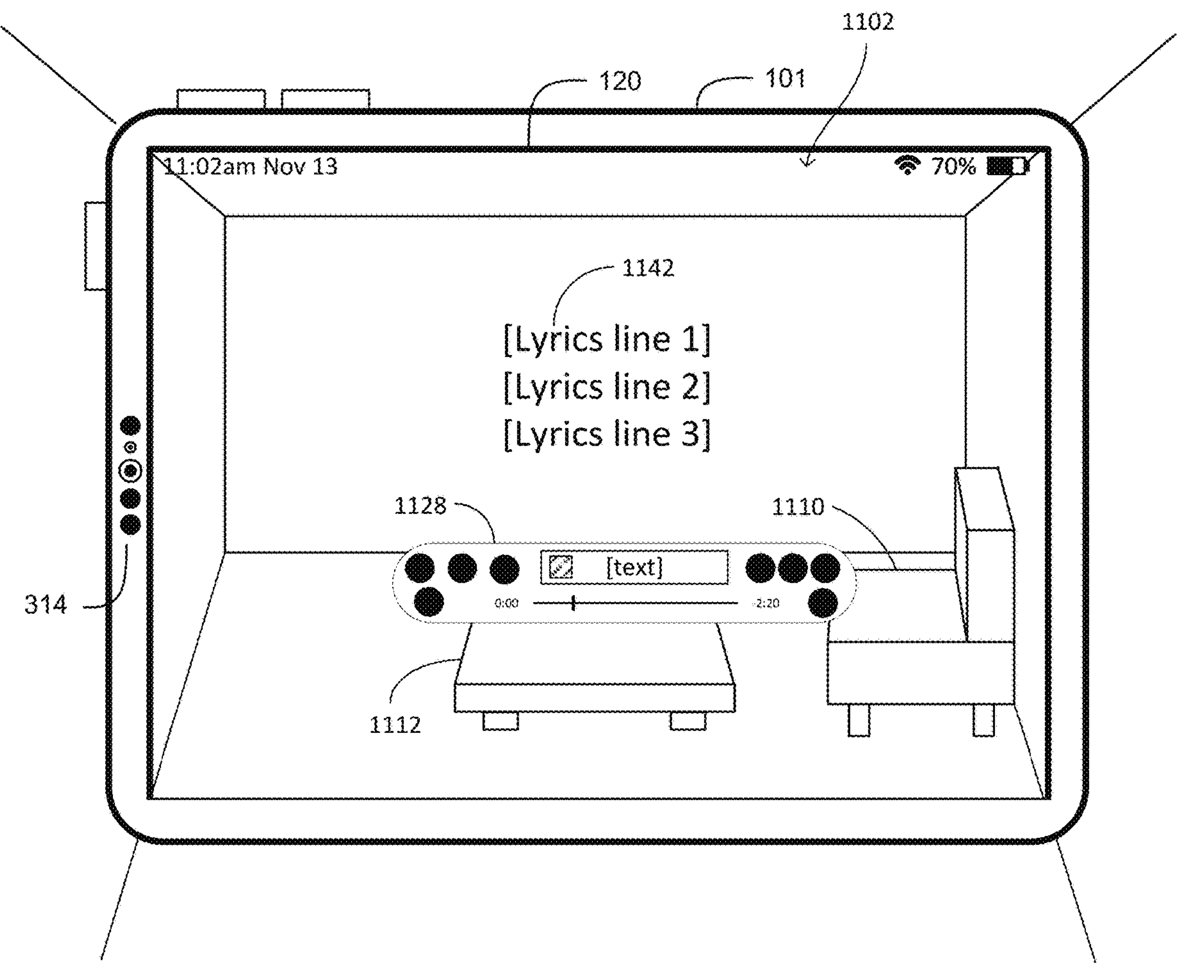

As shown in FIG. 11G, the playback control element 1128 and the lyrics 1142 are in a new location in the three-dimensional environment 1102 as a result of the input(s) detected by computer system 101 in FIG. 11F. It should be understood that, although FIG. 11F illustrates selection of both the playback control element 1128 and the lyrics 1142, in some embodiments, the inputs are detected at different times, rather than concurrently. Moreover, although FIG. 11G illustrates the movement of both the playback control element 1128 and the lyrics 1142 as a result of both inputs, in some embodiments, a movement input on the playback control element 1128 causes the playback control element 1128 and the lyrics 1142 to both move in the same magnitude and direction. Similarly, in some embodiments, a movement input on the lyrics 1142 causes the playback control element 1128 and the lyrics 1142 to both move in the same magnitude and direction. In other words, the playback control element 1128 and the lyrics 1142 optionally move together. In some embodiments, while a movement input on playback control element 1128 causes the playback control element 1128 and the lyrics 1142 to move together, a movement input on lyrics 1142 causes lyrics 1142 to move independently of playback control element 1128 (e.g., without moving playback control element 1128). The movement of the playback control element 1128 and the lyrics 1142 optionally do not affect the playback of the content item.

Figure 11H:
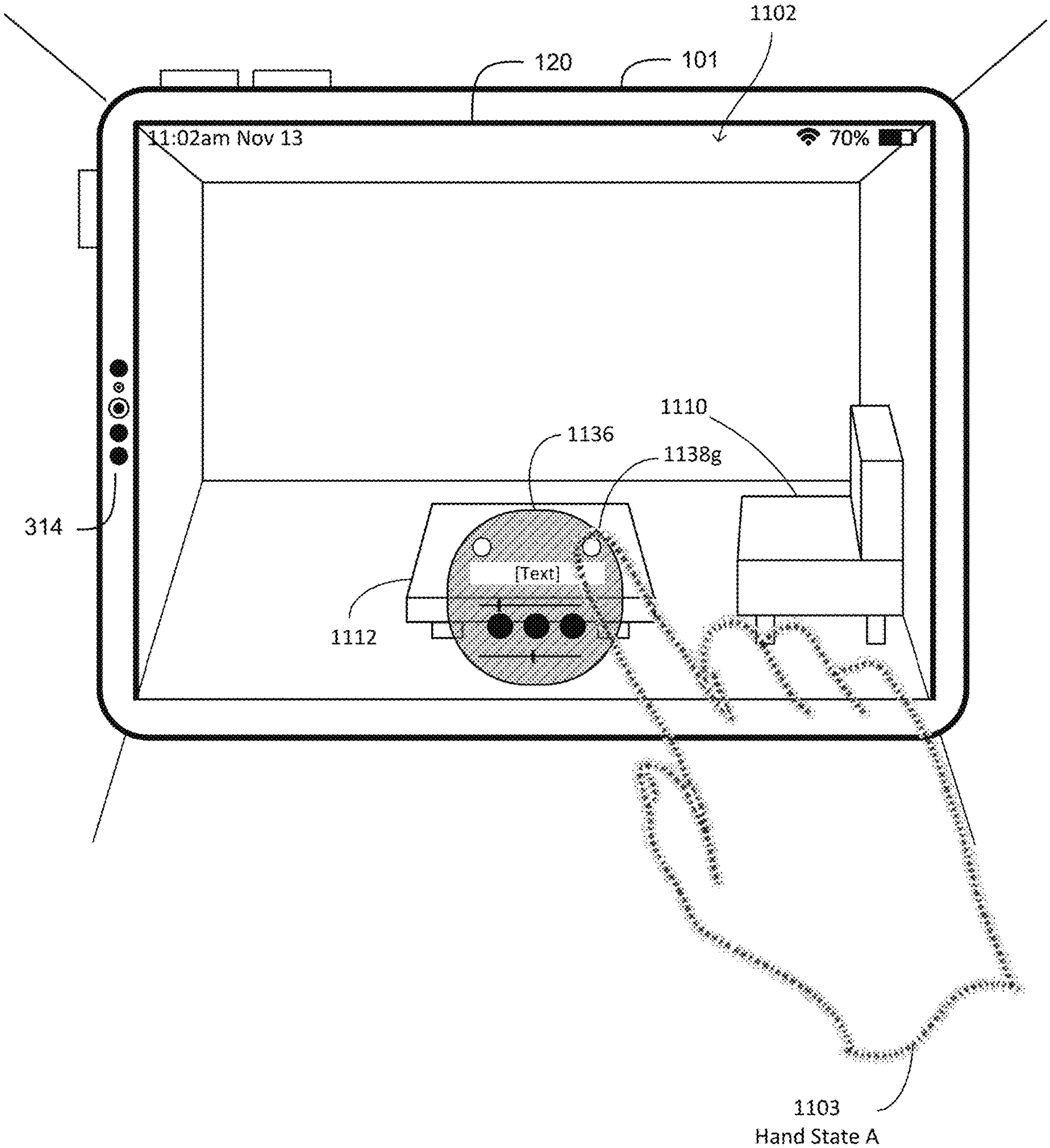
Figure 11I:
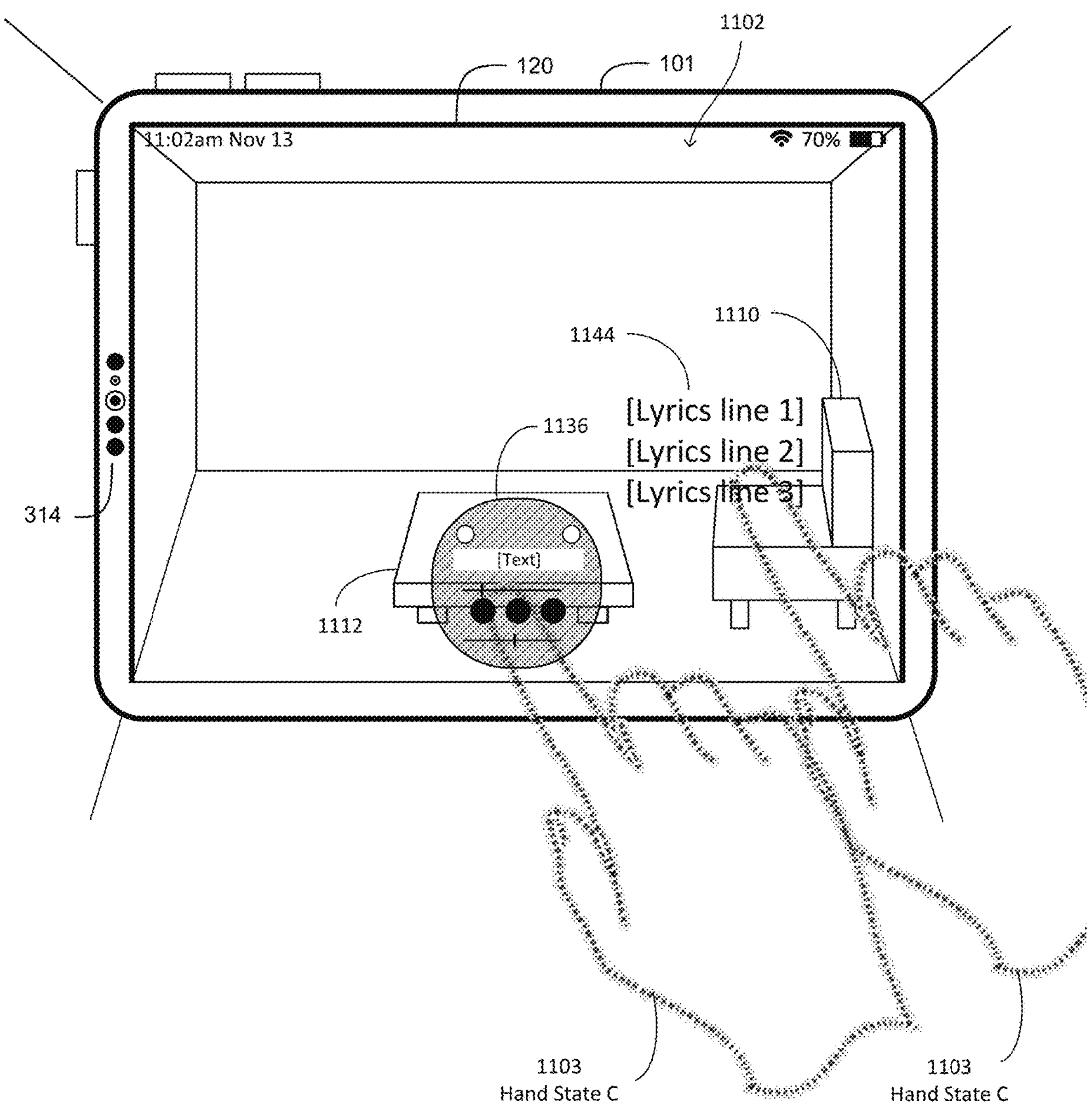

FIG. 11H illustrates an example of a hand 1103*g* selecting element 1138*c*. Hand 1103*g* is making the selection gesture (e.g., Hand State A). In some embodiments, an input directed towards element 1138*c* results in the computer system 101 updating the three-dimensional environment. As shown in FIG. 11I, the computer system 101 updates the three-dimensional environment 1102 to include time-synced lyrics 1144 as a result of the selection of element 1138*c* in FIG. 11H. The time-synced lyrics 1144 have one or more properties of the lyrics 1142, described above. The lyrics 1144 are displayed outside of a boundary of the mini player user interface 1136. In some embodiments, the lyrics 1144 are displayed proximate to (e.g., within 1, 2, 3, 5, 10, 15, 20, 30, or 50 centimeters or 1, 2, 3, or 5 meters of) the mini player user interface 1136. In some embodiments, the lyrics 1144 are displayed to the left or right of the mini player user interface 1136. In some embodiments, the lyrics 1144 are displayed at the same z-depth (e.g., distance) from the viewpoint of the user as the mini player user interface 1136.

Figure 11J:
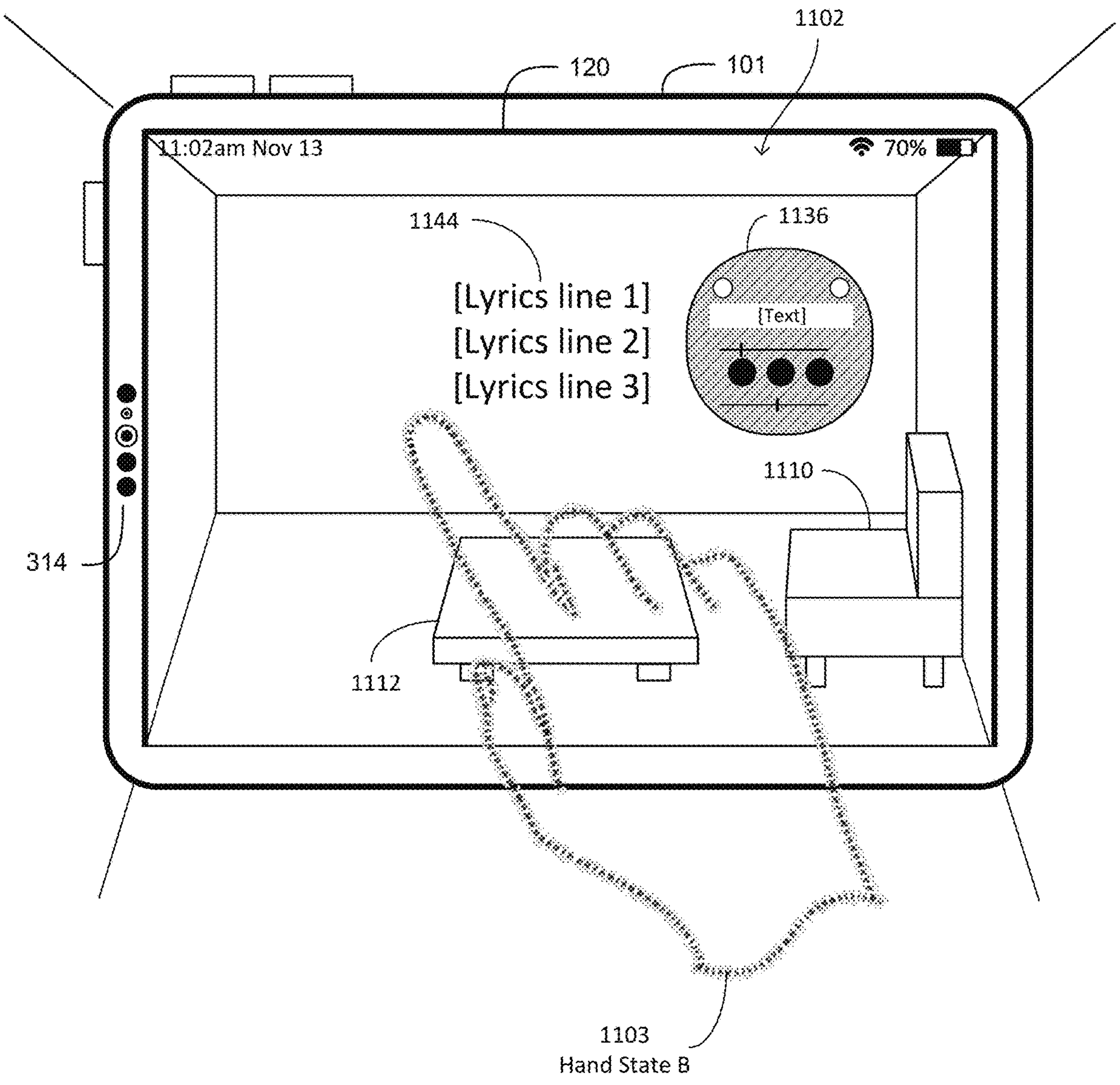

FIG. 11I also illustrates hand 1103 in Hand State C to perform a select and move gesture on the lyrics 1144 and/or the mini player user interface 1136. For example, hand 1103 moves to the left, which results in the lyrics 1144 moving to the left. Hand 1103 moves to the right which results in the mini player user interface 1136 moving to the right, as shown in FIG. 11J. In some embodiments, a direct or indirect input directed towards lyrics 1144 and/or mini player user interface 1136 achieves the results as described below. In some embodiments, a movement input on the mini player user interface 1136 causes the mini player user interface 1136 to move and the lyrics 1144 to remain in the same location. Similarly, in some embodiments, a movement input on the lyrics 1144 causes the lyrics 1144 to move and the mini player user interface 1136 to remain in the same location. In other words, the mini player user interface 1136 and the lyrics 1144 are optionally independently controllable and/or moveable. It should be noted that while multiple inputs are shown at the same time, in some embodiments, each input may be done separately. For example, the mini player user interface 1136 and the lyrics 1144 are optionally moved independently at the different times (and in different directions) with two different hands.

Figure 11K:
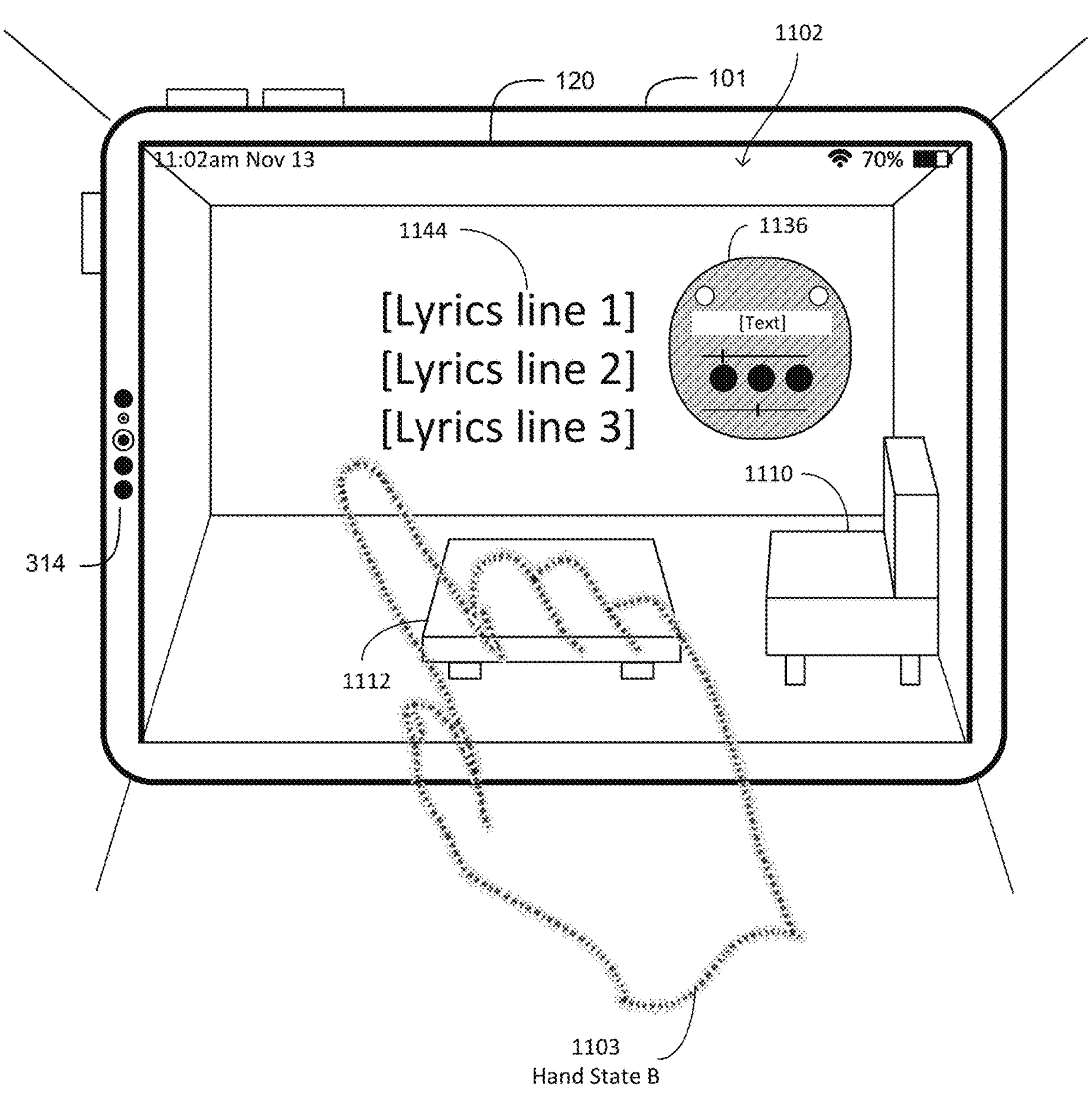

In some embodiments, lyrics 1144 are resizable. FIG. 11J illustrates hand 1103 at a corner of lyrics 1144. In some embodiments, and as shown in FIGS. 11J and 11K, hand 1103 performs a selection gesture (e.g., pinch hand shape as part of performing the pinch gesture) and a drag gesture at a corner of the lyrics 1144 (e.g., Hand State B). As a result of the input where hand 1103 selects the bottom left corner and drags away from the center of the lyrics 1144, the lyrics 1144 are larger in size, as shown in FIG. 11K. In some embodiments, the input is an indirect input. In some embodiments, the input decreases the size of the lyrics 1144. For example, an input where hand 1103 selects the bottom left corner and drags towards the center of the lyrics would result in a smaller representation of the lyrics 1144. In some embodiments, in response to the input from hand 1103, the mini player user interface 1136 does not change size. As such, the mini player user interface 1136 and the lyrics 1144 are optionally independently scalable.

Figure 11L:
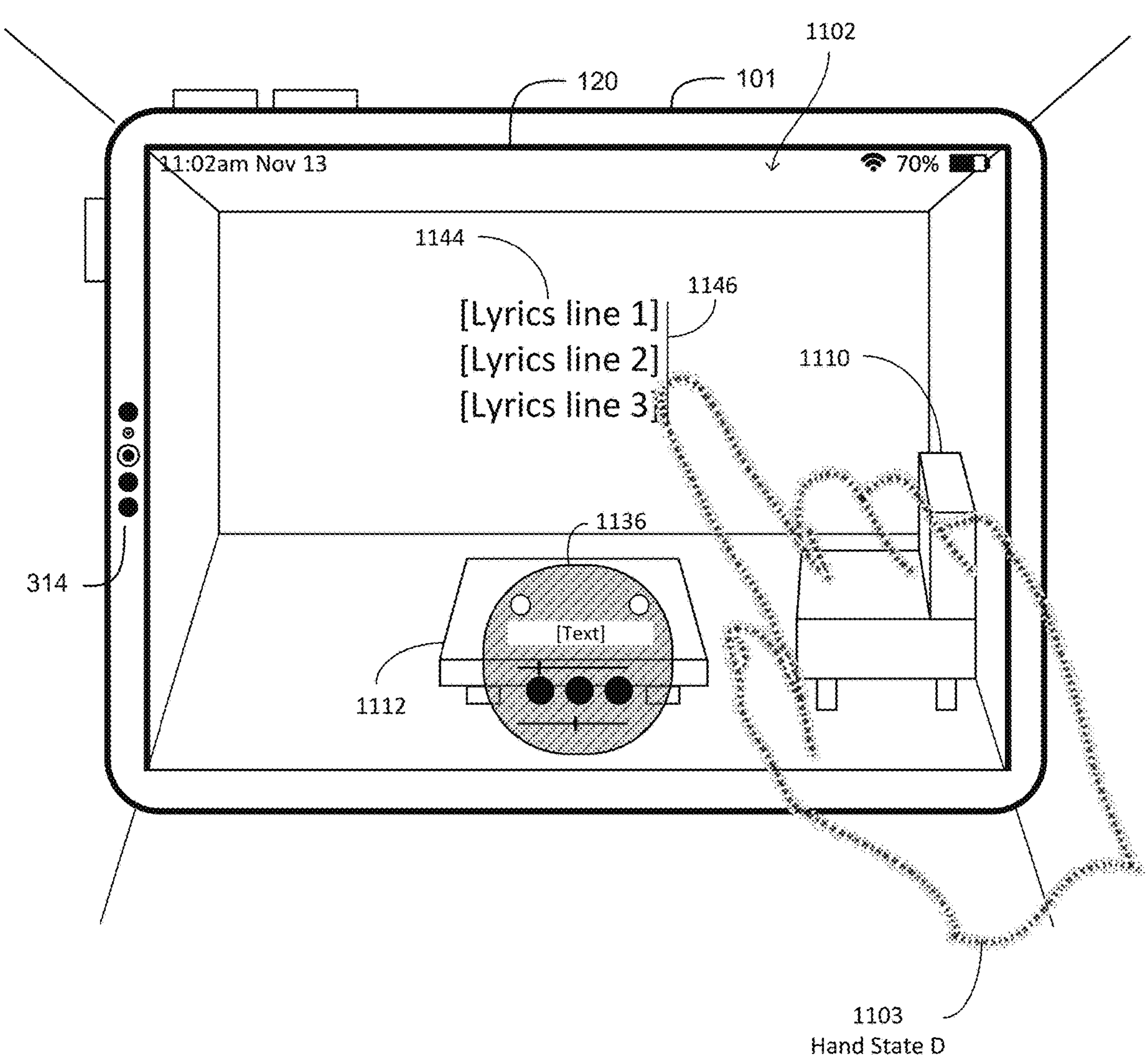
Figure 11M:
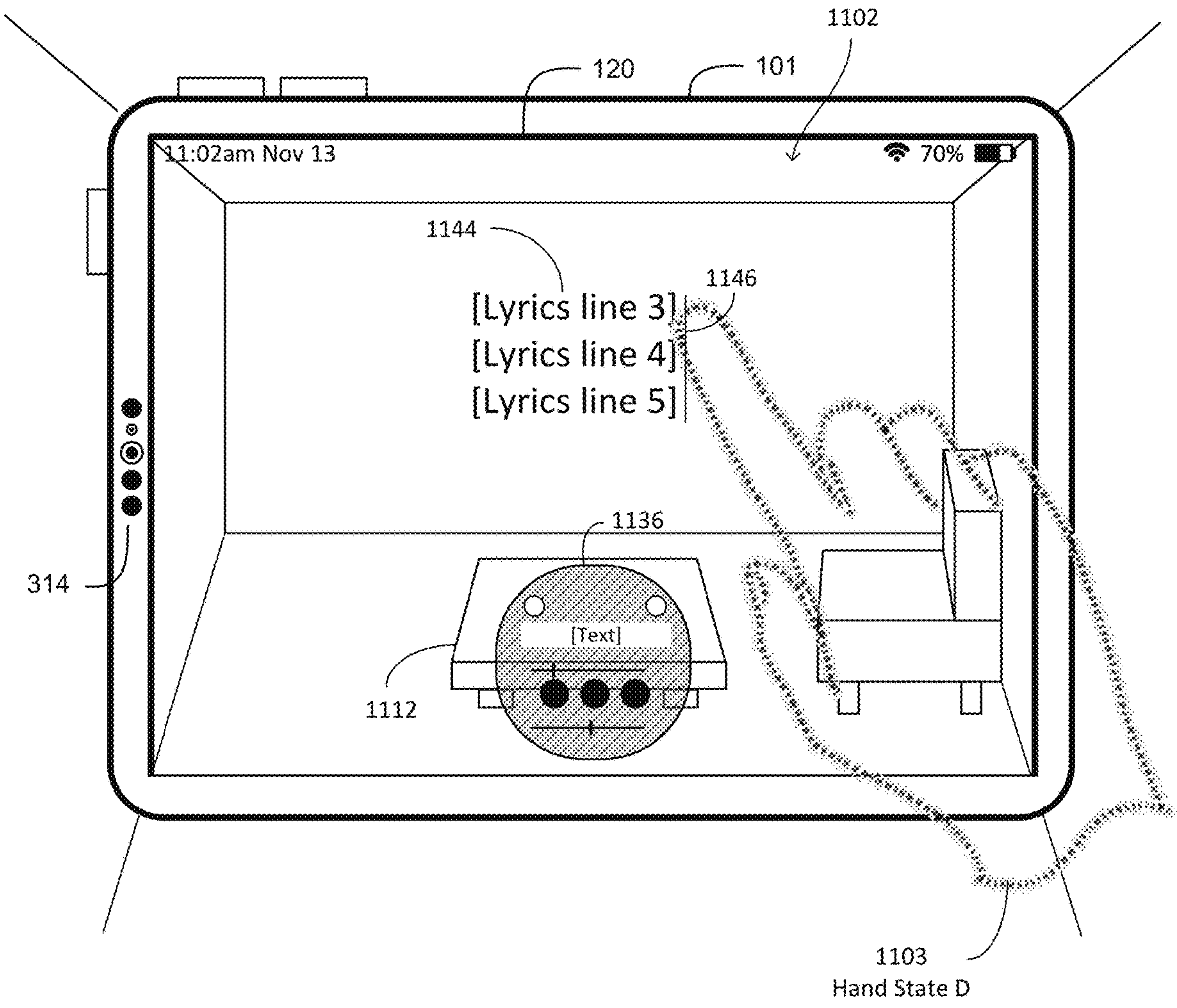
Figure 11N:
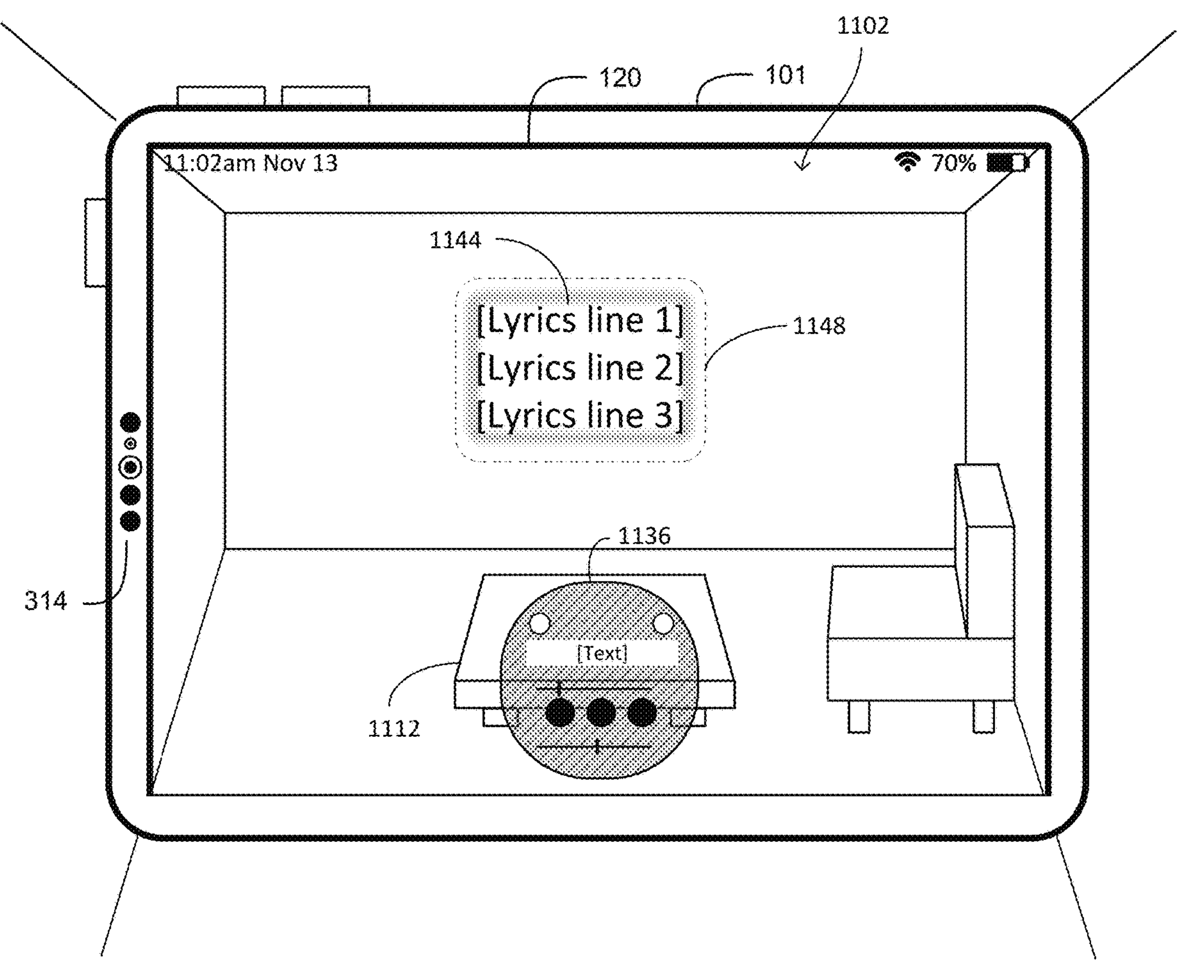

In some embodiments, lyrics 1144 are scrollable. In some embodiments, the computer system 101 displays a scroll bar 1146 next to the lyrics 1144. For example, in FIG. 11L, the scroll bar 1146 is to the right of the lyrics 1144. In some embodiments, the scroll bar 1146 may be to the left, on top of, or on the bottom of the lyrics 1144. In some embodiments, the scroll bar 1146 may be within 0.1, 1, 2, or 10 cm of the text of the lyrics 1144. In some embodiments, the scroll bar 1146 may appear next to the lyrics 1144 in response a hand (e.g. hand 1103) being detected within a predefined threshold distance (e.g., 1, 2, 3, 5, 10, 15, or 30 centimeters) of the location of the lyrics 1144. For example, as shown in FIG. 11L, hand 1103 is in a ready state (e.g., hand 1103 in Hand State D) directed towards the scroll bar 1146. As described above, detecting an input directed to a respective element (e.g., the scroll bar 1146) optionally includes detecting the hand 1103 of the user making a respective gesture, that includes a respective hand shape, such as a pinch gesture. In response to an upward motion of the hand 1103 and as shown in FIG. 11M, the computer system 101 updates the lyrics 1144 to show one or more lines of lyrics corresponding to a portion of the content item that will play after the portion of the content item that is currently playing. In some embodiments, in response to a downward motion of the hand 1103, the computer system 101 updated the lyrics 1144 to show one or more lines of lyrics corresponding to a portion of the content item that will play before the portion of the content item that is currently playing. In some embodiments, the scroll bar 1146 is not present in the three-dimensional environment. In some embodiments, in response to a drag type input directed on or near the lyrics 1144 (e.g., even if no scroll bar 1146 is displayed), the computer system scrolls through the lyrics 1144 in response. In some embodiments, scrolling with the scroll bar 1146 does not affect the playback of the content item.

In some embodiments, and similar to as described with reference to method 800, the lyrics 1144 are displayed with visual lighting effects 1148. As shown in FIG. 11N, visual lighting effects 1148 surround the outside of the boundary of the lyrics 1144. As described in one or more steps of method 800, the visual lighting effects 1148 optionally include light rays and three-dimensional particle effects. In some embodiments, the user toggles the visual lighting effects 1148 on or off using a selection gesture (e.g., Hand State A). In some embodiments, visual lighting effects 1148 are presented around the mini player user interface 1138 and the lyrics 1144. In some embodiments, the visual lighting effects 1148 have one or more of the characteristics of the visual lighting effects described with reference to methods 800 and/or 1200.

Additional or alternative details regarding the embodiments illustrated in FIGS. 11A-11N are provided below in description of method 1200 described with reference to FIG. 12.

FIG. 12 depict a flowchart illustrating an exemplary method 1200 of how a computer system displays a condensed user interface in place of an expanded user interface in response to different inputs in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector), and one or more cameras (e.g., one or more cameras that point forward from the user's head or that point downward at a user's hand, such as color sensors, infrared sensors, and other depth-sensing cameras). In some embodiments, the method 1200 is governed by instructions that are stored in a non-transitory computer-readable storage medium and that are executed by one or more processors of a computer system, such as the one or more processing units 202 of computer system 101 (e.g., controller 110 in FIG. 1A). Some operations in method 1200 are, optionally, combined and/or the order of some operations is, optionally, changed.

In some embodiments, method 1200 is performed at a computer system in communication with a display generation component and one or more input devices. In some embodiments, the computer system has one or more of the characteristics of the computer system of method 800. In some embodiments, the display generation component has one or more of the characteristics of the display generation component of method 800. In some embodiments, the one or more input devices have one or more of the characteristics of the one or more input devices of method 800.

In some embodiments, the computer system (e.g., computer system 101 shown in FIG. 11A) displays (1202*a*), via the display generation component, an expanded user interface of an application at a first location in a three-dimensional environment, such as expanded user interface 1104 shown in FIG. 11A. For example, the expanded user interface, the application, and/or the three-dimensional environment optionally have one or more of the characteristics of the user interface, the application and/or the three-dimensional environment described with reference to methods 800 and/or 1000.

In some embodiments, the application is controlling playback of a first content item at the computer system, such as the content item discussed with reference to FIG. 11A. For example, the first content item is optionally a song, video, audiobook, and/or podcast. In some embodiments, the application uses the expanded user interface and/or a bottom playback platter to control playback of the first content item, such as to initiate and/or pause the playback of the first content item.

In some embodiments, the expanded user interface includes a first selectable user interface object that is selectable to initiate playback of a second content item, different from the first content item, at the computer system, such as user interface elements 1134*a* or 1134*c* shown in FIG. 11A. (e.g., the first selectable user interface object is optionally a 2D or 3D button that is selectable to skip forward or backward from the first content item to initiate the playback of the second content item). In some embodiments, the second content item is a song, video, audiobook, and/or podcast. In some embodiments, the second content item is the same category of content as the first content item. In some embodiments, the expanded user interface is a content browsing and/or playback user interface of the application that provides access to content that is accessible via the application on the computer system. The first selectable user interface object is optionally a representation of the second content item that is displayed in the expanded user interface in response to input detected for browsing and/or searching content available to be accessed via the application.

In some embodiments, the expanded user interface is displayed concurrently with a second selectable user interface object (e.g., a selectable 2D or 3D button) that is displayed at a second location in the three-dimensional environment, separate from the expanded user interface, such as image 1130 shown in FIG. 11A. In some embodiments, the second selectable user interface object is positioned to the left, right, top, bottom, front, or back of the expanded user interface. In some embodiments, the second selectable user interface object is located on a different user interface of the application, such as a playback control user interface of the application. In some embodiments, the playback control user interface includes options to control playback of the second content item and/or first content item, add to or modify a queue of content items, and options to favorite a content item (e.g., the first content item and/or the second content item). In some embodiments, the playback control user interface is different from the expanded user interface, and has a different position and/or orientation in the three-dimensional environment relative to a current viewpoint of the user as compared with the position and/or orientation of the expanded user interface.

In some embodiments, while displaying the expanded user interface of the application (e.g., expanded user interface 1104) at the first location in the three-dimensional environment and the second selectable user interface object (e.g., image 1130) at the second location in the three-dimensional environment, the computer system receives via the one or more input devices, a first input corresponding to selection of the second selectable user interface object (1202*b*), such as an input by hand 1103. In some embodiments, the first input has one or more of the characteristics of the first input described with reference to methods 800 and/or 1000.

In some embodiments, in response to receiving the first input (1202*c*) the computer system displays (1202*d*), in the three-dimensional environment, a condensed user interface of the application, such as mini player user interface 1136 shown in FIG. 11B, (e.g., a miniplayer user interface, such as described with reference to method 800) for controlling the playback of the first content item at the computer system (e.g., the playback of the first content item includes playback of audio (e.g., music), one or move videos, one or more podcasts, and/or one or more audiobooks), wherein the condensed user interface is displayed at a third location, different from the first location and the second location, in the three-dimensional environment, such as shown in FIG. 11B (e.g., the condensed user interface has a different orientation and/or position relative to the current viewpoint of the user than the orientation and/or position of the expanded user interface and/or the second selectable user interface object and/or the bottom playback platter (e.g. playback control element 1128 in FIG. 11A). In some embodiments, the condensed user interface object is positioned to the left, right, top, bottom, front, or back of the expanded user interface and/or the location at which the expanded user interface was displayed when the first input was detected. In some embodiments, the condensed user interface object includes playback controls to control playback of the first content item or to initiate the second content item.

In some embodiments, the computer system ceases displaying (1202*c*), in the three-dimensional environment, the expanded user interface and the second selectable user interface object, such as shown by with the expanded user interface 1104 and the image 1130 ceasing to be displayed in FIG. 11B (and/or the bottom playback platter). In some embodiments, ceasing the display of the expanded user interface and the second selectable user interface object does not include ceasing the playback of the first content item and/or the second content item (e.g., playback of the first content item continues). Alternatively, in response to receiving the first input, the playback of the first content item and/or the second content item is optionally paused. Ceasing the display of the expanded user interface and the second selectable user interface object optionally includes removing the expanded user interface and the second selectable user interface object from the field of view of a user of the computer system. Displaying a condensed user interface without the expanded user interface reduces the visual distractions to the user and reduces clutter in the three-dimensional environment, thereby reducing errors in interactions with the computer system.

In some embodiments, the computer system displays, via the display generation component, a playback control user interface (e.g., bottom playback platter) of the application for controlling playback of the first content item concurrently with, and separate from, the expanded user interface in the three-dimensional environment, such as the playback control element 1128 in FIG. 11A. In some embodiments, the playback control user interface is positioned below the expanded user interface from the current viewpoint of the user. In some embodiments, and in response to a second user input received via the one or more input devices, the playback control user interface is moved to be positioned above, to the right, to the left, in front of, or behind the expanded user interface from the current viewpoint of the user. In some embodiments, the playback control user interface includes selectable options to control playback of the first content item. For example, the playback control user interface includes selectable options for playing, pausing, seeking, tracking, and/or scrubbing the first content item. Displaying a playback control user interface concurrently with the expanded user interface provides an efficient way of controlling playback of content in the three-dimensional environment, thereby improving user-device interaction by reducing the number of inputs needed to control playback of content In some embodiments, the playback control user interface (e.g., playback control element 1128) includes an image corresponding to the first content item and a third selectable user interface object for modifying playback of the first content item, such as image 1130 shown in FIG. 11A, which is a selectable user interface object. FIG. 11A also shows a plurality of user interface elements 1134*a*-1134*i* which, when selected, modify the playback of the first content item. For example, modifying playback of the first content item includes playing, pausing, skipping, and/or scrubbing. In some embodiments, the playback control user interface further includes a fourth selectable user interface object that identifies a content item (e.g., first content item and/or second content item) as a favorite content item. Displaying a user interface with an image corresponding to the first content item provides feedback about the respective content being played, thereby reducing the number of inputs needed to retrieve additional information relating to the first content item and reducing errors in interaction with the computer system.

In some embodiments, the second selectable user interface object comprises the image corresponding to the first content item, such as image 1130 in FIG. 11A. For example, the image includes an album cover of a music album (e.g., the first content item is a song included in the music album, and the second selectable user interface object includes the image of that album). In some embodiments, as a result of receiving a second input corresponding to selecting the second selectable user interface object, the playback control user interface ceases to be displayed. In some embodiments, the condensed user interface is displayed in response to such a selection. Using the image corresponding to the first content item as the second selectable user interface object allows for efficient access to the condensed user interface and gives feedback about the content the second selectable user interface object corresponds to, thereby reducing resources needed to display the condensed user interface and reduces likelihood of erroneous inputs directed to the playback control user interface.

In some embodiments, while displaying the condensed user interface of the application (e.g., mini player user interface 1136), (e.g., and while not displaying the playback control user interface and/or while not displaying the expanded user interface), the computer system receives, via the one or more input devices, a second input corresponding to a request to display a second user interface corresponding to a second application, such as if hand 1103 were to open a separate application (e.g., mail application, web browsing application, notes application, and/or social media application, or any application other than the content playback application described above), different from the application, in the three-dimensional environment. In some embodiments, the second input includes a selection of a third selectable user interface object for opening the second application. In some embodiments, the third selectable user interface object is an icon representing the second application. In some embodiments, the icon is displayed in a menu of icons, wherein each icon represents a different application (e.g., is selectable to display a different application). In some embodiments, the third user interface object is not displayed unless and until the pose of a respective portion of the user satisfies one or more criteria. In some embodiments, the pose of the hand of the user satisfies the one or more criteria when the hand of the user is within a field of view of a hand tracking device in communication with the computer system. In some embodiments, the pose of the hand of the user satisfies the one or more criteria when the hand of the user is within a predetermined area of the three-dimensional environment, such as being raised relative to the rest of the body of the user (e.g., by a threshold amount). In some embodiments, the pose of the hand of the user satisfies the one or more criteria when the hand of the user is in a pose corresponding to the ready state of the computer system corresponding to the beginning of an input provided by the hand of the user, such as a pointing hand shape (e.g., in which one or more fingers are extended and one or more fingers are curled to the palm) or pre-pinch hand shape (e.g., a hand shape in which the thumb is within a predetermined threshold distance (e.g., 0.1, 0.2, 0.3, 0.5, 1, 2, 3, etc. centimeters) of another finger of the hand without touching the finger). In some embodiments, the pose of the hand does not satisfy the one or more criteria when the hand is not detected by the hand tracking device.

In some embodiments, in response to receiving the input corresponding to displaying the second user interface, the computer system concurrently displays, in the three-dimensional environment, the condensed user interface of the application and the second user interface corresponding to the second application, such as shown in FIG. 11D wherein a user interface 1140 is displayed proximal to the mini player user interface 1136. In some embodiments, the second user interface corresponding to the second application is positioned above, below, in front of, behind, to the left, or to the right of the condensed user interface of the application. In some embodiments, in response to a third input corresponding to a request to move the second user interface, the spatial relationship between the second user interface and the condensed user interface is updated. In some embodiments, the second user interface is displayed at the first location where the expanded user interface was displayed. In some embodiments, the second user interface is displayed in the same orientation as the expanded user interface that was previously displayed. In some embodiments, the second user interface is displayed at a fourth location different from the first location where the expanded user interface was displayed and the third location where the condensed user interface is displayed. In some embodiments, the condensed user interface is displayed concurrently with the second user interface corresponding to the second application. Displaying a second user interface concurrently with the condensed user interface provides an efficient way of viewing the contents of the second application and ensures contents of the second application are visible without the need for further input from the user, thereby improving user-device interaction.

In some embodiments, while displaying the second user interface (e.g., user interface 1140) corresponding to the second application (e.g., while not displaying the condensed user interface and/or while not displaying the expanded user interface), the computer system receives, via the one or more input devices, a third input corresponding to a request to display a third user interface corresponding to a third application (e.g., mail application, web browsing application, notes application, and/or social media application, or any application other than the content playback application described above), different from the application and the second application, such as if hand 1103 were to open another application separate from the content application and the second application. In some embodiments, the third input includes tapping with a finger on a touch-sensitive surface and/or air pinching with a finger and a thumb of a hand of a user and gazing with the eyes of the user at the third selectable user interface object. The second input optionally has one or more characteristics of the first input described above.

In some embodiments, in response to receiving the third input corresponding to displaying the third user interface, the computer system ceases the display of the second user interface and displaying the third user interface, such as if only the third application is displayed in the three-dimensional environment 1102. In some embodiments, the third user interface is displayed at a location at which the second user interface was last displayed. Alternatively and in some embodiments, the third user interface is displayed at a location above, below, in front of, behind, to the right, or to the left of the second user interface and/or the condensed user interface. In some embodiments, and while the condensed user interface is displayed concurrently with the second user interface corresponding to the second application, the third user interface corresponding to the third application is also displayed concurrently with the second user interface and the condensed user interface. In some embodiments, the condensed user interface is optionally displayed concurrently with the second user interface and the third user interface. Ceasing the display of the second user interface in response to displaying the third user interface allows for efficient access to the third user interface thereby reducing the risk of spatial conflicts between the second user interface and the third user interface.

In some embodiments, the condensed user interface includes a third selectable user interface object that is selectable to redisplay the expanded user interface, such as element 1138*b* shown in FIG. 11D. In some embodiments, while displaying the third selectable user interface object displayed concurrently with the condensed user interface (e.g., mini player user interface 1136), the computer system receives, via the one or more input devices, a fourth input corresponding to selection of the third selectable user interface object, such as with hand 1103 shown in FIG. 11D. In some embodiments, the third selectable user interface object is not displayed unless and until the pose of a respective portion of the user satisfies one or more criteria as described above. The fourth input optionally has one or more of the characteristics of the first input as described above.

In some embodiments, in response to receiving the fourth input corresponding to the selection of the third selectable user interface object, the computer system displays (optionally in accordance with a determination that the second user interface is displayed at a location at which the expanded user interface was last displayed) the expanded user interface and ceasing display of the second user interface corresponding to the second application, such as shown by ceasing the display of the mini player user interface 1136 and the redisplay of the expanded user interface 1104 in FIG. 11E. In some embodiments, in response to receiving the fourth input corresponding to the selection of the third selectable user interface object, a playback control user interface is also displayed. The playback control user interface is described in further detail above. In some embodiments, displaying the expanded user interface further includes ceasing display of the condensed user interface. In some embodiments, the expanded user interface is displayed at the location at which the second user interface was last displayed and/or the location at which the expanded user interface was last displayed. In some embodiments, in accordance with a determination that the second user interface is displayed at the fourth location, different than the first location where the expanded user interface was displayed, the expanded user interface is displayed concurrently with the second user interface in response to the fourth input. Ceasing the display of the second user interface while displaying expanded user interface allows for efficient access to the third user interface thereby reducing the risk of spatial conflicts between the second user interface and the third user interface.

In some embodiments, while displaying the condensed user interface, the computer system receives, via the one or more input devices, a second input corresponding to a request to resize the condensed user interface, such as hand 1103 in FIG. 11B. For example, resizing the condensed user interface includes enlarging or shrinking the condensed user interface. The second input optionally has one or more characteristics of the first input described above. In some embodiments, the magnitude and direction of the user interaction (e.g., air pinching, air dragging, and/or releasing) directed towards the condensed user interface determines the updated size of the condensed user interface. For example, air pinching with the thumb and index finger of the hand of the user directed to a corner of the condensed user interface and dragging the corner inward, towards the center of the condensed user interface (e.g., corresponding to a scaling down input) indicates that the updated size of the condensed user interface is smaller than the previous size. For example, air pinching and air dragging directed to the corner of the condensed user interface outwards away from the center of the condensed user interface (e.g., corresponding to a scaling up input) indicates that the updated size of the condensed user interface is larger than the previous size. In some embodiments, the second input optionally includes tapping and dragging, on a touch-sensitive surface, using a finger, a corner of the condensed user interface inwards or outwards to decrease or increase (respectively) the size of the condensed user interface.

In some embodiments, in response to receiving the second input corresponding to the request to resize the condensed user interface, the computer system updates a size of the condensed user interface in the three-dimensional environment in accordance with the input corresponding to the request to resize the condensed user interface, such as shown by the change in size of the mini player user interface 1136 between FIG. 11B and FIG. 11C. In some embodiments, while the size of the condensed user interface is changed, the size of one or more of any of the other user interfaces displayed concurrently with the condensed user interface (e.g., second user interface and/or third user interface) remain the same. In some embodiments, the resized condensed user interface remains at the same location as the originally sized condensed user interface. The same location optionally refers to the center point of the resized condensed user interface remaining at the same location as the originally sized condensed user interface. Alternatively, the same location optionally refers to a corner and/or edge of the resized condensed user interface remaining at the same location as the originally sized condensed user interface. Resizing the condensed user interface in response to an input corresponding to a request to resize the condensed user interface ensures that the condensed user interface remains interactable by the user and reduces the clutter in the three-dimensional environment.

In some embodiments, the condensed user interface includes a third selectable user interface object that is selectable to display a representation of lyrics of the first content item, such as shown by element 1138*g* on the mini player user interface 1136 in FIG. 11H, and the playback control user interface includes a fourth selectable user interface object that is selectable to display a representation of lyrics of the first content item, such as shown by element 1134*e* on the playback control element 1128 in FIG. 11E. In some embodiments, the third selectable user interface object and the fourth selectable user interface object are selectable icons. In some embodiments, the third selectable user interface object is located near a corner or next to the playback controls of the condensed user interface. In some embodiments, the fourth selectable user interface object is located next to the selectable options to control playback. In some embodiments, a second input, which has one or more of the characteristics of the first input described above, is used to select the third selectable user interface object. In some embodiments, a third input, which has one or more of the characteristics of the first input described above, is used to select the fourth selectable user interface object. Displaying a user interface with selectable options to display the representation of the lyrics provides easy access to additional information relating to the first content item, thereby reducing the number of inputs needed to retrieve additional information and reducing errors in interaction with the computer system.

In some embodiments, while displaying the condensed user interface including the third selectable user interface object, the computer system receives, via the one or more input devices, a second input corresponding to selection of the third selectable user interface object, such as with hand 1103 in FIG. 11H. In some embodiments, the third selectable user interface object is not displayed unless and until the pose of a respective portion of the user satisfies one or more criteria as described above. In some embodiments, the second input has one or more of the characteristics of the first input described above, and is used to select the third selectable user interface object. For example, the second input includes an air pinch using a hand of a user and a gaze or attention towards the third selectable user interface object. For example, the second input includes tapping on a touch sensitive surface using fingers of the user.

In some embodiments, in response to receiving the second input, the computer system displays the representation of the lyrics of the first content item concurrently with the condensed user interface in the three-dimensional environment, wherein the representation of the lyrics is displayed at a fourth location in the three-dimensional environment and the condensed user interface is displayed at a fifth location, different from the fourth location, in the three-dimensional environment, such as shown by the display of lyrics 1144 and the mini player user interface 1136 in FIG. 11J as a result of the input with hand 11*g* in FIG. 11H. Alternatively, and in some embodiments, the representation of the lyrics is displayed at the fourth location and the condensed user interface ceases displaying. In some embodiments, the condensed user interface is displayed at the third location (e.g., the condensed user interface does not move in the three-dimensional environment) and the representation of the lyrics is displayed at the fourth location. In some embodiments, in response to a third input (e.g., air swiping with an index finger of a user when in close proximity to the representation of the lyrics (e.g., corresponding to direct interaction) or air pinching with the index finger and thumb and air dragging the representation of the lyrics up or down when at a distance from the representation of the lyrics (e.g., corresponding to indirect interaction)), additional representation of the lyrics are displayed. In some embodiments, the representation of the lyrics is displayed with lighting effects, such as the respective lighting effects discussed with reference to method 800. Displaying a representation of lyrics corresponding to the first content item provides an efficient way of viewing the lyrics and ensures the lyrics are visible without the need for further input from the user, thereby improving user-device interaction.

In some embodiments, while displaying the representation of the lyrics at a fourth location in the three-dimensional environment and the condensed user interface is at a fifth location in the three-dimensional environment, the computer system receives, via the one or more input device, a second input corresponding to a request to move the condensed user interface, such as an input with hand 1103*m* shown in FIG. 11J. The second input optionally has one or more characteristics of the second input described above. In some embodiments, the magnitude and direction of the user interaction (e.g., air pinching, air dragging, and/or releasing) directed towards the condensed user interface determines the direction and/or final location of the condensed user interface. For example, air pinching with the thumb and index finger of the hand of the user and air dragging the condensed user interface moves the condensed user interface to a desired location (e.g., where the air dragging and air pinching ends). For example, tapping and dragging using a finger of the user on a touch sensitive screen moves the condensed user interface to a desired location (e.g., where the tapping and dragging ends).

In some embodiments, in response to receiving the second input, the computer system moves the condensed user interface to a sixth location in the three-dimensional environment in accordance with the second input, such as shown by the movement of the mini player user interface 1136 between FIG. 11J and FIG. 11K, and maintains the representation of the lyrics of the first content item at the fourth location in the three-dimensional environment, such as if lyrics 1144 remain in the same location between FIG. 11J and FIG. 11K. In some embodiments, the representation of the lyrics of the first content item is moved to a seventh location in the three-dimensional environment in response to receiving the second input. In some embodiments, the sixth location and the seventh location have the same relative positioning to each other as the fourth location and the fifth location does to each other. In some embodiments, the computer system updates the location of the condensed user interface and the representation of the lyrics at the updated locations with a fade-in animation effect. In some embodiments, other virtual objects are "world locked" and remain at respective locations in the three-dimensional environment unless and until an input to update their locations is received. Maintaining the location in the three-dimensional environment at which the representation of the lyrics is displayed while changing the location of the condensed user interface provides an efficient way of allowing the user to view other user interfaces and content in the three-dimensional environment without obstruction or distraction by the user interface of the application, thereby improving user device interaction.

In some embodiments, while displaying the representation of the lyrics at a fourth location in the three-dimensional environment and the condensed user interface is at a fifth location in the three-dimensional environment, the computer system receives, via the one or more input device, a second input corresponding to a request to move the representation of the lyrics of the first content item, such as with hand 1103. The second input optionally has one or more characteristics of the second input described above.

In some embodiments, in response to receiving the input corresponding to moving the representation of the lyrics of the first content item, the computer system moves the representation of the lyrics of the first content item to a sixth location, such as shown by the movement of lyrics 1144 between FIG. 11J and FIG. 11K, and maintains the location of the condensed user interface, such as if the mini player user interface 1136 remains in the same location between FIG. 11J and FIG. 11K, such as described with reference to the maintaining of the representation of the lyrics of the first content item at the fourth location. Maintaining the location in the three-dimensional environment at which the condensed user interface is displayed while changing the location of the representation of the lyrics provides an efficient way of allowing the user to view other user interfaces and content in the three-dimensional environment without obstruction or distraction by the user interface of the application, thereby improving user device interaction.

In some embodiments, while displaying the representation of the lyrics with a first size in the three-dimensional environment, the computer system receives, via the one or more input device, a second input corresponding to a request to modify a size of the representation of the lyrics of the first content item, such as with hand 1103 in FIG. 11K. The second input optionally has one or more characteristics of the second input described above. In some embodiments, the magnitude and direction of the user interaction (e.g., air pinching, air dragging, and/or releasing) directed towards the representation of the lyrics of the first content item determines the updated size of the representation of the lyrics. For example, air pinching with the thumb and index finger of the hand of the user on a corner of the representation of the lyrics and air dragging the corner inward, towards the center of the representation of the lyrics indicates that the updated size of the representation of the lyrics is smaller than the previous size. For example, air pinching and air dragging the corner of the representation of the lyrics outwards away from the center of the representation of the lyrics indicates that the updated size of the representation of the lyrics is larger than the previous size. For example, tapping and dragging a corner of the representation of the lyrics on a touch sensitive screen optionally modifies the size of the representation of the lyrics similarly to the air punching and air dragging method.

In some embodiments, in response to receiving the second input, the computer system modifies the representation of the lyrics of the first content item to have a second size, different from the first size, in the three-dimensional environment in accordance with the second input, and maintains a size of the condensed user interface in the three-dimensional environment, such as shown with the change in size of lyrics 1144 and the maintenance of size of the mini player user interface 1136 between FIG. 11K and FIG. 11L. In some embodiments, the second input corresponds to a request to modify the size of the condensed user interface, and in response to receiving the second input, the size of the condensed user interface is modified while the size of the representation of the lyrics remains the same. In some embodiments, the response to receiving the second input includes modifying the size of the condensed user interface and the representation of the lyrics. For example, the condensed user interface and the representation of the lyrics are the second size different from the first size of the condensed user interface and the representation of the lyrics. In some embodiments, the second size is determined by the distance traveled by hand/fingers while performing the air pinch drag. Resizing the representation of the lyrics in response to an input corresponding to a request to resize the representation of the lyrics allows for efficient access to the condensed user interface and/or other content and user interfaces and reduces the clutter in the three-dimensional environment thereby improving user device interaction.

In some embodiments, while displaying the expanded user interface and a third selectable user interface object that is selectable to display a representation of lyrics of the first content item, such as element 1134*c* on the playback control element 1128 in FIG. 11E (e.g., the third selectable user interface object is optionally located in the playback control user interface or the expanded user interface), wherein the expanded user interface is displayed at the first location in the three-dimensional environment, the computer system receives, via the one or more input devices, a second input corresponding to a selection of the third selectable user interface object, such as with hand 1103*d* in FIG. 11E. In some embodiments, the second input includes tapping with a finger on a touch-sensitive surface and/or air pinching with a finger and a thumb of a hand of a user and gazing with the eyes of the user at the third selectable user interface object. The second input optionally has one or more characteristics of the first input described above.

In some embodiments, in response to receiving the second input, the computer system ceases display of the expanded user interface in the three-dimensional environment at the first location, and displays, in the three-dimensional environment, the representation of the lyrics of the first content item at the first location, such as lyrics 1142 displayed with the playback control element 1128 in FIG. 11F. In some embodiments, the representation of the lyrics is displayed at a third location, concurrently, with the expanded user interface in response to receiving the second input. In some embodiments, in response to receiving the second input, a playback control user interface is still displayed. The playback control user interface optionally has one or more characteristics of the playback control user interface described above. As such, the representation of the lyrics of the first content item is optionally displayed concurrently with the playback control user interface. Displaying the representation of the lyrics while not displaying the expanded user interface reduces the visual distraction to the user by reducing the visual clutter in the three-dimensional environment, thereby reducing errors in interactions with the computer system.

In some embodiments, displaying the representation of the lyrics of the first content item at the first location includes displaying the representation of the lyrics of the first content item with a size that is different from (and/or independent of) a size of the expanded user interface that was displayed when the second input was detected, such as the lyrics 1142 in FIG. 11F having a different size than the expanded user interface 1104 in FIG. 11E. In some embodiments, the size of the representation of the lyrics of the first content time is modified in response to receiving a third input corresponding to a request to resize the representation of the lyrics, while maintaining the size of the expanded user interface that was displayed when the second input was detected (e.g., such as the size of the expanded user interface when it is redisplayed described above). Resizing the representation of lyrics optionally includes characteristics such as described above. In some embodiments, the third input corresponds to a request to resize the expanded user interface. In response to the request, the expanded user interface is a second size independent of the size of the representation of the lyrics that was displayed (e.g., such as the size of the representation of the lyrics when it is redisplayed described above). Displaying the representation of the lyrics with a size that is different from the size of the expanded user interface ensures that the representation of the lyrics are accessible and appropriately sized when displayed, therefore reducing the need for inputs to make them accessible and/or appropriately sized.

In some embodiments, when the second input was detected, the expanded user interface was displayed concurrently with a playback control user interface that includes the second selectable user interface object (e.g., such as the playback control user interface as described above), such as the expanded user interface 1104 and the playback control element 1128 in FIG. 11A.

In some embodiments, in response to receiving the second input, the computer system displays the representation of the lyrics of the first content item concurrently with the playback control user interface, such as shown in FIG. 11F (e.g., such as the representation of the lyrics of the first content item described above). In some embodiments, the representation of the lyrics is located above, below, in front of, behind, to the right, or to the left of the playback control user interface.

In some embodiments, while concurrently displaying the representation of the lyrics of the first content item with the playback control user interface, the computer system receives, via the one or more input device, a third input corresponding to a request to move the playback control user interface in the three-dimensional environment, such as with hand 1103. The third input optionally has one or more characteristics of the second input corresponding to a request to move the condensed user interface described above.

In some embodiments, in response to receiving the third input, the computer system moves the playback control user interface in the three-dimensional environment in accordance with the third input, and moves the representation of the lyrics of the first content item in the three-dimensional environment in accordance with the third input, such as shown with the movement of the playback control element 1128 and the lyrics 1142 concurrently between FIG. 11F and FIG. 11G. Alternatively, in some embodiments, the third input corresponds to a request to move the representation of the lyrics in the three-dimensional environment, and in response to receiving the third input, the computer system moves the playback control user interface and the representation of lyrics in the three-dimensional environment, concurrently, in the same manner (e.g., by the same amount and/or in the same direction). In some embodiments, the third input corresponding to the request to move the playback control user interface results in moving the playback control user interface and maintaining the position of the representation of the lyrics or vice versa. Moving the playback control user interface with the representation of the lyrics of the first content item with one input reduces the need for additional inputs to move the representation of the lyrics, thereby lowering the likelihood of erroneous interactions with the computer system and improving user-device interaction.

In some embodiments, aspects/operations of methods 800, 1000, and 1200 may be interchanged, substituted, and/or added between these methods. For example, the content of methods 800, 1000, and 1200, the user interfaces of methods 800, 1000, and 1200, and the inputs for invoking playback of content of methods 800, 1000, and 1200, are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A method comprising:

at a computer system in communication with a display generation component and one or more input devices:

displaying, via the display generation component, an expanded user interface of an application at a first location in a three-dimensional environment, wherein:

the application is controlling playback of a first content item at the computer system, the expanded user interface includes a first selectable user interface object that is selectable to initiate playback of a second content item, different from the first content item, at the computer system, and the expanded user interface is displayed concurrently with a second selectable user interface object that is displayed at a second location in the three-dimensional environment, separate from the expanded user interface;

while displaying the expanded user interface of the application at the first location in the three-dimensional environment and the second selectable user interface object at the second location in the three-dimensional environment, receiving via the one or more input devices, a first input corresponding to selection of the second selectable user interface object; and in response to receiving the first input:

displaying, in the three-dimensional environment, a condensed user interface of the application for controlling the playback of the first content item at the computer system, wherein the condensed user interface is displayed at a third location, different from the first location and the second location, in the three-dimensional environment;

cease displaying, in the three-dimensional environment, the expanded user interface and the second selectable user interface object;

while displaying the condensed user interface, receiving, via the one or more input devices, a second input corresponding to a request to resize the condensed user interface; and in response to receiving the second input corresponding to the request to resize the condensed user interface, updating a size of the condensed user interface in the three-dimensional environment in accordance with the second input corresponding to the request to resize the condensed user interface.

2. The method of claim 1, further comprising:

displaying, via the display generation component, a playback control user interface of the application for controlling playback of the first content item concurrently with, and separate from, the expanded user interface in the three-dimensional environment.

3. The method of claim 2, wherein the playback control user interface includes an image corresponding to the first content item and a third selectable user interface object for modifying playback of the first content item.

4. The method of claim 3, wherein the second selectable user interface object comprises the image corresponding to the first content item.

5. The method of claim 1, further comprising:

while displaying the condensed user interface of the application, receiving, via the one or more input devices, a second input corresponding to a request to display a second user interface corresponding to a second application, different from the application, in the three-dimensional environment; and in response to receiving the second input corresponding to displaying the second user interface:

concurrently displaying, in the three-dimensional environment, the condensed user interface of the application and the second user interface corresponding to the second application.

6. The method of claim 5, further comprising while displaying the second user interface corresponding to the second application, receiving, via the one or more input devices, a third input corresponding to a request to display a third user interface corresponding to a third application, different from the application and the second application; and in response to receiving the third input corresponding to displaying the third user interface:

ceasing the display of the second user interface and displaying the third user interface.

7. The method of claim 5, wherein the condensed user interface includes a third selectable user interface object that is selectable to redisplay the expanded user interface, and the method further comprises:

while displaying the third selectable user interface object displayed concurrently with the condensed user interface, receiving, via the one or more input devices, a fourth input corresponding to selection of the third selectable user interface object; and in response to receiving the fourth input corresponding to the selection of the third selectable user interface object:

displaying the expanded user interface and ceasing display of the second user interface corresponding to the second application.

8. The method of claim 2, wherein the condensed user interface includes a third selectable user interface object that is selectable to display a representation of lyrics of the first content item and the playback control user interface includes a fourth selectable user interface object that is selectable to display a representation of lyrics of the first content item.

9. The method of claim 8, further comprising:

while displaying the condensed user interface including the third selectable user interface object, receiving, via the one or more input devices, a second input corresponding to selection of the third selectable user interface object; and in response to receiving the second input, displaying the representation of the lyrics of the first content item concurrently with the condensed user interface in the three-dimensional environment, wherein the representation of the lyrics is displayed at a fourth location in the three-dimensional environment and the condensed user interface is displayed at a fifth location, different from the fourth location, in the three-dimensional environment.

10. The method of claim 8, further comprising:

while displaying the representation of the lyrics at a fourth location in the three-dimensional environment and the condensed user interface is at a fifth location in the three-dimensional environment, receiving, via the one or more input devices, a second input corresponding to a request to move the condensed user interface; and in response to receiving the second input:

moving the condensed user interface to a sixth location in the three-dimensional environment in accordance with the second input; and maintaining the representation of the lyrics of the first content item at the fourth location in the three-dimensional environment.

11. The method of claim 8, further comprising:

while displaying the representation of the lyrics at a fourth location in the three-dimensional environment and the condensed user interface is at a fifth location in the three-dimensional environment, receiving, via the one or more input devices, a second input corresponding to a request to move the representation of the lyrics of the first content item; and in response to receiving the second input corresponding to moving the representation of the lyrics of the first content item:

moving the representation of the lyrics of the first content item to a sixth location; and continuing to display the condensed user interface at the fifth location.

12. The method of claim 8, further comprising:

while displaying the representation of the lyrics with a first size in the three-dimensional environment, receiving, via the one or more input devices, a second input corresponding to a request to modify a size of the representation of the lyrics of the first content item; and in response to receiving the second input:

modifying the representation of the lyrics of the first content item to have a second size, different from the first size, in the three-dimensional environment in accordance with the second input; and maintaining a size of the condensed user interface in the three-dimensional environment.

13. The method of claim 1, further comprising:

while displaying the expanded user interface and a third selectable user interface object that is selectable to display a representation of lyrics of the first content item, wherein the expanded user interface is displayed at the first location in the three-dimensional environment, receiving, via the one or more input devices, a second input corresponding to a selection of the third selectable user interface object; and in response to receiving the second input:

ceasing display of the expanded user interface in the three-dimensional environment at the first location; and displaying, in the three-dimensional environment, the representation of the lyrics of the first content item at the first location.

14. The method of claim 13, wherein displaying the representation of the lyrics of the first content item at the first location includes displaying the representation of the lyrics of the first content item with a size that is different from a size of the expanded user interface that was displayed when the second input was detected.

15. The method of claim 13, wherein when the second input was detected, the expanded user interface was displayed concurrently with a playback control user interface that includes the second selectable user interface object, the method further comprising:

in response to receiving the second input, displaying the representation of the lyrics of the first content item concurrently with the playback control user interface;

while concurrently displaying the representation of the lyrics of the first content item with the playback control user interface, receiving, via the one or more input device, a third input corresponding to a request to move the playback control user interface in the three-dimensional environment; and in response to receiving the third input:

moving the playback control user interface in the three-dimensional environment in accordance with the third input; and moving the representation of the lyrics of the first content item in the three-dimensional environment in accordance with the third input.

16. A computer system that is in communication with a display generation component and one or more input devices, comprising:

one or more processors;

memory; and one or more programs, wherein the one or more programs are stored in the memory and configured to be executed by the one or more processors, the one or more programs including instructions for:

displaying, via the display generation component, an expanded user interface of an application at a first location in a three-dimensional environment, wherein:

the application is controlling playback of a first content item at the computer system, the expanded user interface includes a first selectable user interface object that is selectable to initiate playback of a second content item, different from the first content item, at the computer system, and the expanded user interface is displayed concurrently with a second selectable user interface object that is displayed at a second location in the three-dimensional environment, separate from the expanded user interface;

while displaying the expanded user interface of the application at the first location in the three-dimensional environment and the second selectable user interface object at the second location in the three-dimensional environment, receiving via the one or more input devices, a first input corresponding to selection of the second selectable user interface object; and in response to receiving the first input:

displaying, in the three-dimensional environment, a condensed user interface of the application for controlling the playback of the first content item at the computer system, wherein the condensed user interface is displayed at a third location, different from the first location and the second location, in the three-dimensional environment;

cease displaying, in the three-dimensional environment, the expanded user interface and the second selectable user interface object;

while displaying the condensed user interface, receiving, via the one or more input devices, a second input corresponding to a request to resize the condensed user interface; and in response to receiving the second input corresponding to the request to resize the condensed user interface, updating a size of the condensed user interface in the three-dimensional environment in accordance with the second input corresponding to the request to resize the condensed user interface.

17. The computer system of claim 16, wherein the one or more programs further include instructions for:

displaying, via the display generation component, a playback control user interface of the application for controlling playback of the first content item concurrently with, and separate from, the expanded user interface in the three-dimensional environment.

18. The computer system of claim 17, wherein the playback control user interface includes an image corresponding to the first content item and a third selectable user interface object for modifying playback of the first content item.

19. The computer system of claim 18, wherein the second selectable user interface object comprises the image corresponding to the first content item.

20. The computer system of claim 17, wherein the condensed user interface includes a third selectable user interface object that is selectable to display a representation of lyrics of the first content item and the playback control user interface includes a fourth selectable user interface object that is selectable to display a representation of lyrics of the first content item.

21. The computer system of claim 20, wherein the one or more programs further include instructions for:

while displaying the condensed user interface including the third selectable user interface object, receiving, via the one or more input devices, a second input corresponding to selection of the third selectable user interface object; and in response to receiving the second input, displaying the representation of the lyrics of the first content item concurrently with the condensed user interface in the three-dimensional environment, wherein the representation of the lyrics is displayed at a fourth location in the three-dimensional environment and the condensed user interface is displayed at a fifth location, different from the fourth location, in the three-dimensional environment.

22. The computer system of claim 20, wherein the one or more programs further include instructions for:

while displaying the representation of the lyrics at a fourth location in the three-dimensional environment and the condensed user interface is at a fifth location in the three-dimensional environment, receiving, via the one or more input devices, a second input corresponding to a request to move the condensed user interface; and in response to receiving the second input:

moving the condensed user interface to a sixth location in the three-dimensional environment in accordance with the second input; and maintaining the representation of the lyrics of the first content item at the fourth location in the three-dimensional environment.

23. The computer system of claim 20, wherein the one or more programs further include instructions for:

while displaying the representation of the lyrics at a fourth location in the three- dimensional environment and the condensed user interface is at a fifth location in the three- dimensional environment, receiving, via the one or more input devices, a second input corresponding to a request to move the representation of the lyrics of the first content item; and in response to receiving the second input corresponding to moving the representation of the lyrics of the first content item:

moving the representation of the lyrics of the first content item to a sixth location; and continuing to display the condensed user interface at the fifth location.

24. The computer system of claim 20, wherein the one or more programs further include instructions for:

while displaying the representation of the lyrics with a first size in the three-dimensional environment, receiving, via the one or more input devices, a second input corresponding to a request to modify a size of the representation of the lyrics of the first content item; and in response to receiving the second input:

modifying the representation of the lyrics of the first content item to have a second size, different from the first size, in the three-dimensional environment in accordance with the second input; and maintaining a size of the condensed user interface in the three-dimensional environment.

25. The computer system of claim 16, wherein the one or more programs further include instructions for:

while displaying the condensed user interface of the application, receiving, via the one or more input devices, a second input corresponding to a request to display a second user interface corresponding to a second application, different from the application, in the three-dimensional environment; and in response to receiving the second input corresponding to displaying the second user interface:

concurrently displaying, in the three-dimensional environment, the condensed user interface of the application and the second user interface corresponding to the second application.

26. The computer system of claim 25, wherein the one or more programs further include instructions for:

while displaying the second user interface corresponding to the second application, receiving, via the one or more input devices, a third input corresponding to a request to display a third user interface corresponding to a third application, different from the application and the second application; and in response to receiving the third input corresponding to displaying the third user interface:

ceasing the display of the second user interface and displaying the third user interface.

27. The computer system of claim 25, wherein the condensed user interface includes a third selectable user interface object that is selectable to redisplay the expanded user interface, and the one or more programs further include instructions for:

while displaying the third selectable user interface object displayed concurrently with the condensed user interface, receiving, via the one or more input devices, a fourth input corresponding to selection of the third selectable user interface object; and in response to receiving the fourth input corresponding to the selection of the third selectable user interface object:

displaying the expanded user interface and ceasing display of the second user interface corresponding to the second application.

28. The computer system of claim 16, wherein the one or more programs further include instructions for:

while displaying the expanded user interface and a third selectable user interface object that is selectable to display a representation of lyrics of the first content item, wherein the expanded user interface is displayed at the first location in the three-dimensional environment, receiving, via the one or more input devices, a second input corresponding to a selection of the third selectable user interface object; and in response to receiving the second input:

ceasing display of the expanded user interface in the three-dimensional environment at the first location; and displaying, in the three-dimensional environment, the representation of the lyrics of the first content item at the first location.

29. The computer system of claim 28, wherein displaying the representation of the lyrics of the first content item at the first location includes displaying the representation of the lyrics of the first content item with a size that is different from a size of the expanded user interface that was displayed when the second input was detected.

30. The computer system of claim 28, wherein when the second input was detected, the expanded user interface was displayed concurrently with a playback control user interface that includes the second selectable user interface object, the one or more programs further including instructions for:

in response to receiving the second input, displaying the representation of the lyrics of the first content item concurrently with the playback control user interface;

while concurrently displaying the representation of the lyrics of the first content item with the playback control user interface, receiving, via the one or more input device, a third input corresponding to a request to move the playback control user interface in the three-dimensional environment; and in response to receiving the third input:

moving the playback control user interface in the three-dimensional environment in accordance with the third input; and moving the representation of the lyrics of the first content item in the three-dimensional environment in accordance with the third input.

31. A non-transitory computer readable storage medium storing one or more programs, the one or more programs comprising instructions, which when executed by one or more processors of a computer system that is in communication with a display generation component and one or more input devices, cause the computer system to perform a method comprising:

displaying, via the display generation component, an expanded user interface of an application at a first location in a three-dimensional environment, wherein:

the application is controlling playback of a first content item at the computer system, the expanded user interface includes a first selectable user interface object that is selectable to initiate playback of a second content item, different from the first content item, at the computer system, and the expanded user interface is displayed concurrently with a second selectable user interface object that is displayed at a second location in the three-dimensional environment, separate from the expanded user interface;

while displaying the expanded user interface of the application at the first location in the three-dimensional environment and the second selectable user interface object at the second location in the three-dimensional environment, receiving via the one or more input devices, a first input corresponding to selection of the second selectable user interface object; and in response to receiving the first input:

displaying, in the three-dimensional environment, a condensed user interface of the application for controlling the playback of the first content item at the computer system, wherein the condensed user interface is displayed at a third location, different from the first location and the second location, in the three-dimensional environment;

cease displaying, in the three-dimensional environment, the expanded user interface and the second selectable user interface object;

while displaying the condensed user interface, receiving, via the one or more input devices, a second input corresponding to a request to resize the condensed user interface; and in response to receiving the second input corresponding to the request to resize the condensed user interface, updating a size of the condensed user interface in the three-dimensional environment in accordance with the second input corresponding to the request to resize the condensed user interface.

32. The non-transitory computer readable storage medium of claim 31, the method further comprising:

displaying, via the display generation component, a playback control user interface of the application for controlling playback of the first content item concurrently with, and separate from, the expanded user interface in the three-dimensional environment.

33. The non-transitory computer readable storage medium of claim 32, wherein the playback control user interface includes an image corresponding to the first content item and a third selectable user interface object for modifying playback of the first content item.

34. The non-transitory computer readable storage medium of claim 33, wherein the second selectable user interface object comprises the image corresponding to the first content item.

35. The non-transitory computer readable storage medium of claim 32, wherein the condensed user interface includes a third selectable user interface object that is selectable to display a representation of lyrics of the first content item and the playback control user interface includes a fourth selectable user interface object that is selectable to display a representation of lyrics of the first content item.

36. The non-transitory computer readable storage medium of claim 35, the method further comprising:

while displaying the condensed user interface including the third selectable user interface object, receiving, via the one or more input devices, a second input corresponding to selection of the third selectable user interface object; and in response to receiving the second input, displaying the representation of the lyrics of the first content item concurrently with the condensed user interface in the three-dimensional environment, wherein the representation of the lyrics is displayed at a fourth location in the three-dimensional environment and the condensed user interface is displayed at a fifth location, different from the fourth location, in the three-dimensional environment.

37. The non-transitory computer readable storage medium of claim 35, the method further comprising:

while displaying the representation of the lyrics at a fourth location in the three-dimensional environment and the condensed user interface is at a fifth location in the three-dimensional environment, receiving, via the one or more input devices, a second input corresponding to a request to move the condensed user interface; and in response to receiving the second input:

moving the condensed user interface to a sixth location in the three-dimensional environment in accordance with the second input; and maintaining the representation of the lyrics of the first content item at the fourth location in the three-dimensional environment.

38. The non-transitory computer readable storage medium of claim 35, the method further comprising:

while displaying the representation of the lyrics at a fourth location in the three-dimensional environment and the condensed user interface is at a fifth location in the three-dimensional environment, receiving, via the one or more input devices, a second input corresponding to a request to move the representation of the lyrics of the first content item; and in response to receiving the second input corresponding to moving the representation of the lyrics of the first content item:

moving the representation of the lyrics of the first content item to a sixth location; and continuing to display the condensed user interface at the fifth location.

39. The non-transitory computer readable storage medium of claim 35, the method further comprising:

while displaying the representation of the lyrics with a first size in the three-dimensional environment, receiving, via the one or more input devices, a second input corresponding to a request to modify a size of the representation of the lyrics of the first content item; and in response to receiving the second input:

modifying the representation of the lyrics of the first content item to have a second size, different from the first size, in the three-dimensional environment in accordance with the second input; and maintaining a size of the condensed user interface in the three-dimensional environment.

40. The non-transitory computer readable storage medium of claim 31, the method further comprising:

while displaying the condensed user interface of the application, receiving, via the one or more input devices, a second input corresponding to a request to display a second user interface corresponding to a second application, different from the application, in the three-dimensional environment; and in response to receiving the second input corresponding to displaying the second user interface:

concurrently displaying, in the three-dimensional environment, the condensed user interface of the application and the second user interface corresponding to the second application.

41. The non-transitory computer readable storage medium of claim 40, the method further comprising:

while displaying the second user interface corresponding to the second application, receiving, via the one or more input devices, a third input corresponding to a request to display a third user interface corresponding to a third application, different from the application and the second application; and in response to receiving the third input corresponding to displaying the third user interface:

ceasing the display of the second user interface and displaying the third user interface.

42. The non-transitory computer readable storage medium of claim 40, wherein the condensed user interface includes a third selectable user interface object that is selectable to redisplay the expanded user interface, and the method further comprises:

while displaying the third selectable user interface object displayed concurrently with the condensed user interface, receiving, via the one or more input devices, a fourth input corresponding to selection of the third selectable user interface object; and in response to receiving the fourth input corresponding to the selection of the third selectable user interface object:

displaying the expanded user interface and ceasing display of the second user interface corresponding to the second application.

43. The non-transitory computer readable storage medium of claim 31, the method further comprising:

while displaying the expanded user interface and a third selectable user interface object that is selectable to display a representation of lyrics of the first content item, wherein the expanded user interface is displayed at the first location in the three-dimensional environment, receiving, via the one or more input devices, a second input corresponding to a selection of the third selectable user interface object; and in response to receiving the second input:

ceasing display of the expanded user interface in the three-dimensional environment at the first location; and displaying, in the three-dimensional environment, the representation of the lyrics of the first content item at the first location.

44. The non-transitory computer readable storage medium of claim 43, wherein displaying the representation of the lyrics of the first content item at the first location includes displaying the representation of the lyrics of the first content item with a size that is different from a size of the expanded user interface that was displayed when the second input was detected.

45. The non-transitory computer readable storage medium of claim 43, wherein when the second input was detected, the expanded user interface was displayed concurrently with a playback control user interface that includes the second selectable user interface object, the method further comprising:

in response to receiving the second input, displaying the representation of the lyrics of the first content item concurrently with the playback control user interface;

while concurrently displaying the representation of the lyrics of the first content item with the playback control user interface, receiving, via the one or more input device, a third input corresponding to a request to move the playback control user interface in the three-dimensional environment; and in response to receiving the third input:

moving the playback control user interface in the three-dimensional environment in accordance with the third input; and moving the representation of the lyrics of the first content item in the three-dimensional environment in accordance with the third input.

* * * * *